(12) United States Patent
Inoue

(10) Patent No.: US 8,976,457 B2
(45) Date of Patent: Mar. 10, 2015

(54) PROJECTION LENS SYSTEM AND PROJECTOR

(75) Inventor: Kazuhiko Inoue, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 24 days.

(21) Appl. No.: 13/882,472

(22) PCT Filed: Oct. 25, 2011

(86) PCT No.: PCT/JP2011/074505
§ 371 (c)(1),
(2), (4) Date: Apr. 29, 2013

(87) PCT Pub. No.: WO2012/057110
PCT Pub. Date: May 3, 2012

(65) Prior Publication Data
US 2013/0215519 A1    Aug. 22, 2013

(30) Foreign Application Priority Data
Oct. 28, 2010 (JP) ................... 2010-242288

(51) Int. Cl.
*G02B 15/14* (2006.01)
*G02B 13/16* (2006.01)
*G02B 15/177* (2006.01)

(52) U.S. Cl.
CPC ............... *G02B 15/14* (2013.01); *G02B 13/16* (2013.01); *G02B 15/177* (2013.01)
USPC ....................................... 359/682

(58) Field of Classification Search
CPC ....... G02B 15/15; G02B 15/16; G02B 15/177
USPC ............................. 359/676, 680, 682
See application file for complete search history.

(56) References Cited

U.S. PATENT DOCUMENTS

| 6,545,817 | B2 * | 4/2003 | Hirose ......................... 359/683 |
| 6,785,055 | B2 * | 8/2004 | Nishikawa et al. ........... 359/681 |
| 2004/0190155 | A1 | 9/2004 | Nagahara |
| 2009/0323197 | A1 | 12/2009 | Masui |
| 2013/0070123 | A1 * | 3/2013 | Imaoka ........................ 348/240.3 |

FOREIGN PATENT DOCUMENTS

| JP | 2004-310083 | 11/2004 |
| JP | 2007-156268 | 6/2007 |
| JP | 2010-8797   | 1/2010 |

* cited by examiner

*Primary Examiner* — Darryl J Collins
(74) *Attorney, Agent, or Firm* — Cozen O'Connor

(57) ABSTRACT

An aperture stop is arranged on the reduction side of the most reduction-side lens element in a fourth group; during zooming from the tele-end to the wide-end through a middle position that fulfills conditional formula 0.99<fm/(ft×fw)½<1.01, first and fifth groups remain stationary, the composite power of third and fourth groups is constantly positive, and the third and fourth groups move from the enlargement side to the reduction side, satisfying conditional formulae: 7<ΔTM3/|ΔTM2|, 7<ΔTW3/|ΔTW2|, 7<ΔTM4/|ΔTM2|, 7<ΔTW4/|ΔTW2|, 0.9<ΔTM4/ΔTM3<1.1, 0.9<ΔTW4/ΔTW<1.1 (ft, fm, and fw are the entire-system focal lengths at the tele-end, the middle position, and the wide-end; ΔTM2-4 are the movement amounts of the second to fourth groups from the tele-end to the middle position; and ΔTW2-4 are the movement amounts of the second to fourth groups from the tele-end to the wide-end).

20 Claims, 56 Drawing Sheets

FIG.12
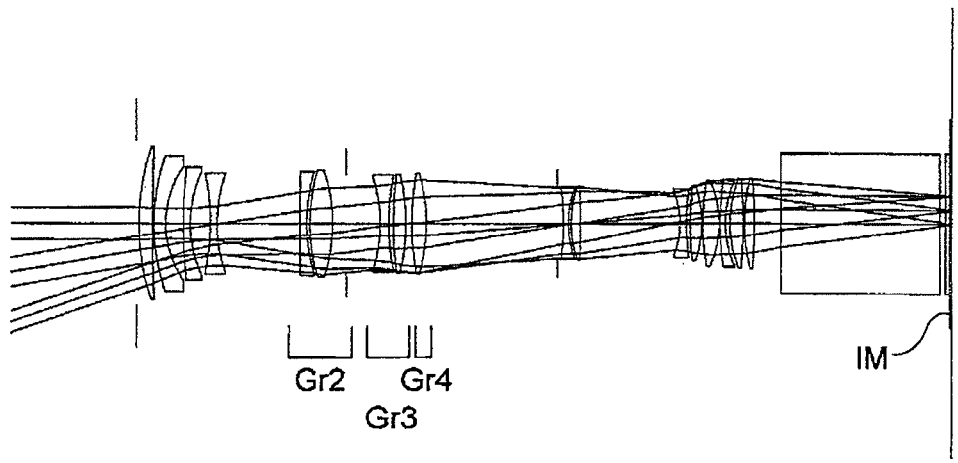
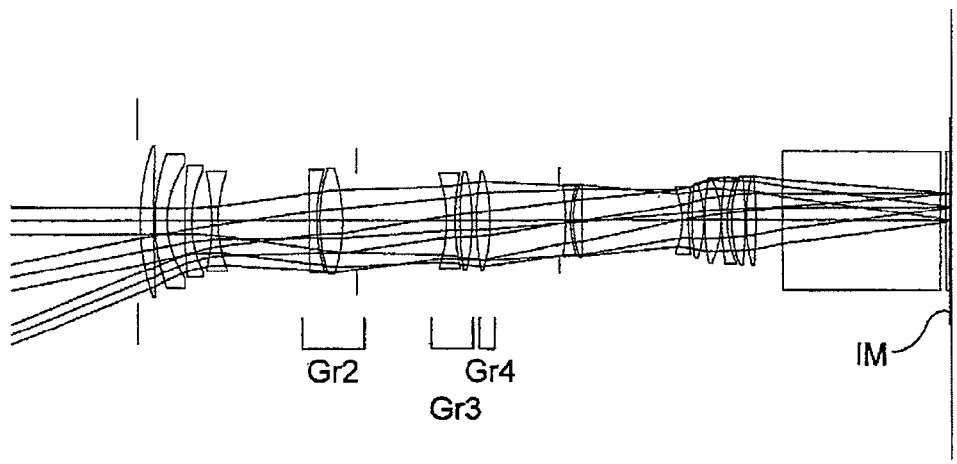
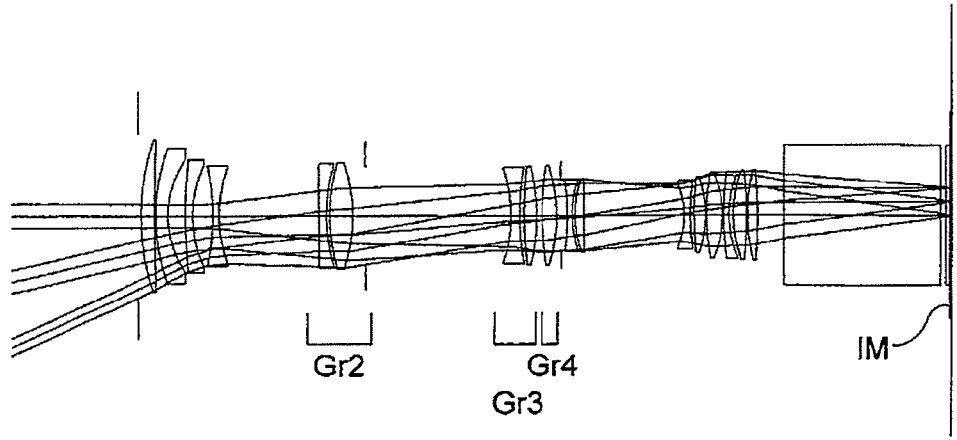

FIG.13
EX2
(T)
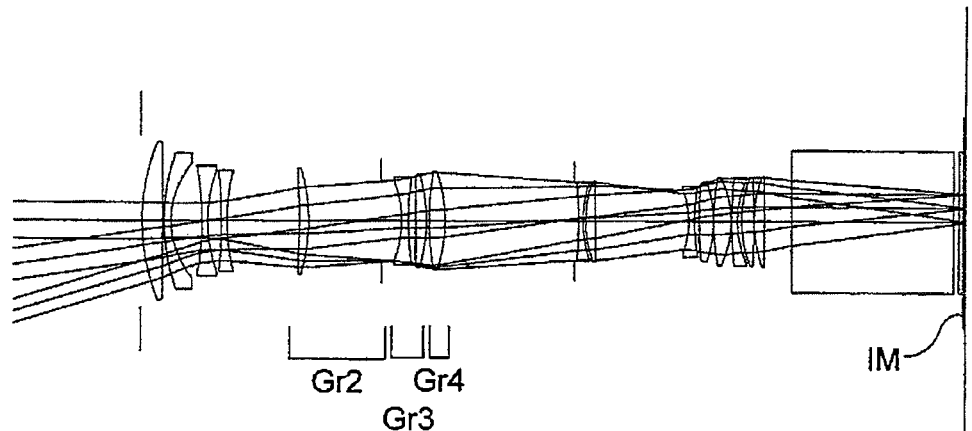
(M)
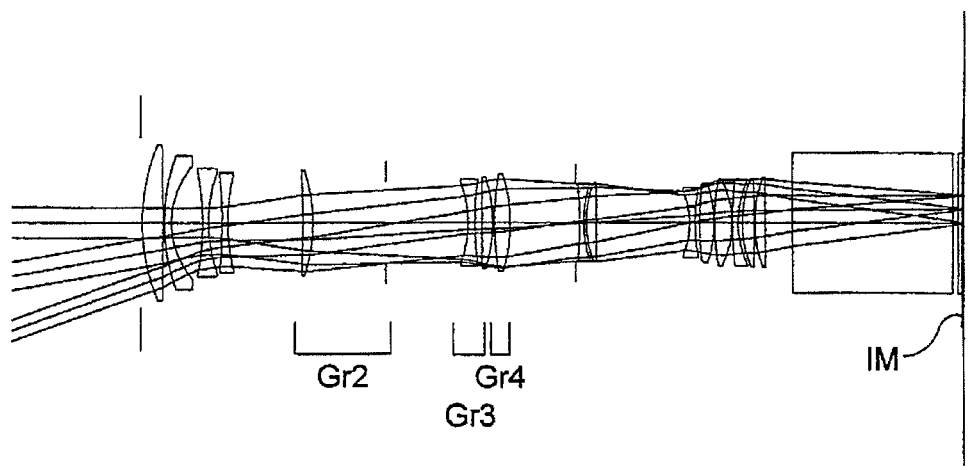
(W)
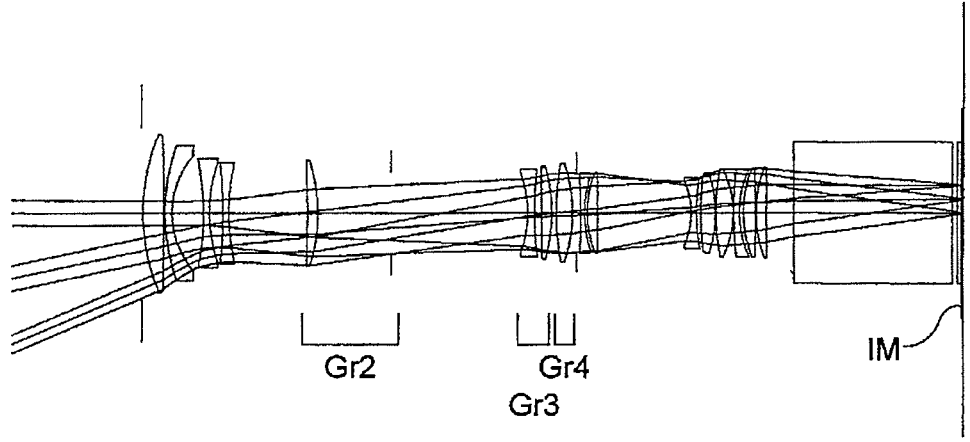

FIG.14
EX3
(T)
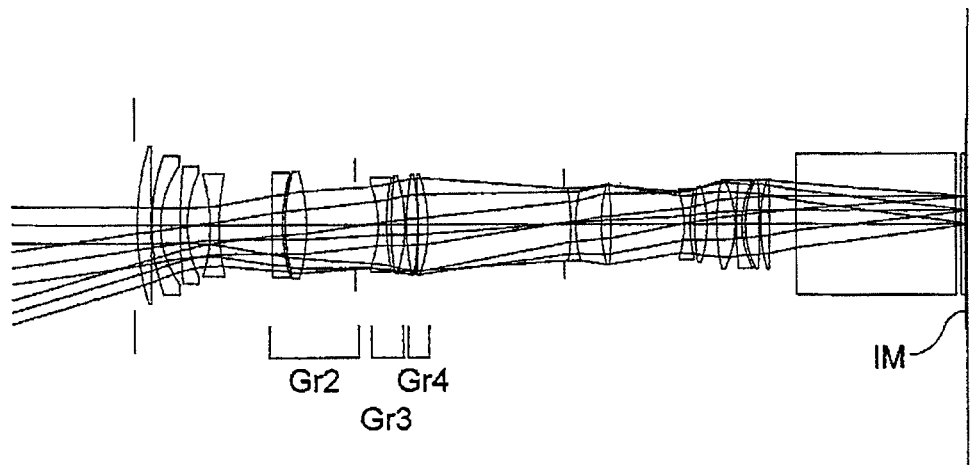
(M)
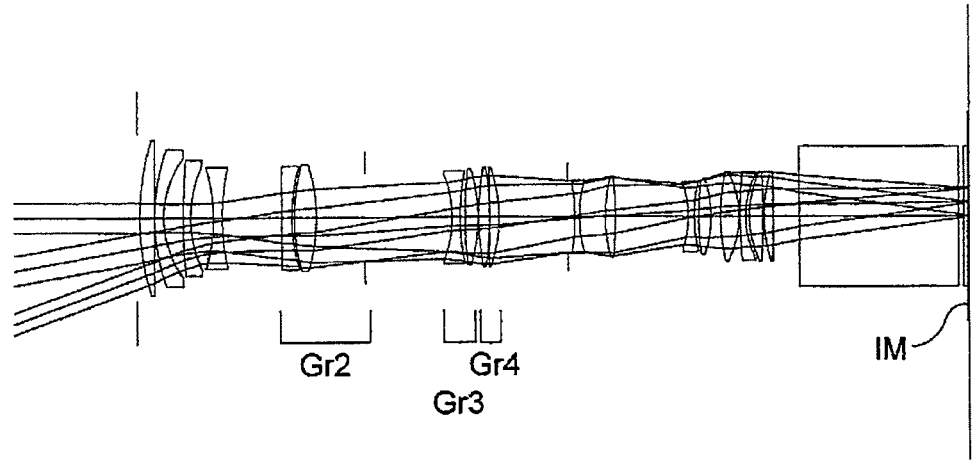
(W)
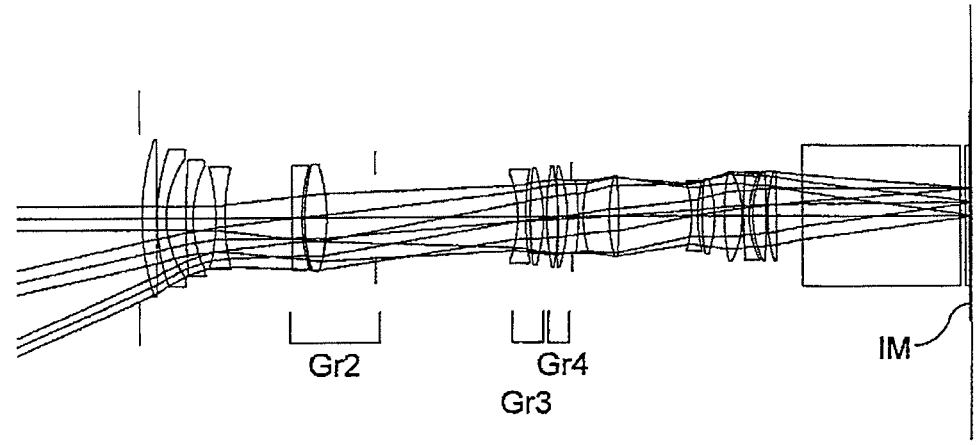

FIG.15
EX4
(T)
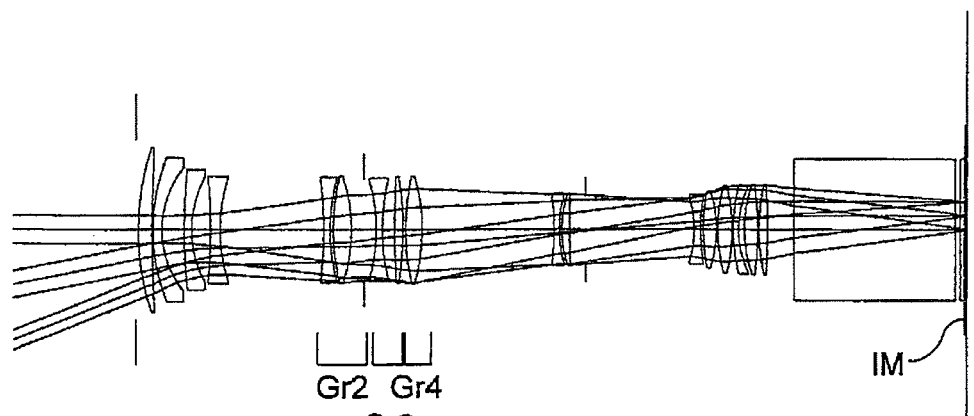
(M)
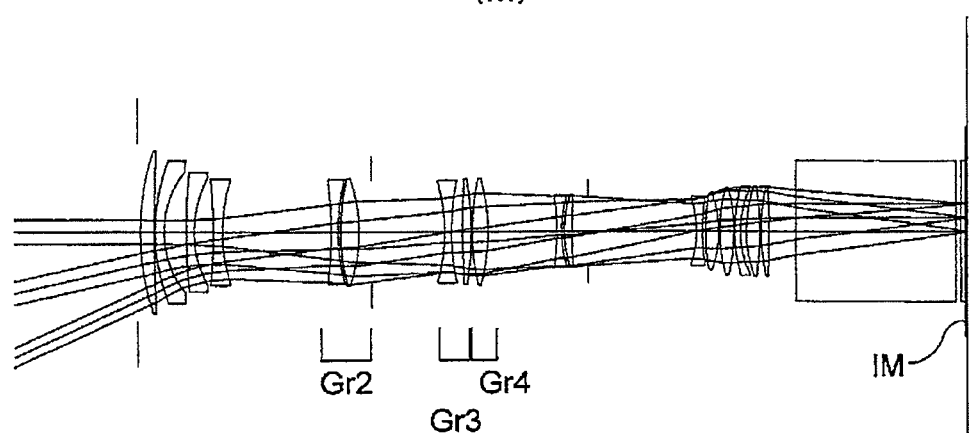
(W)
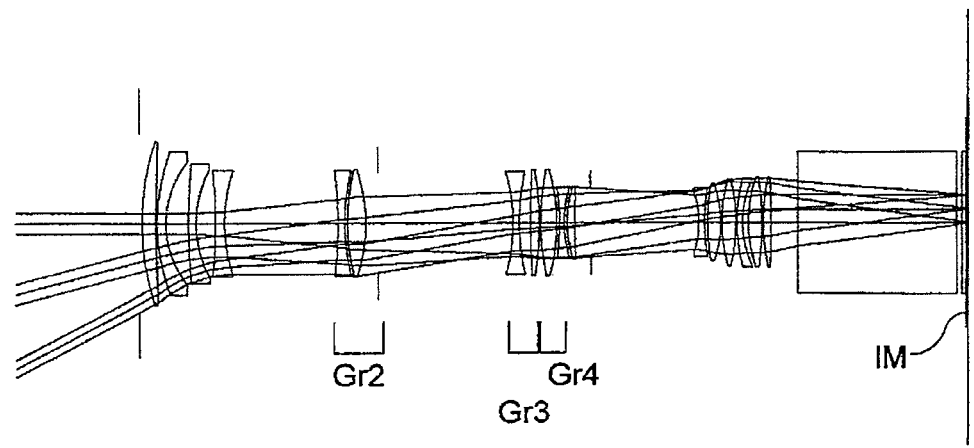

FIG.16
EX5
(T)
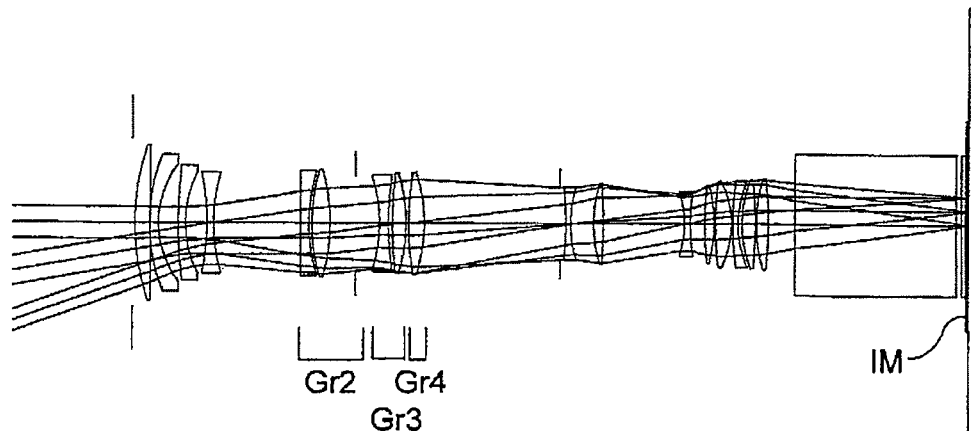
(M)
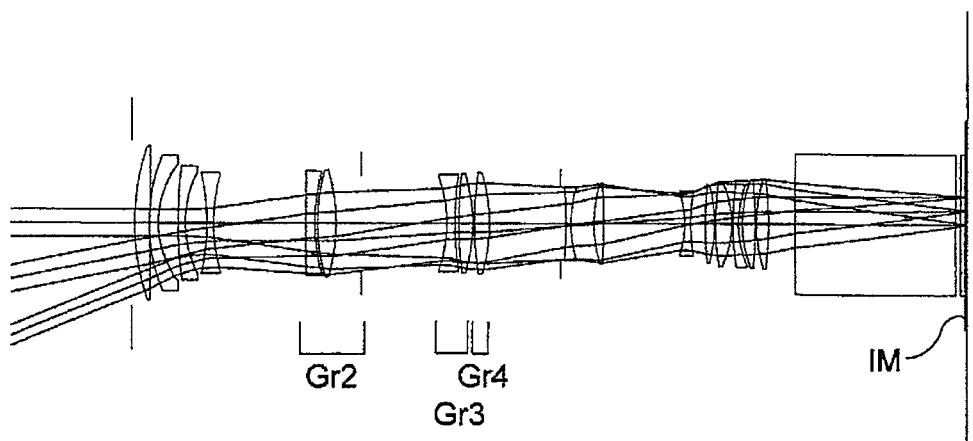
(W)
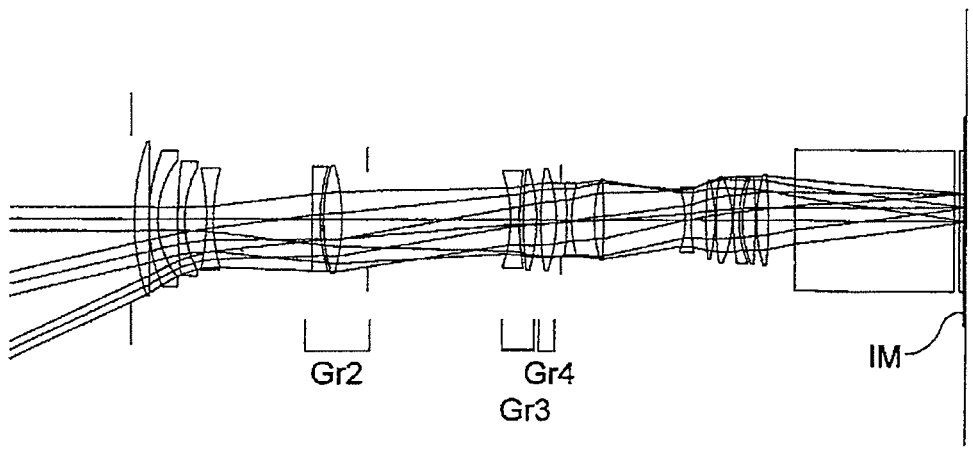

FIG.17
EX6
(T)
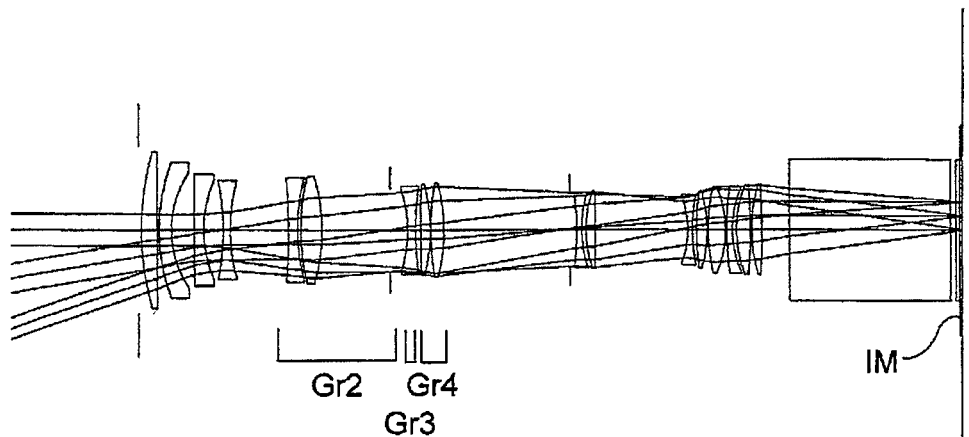
(M)
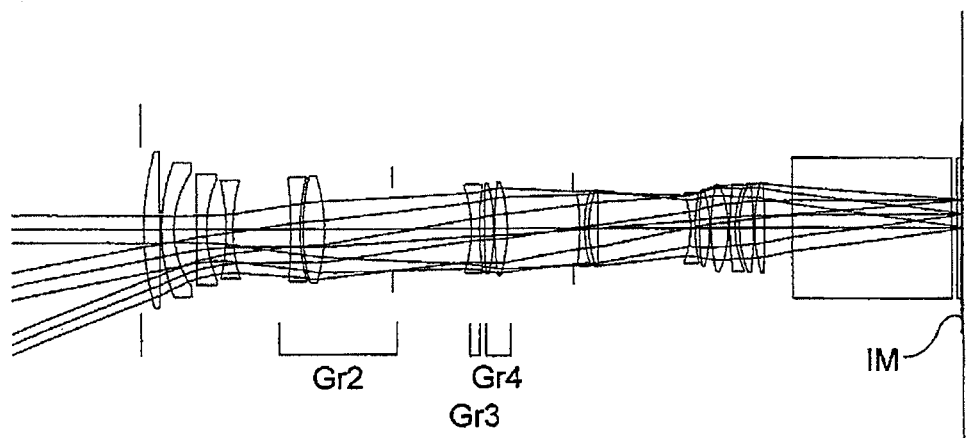
(W)
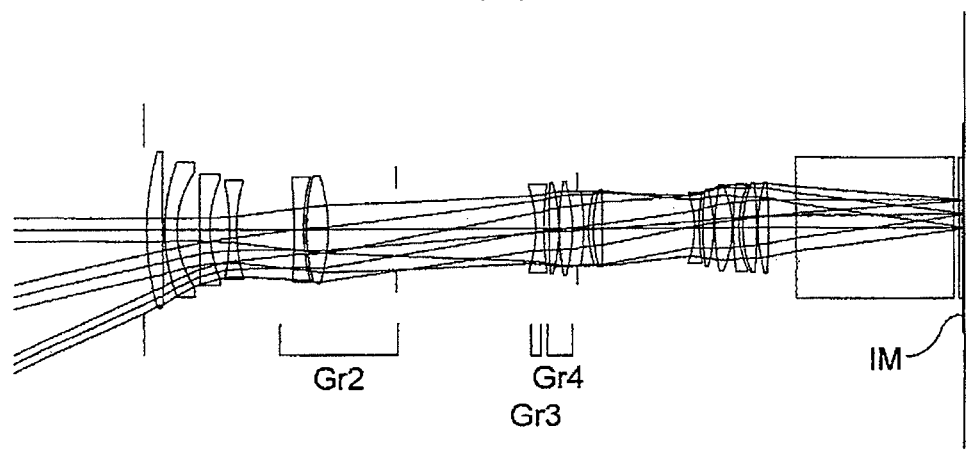

FIG.18
EX7
(T)
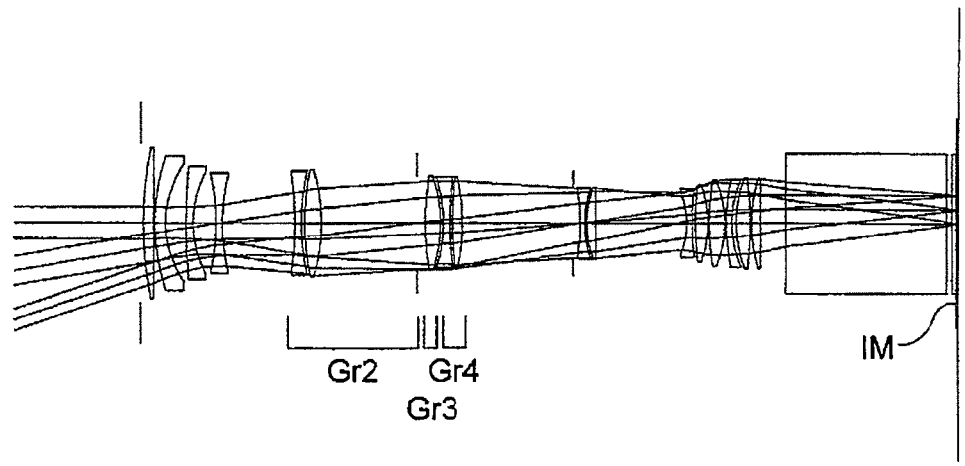
(M)
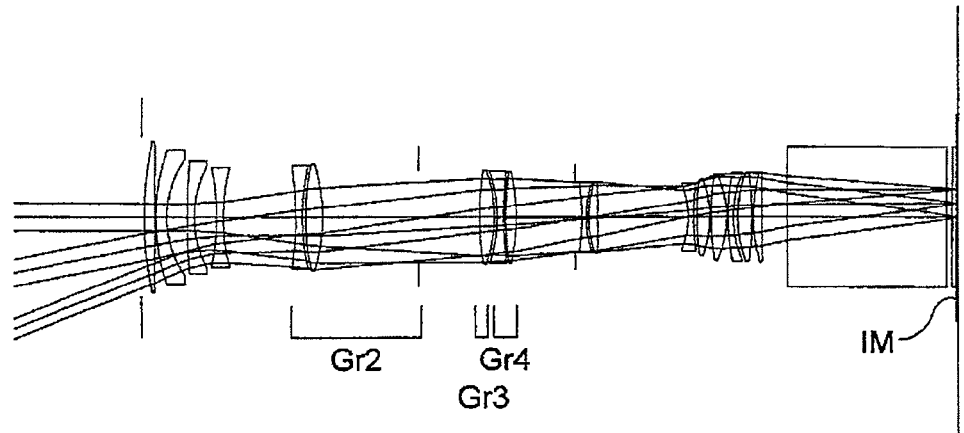
(W)
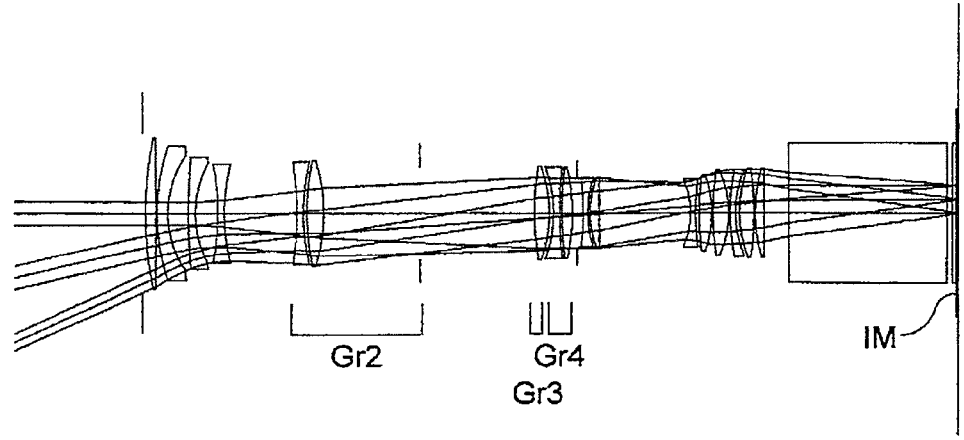

FIG.19
EX8
(T)
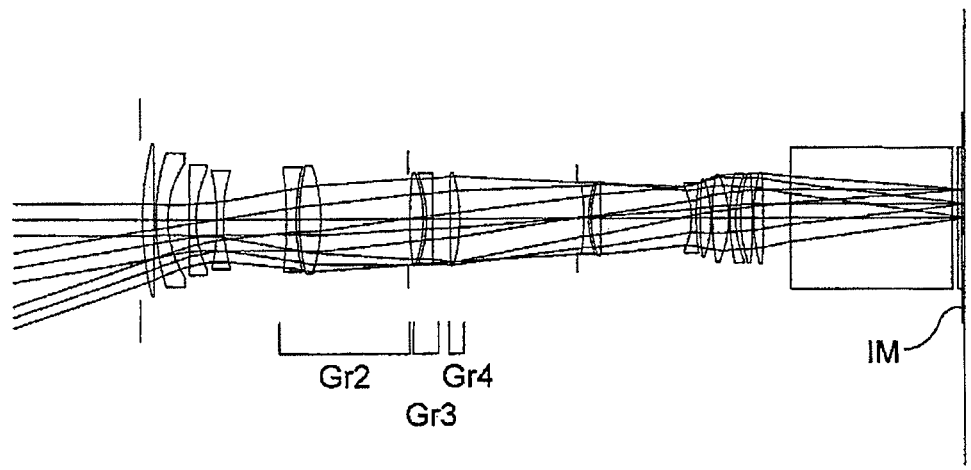
(M)
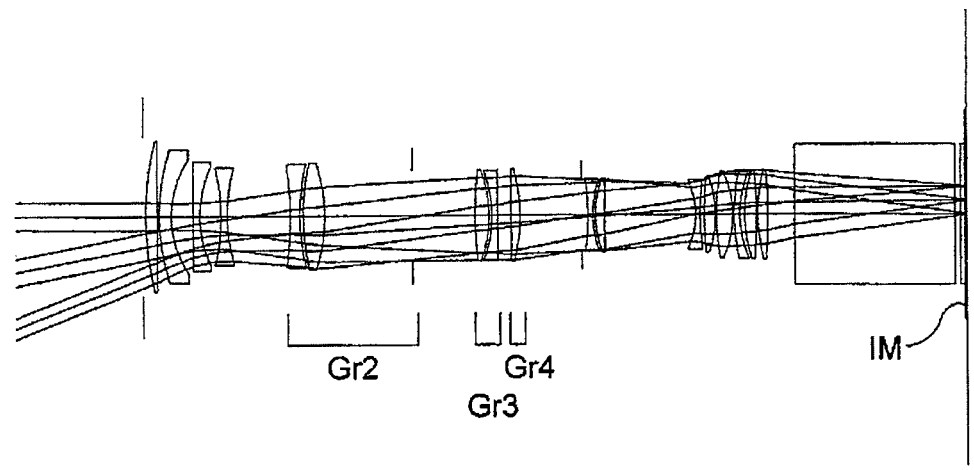
(W)
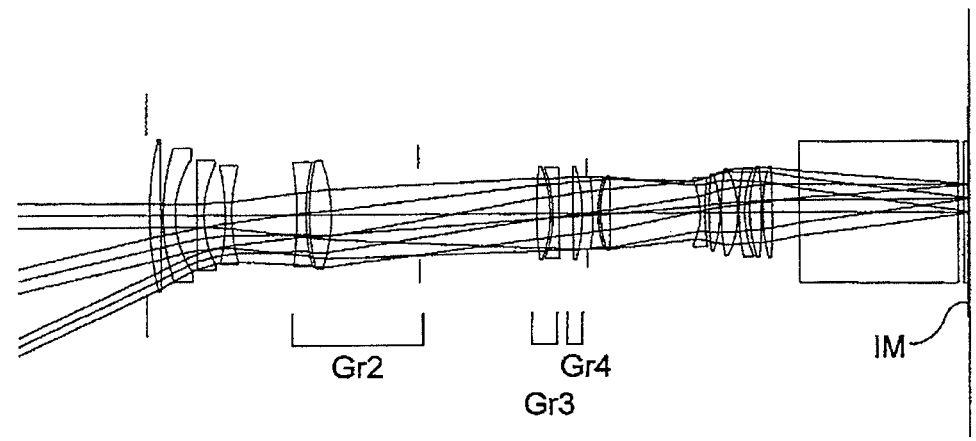

FIG.20
EX9
(T)
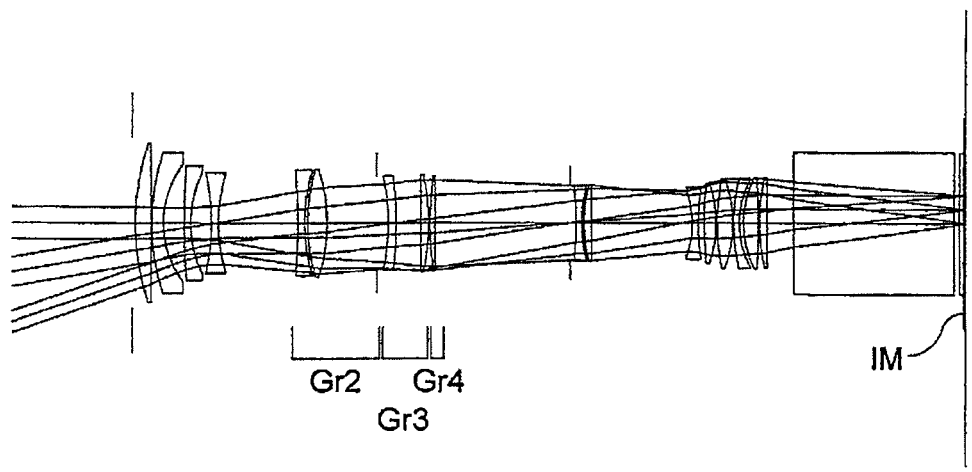
(M)
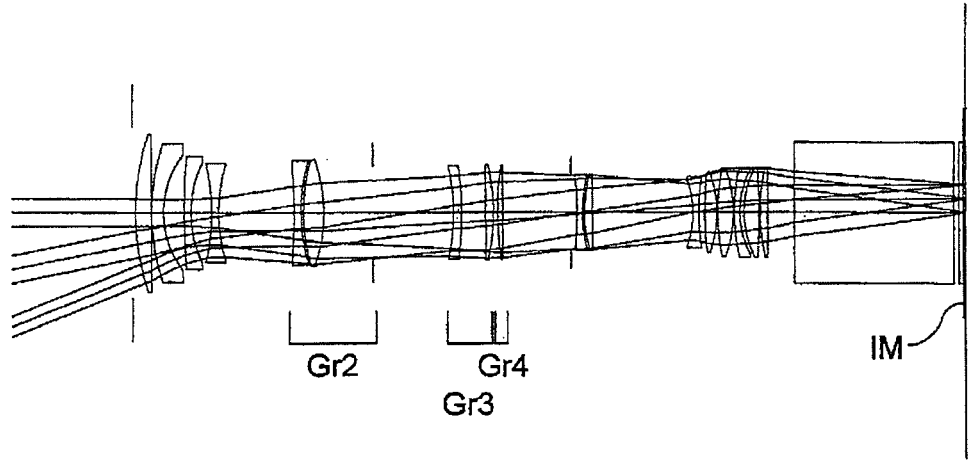
(W)
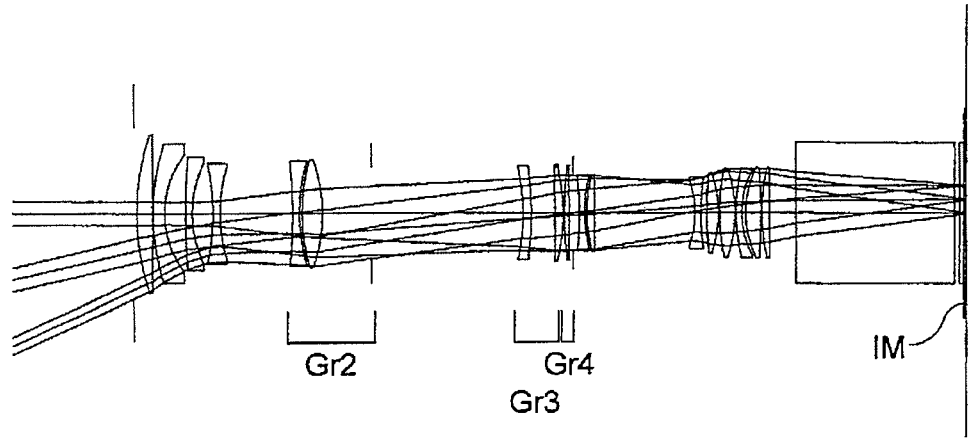

FIG.21
EX10
(T)
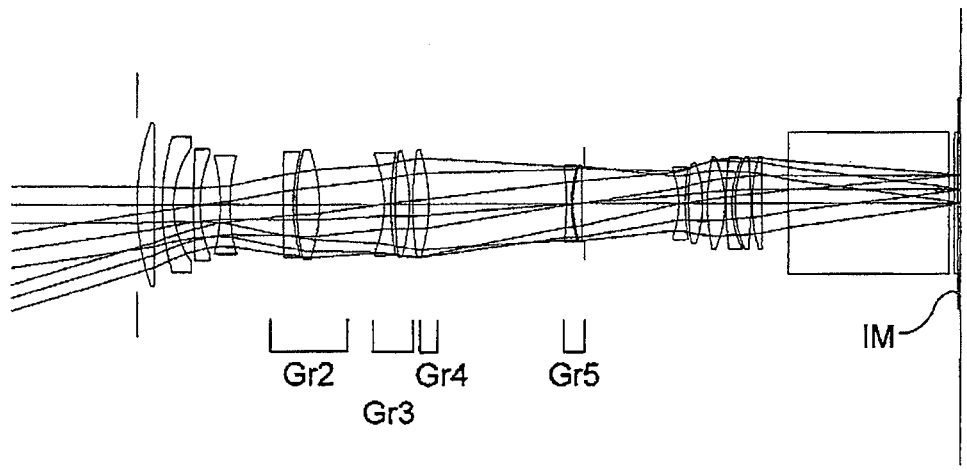
(M)
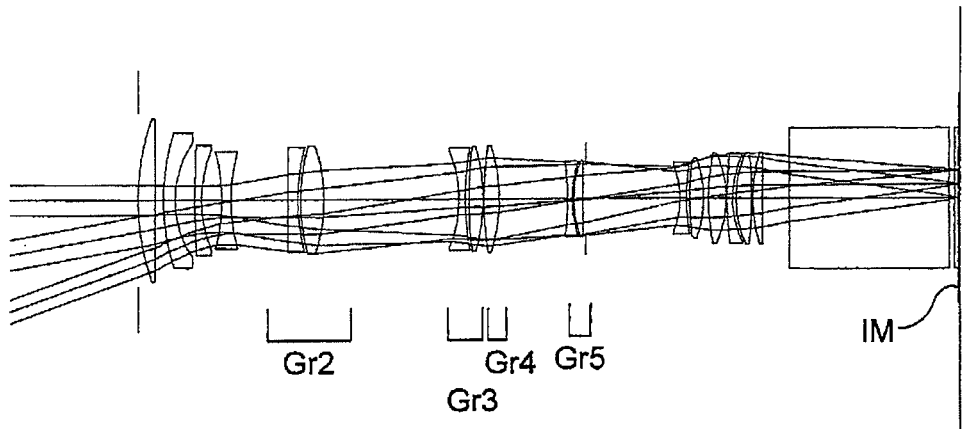
(W)
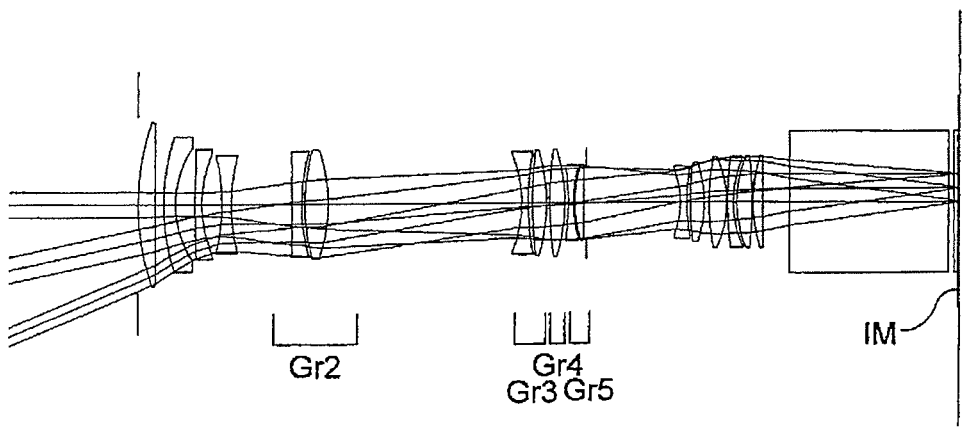

FIG.22
EX11
(T)
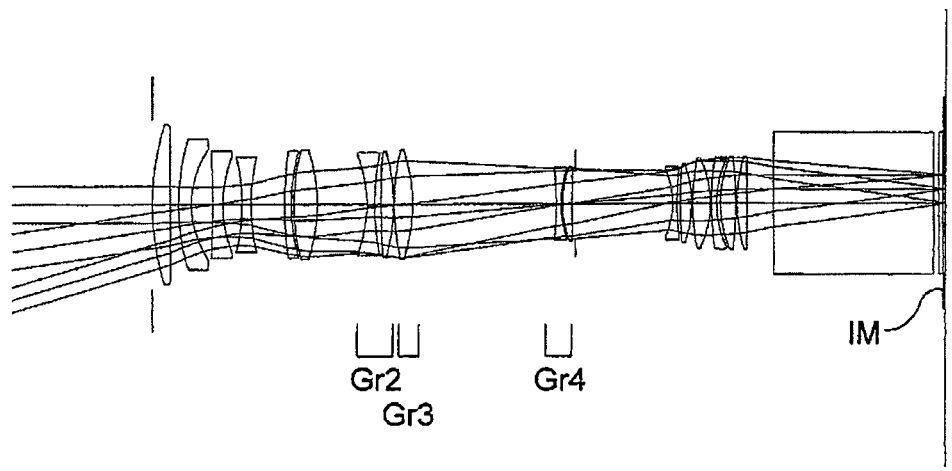
(M)
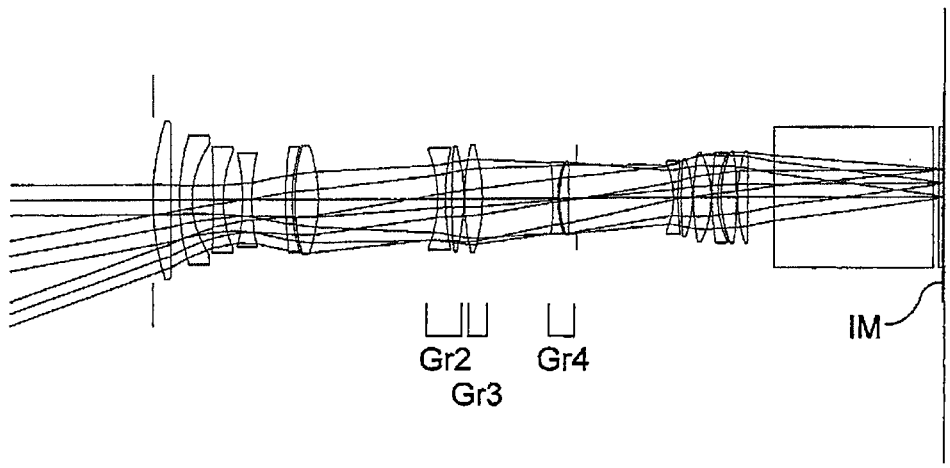
(W)
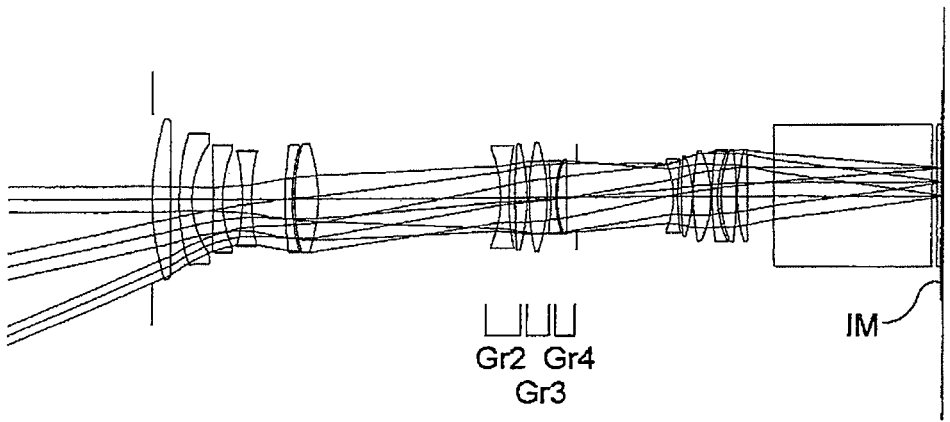

EX1 (T)

SPHERICAL ABERRATION  SINE CONDITION

ASTIGMATISM

% DISTORTION

LATERAL CHROMATIC ABERRATION

EX1 (M)

SPHERICAL ABERRATION  SINE CONDITION

ASTIGMATISM

DISTORTION

LATERAL CHROMATIC ABERRATION

EX1 (W)
FIG.25A
FIG.25B
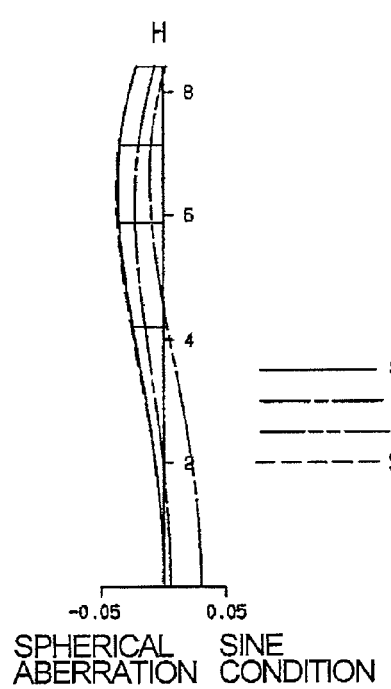
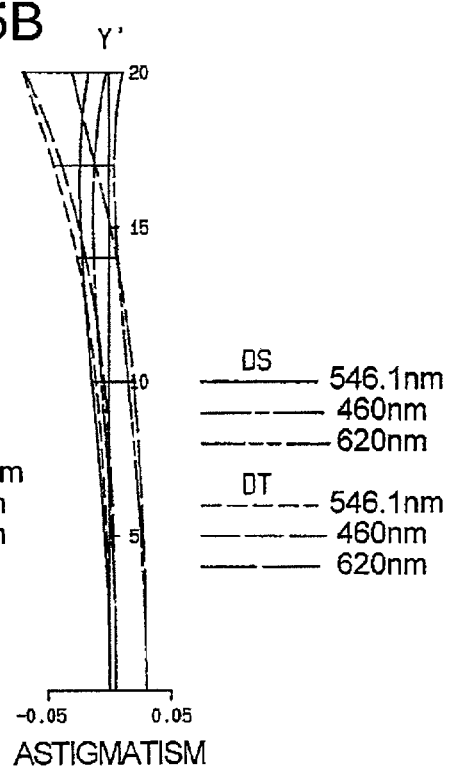
FIG.25C
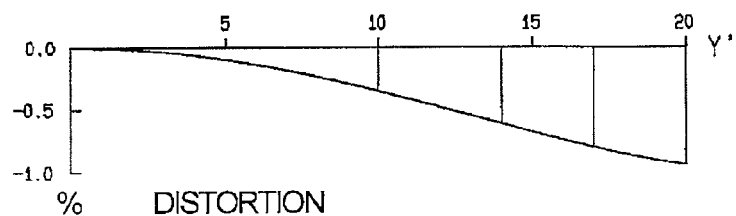
FIG.25D
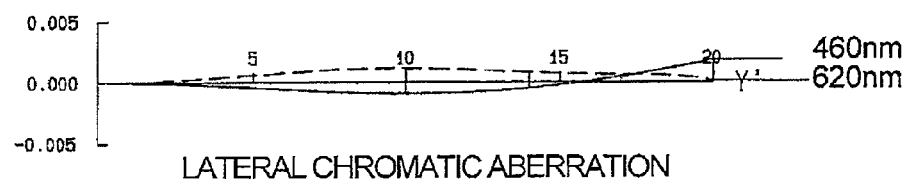

EX2 (T)
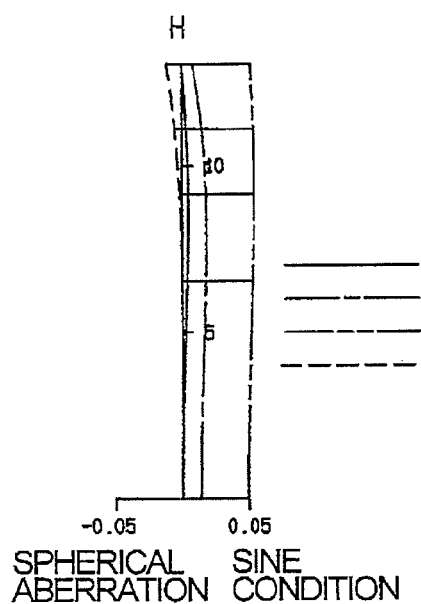
FIG.26A Spherical Aberration / Sine Condition
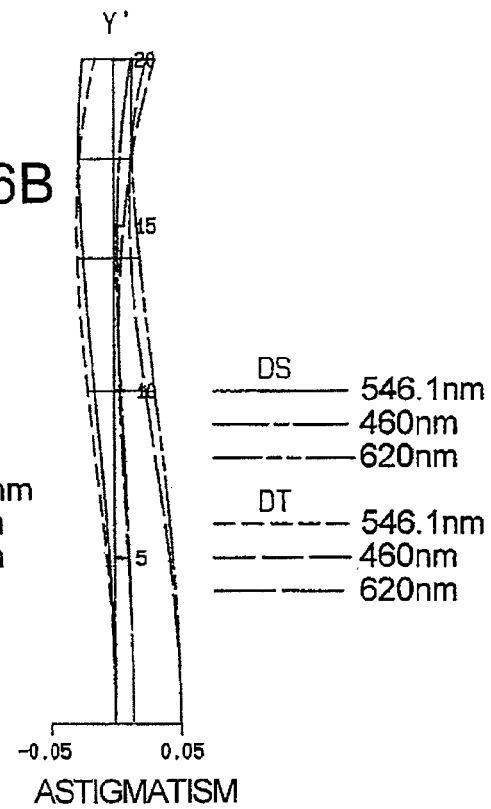
FIG.26B Astigmatism
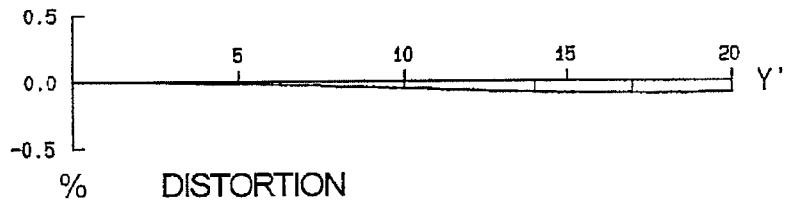
FIG.26C Distortion
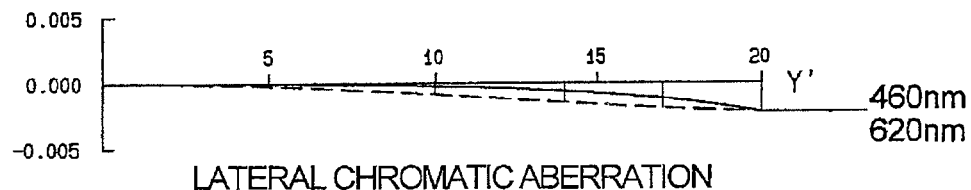
FIG.26D Lateral Chromatic Aberration

EX2 (M)

SPHERICAL ABERRATION   SINE CONDITION

ASTIGMATISM

% DISTORTION

LATERAL CHROMATIC ABERRATION

EX2 (W)

SPHERICAL ABERRATION / SINE CONDITION

ASTIGMATISM

% DISTORTION

LATERAL CHROMATIC ABERRATION

EX3 (T)
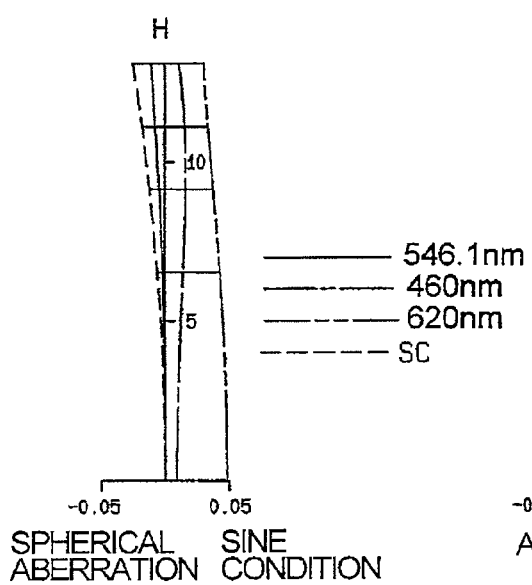
FIG.29A
FIG.29B
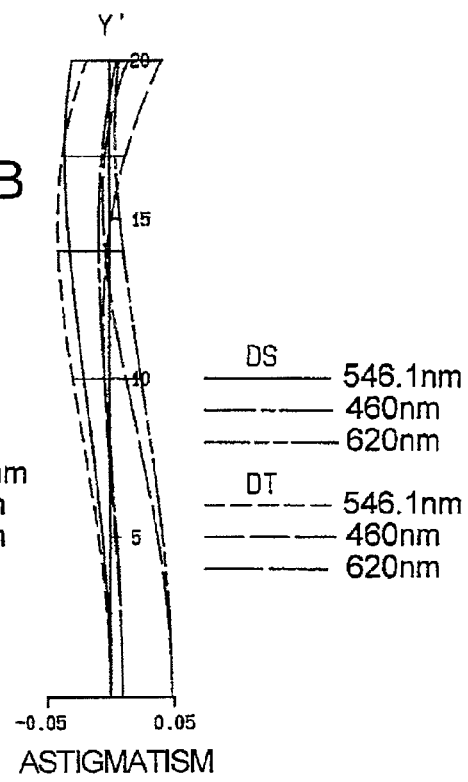
FIG.29C
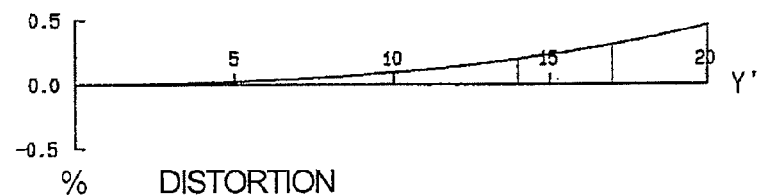
FIG.29D
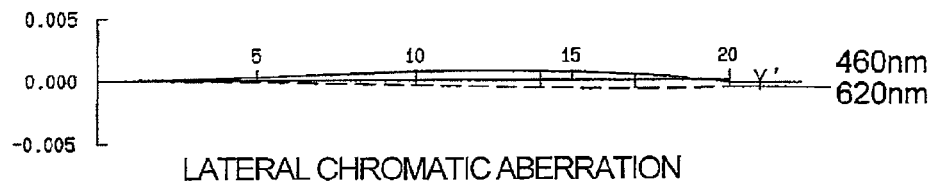

EX3 (M)

SPHERICAL ABERRATION / SINE CONDITION

ASTIGMATISM

DISTORTION

LATERAL CHROMATIC ABERRATION

EX3 (W)
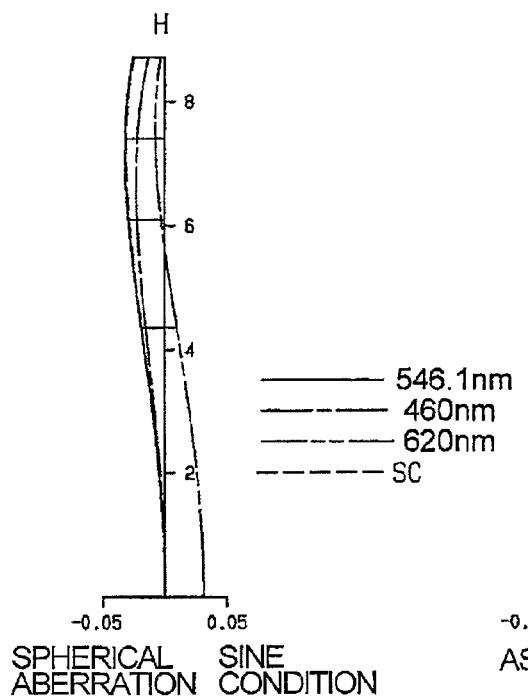
FIG.31A  FIG.31B
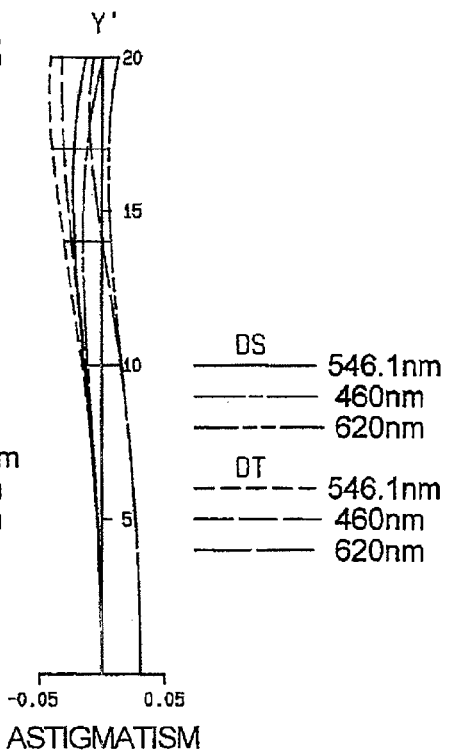
FIG.31C
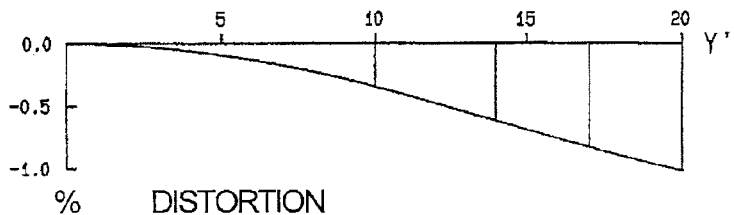
FIG.31D
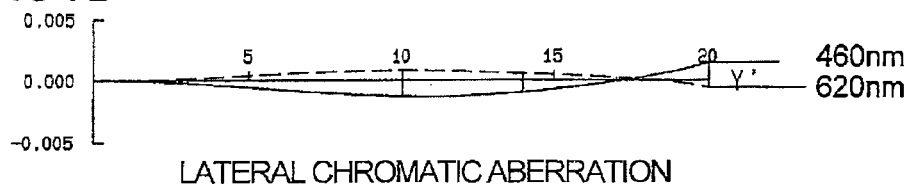

EX4 (T)
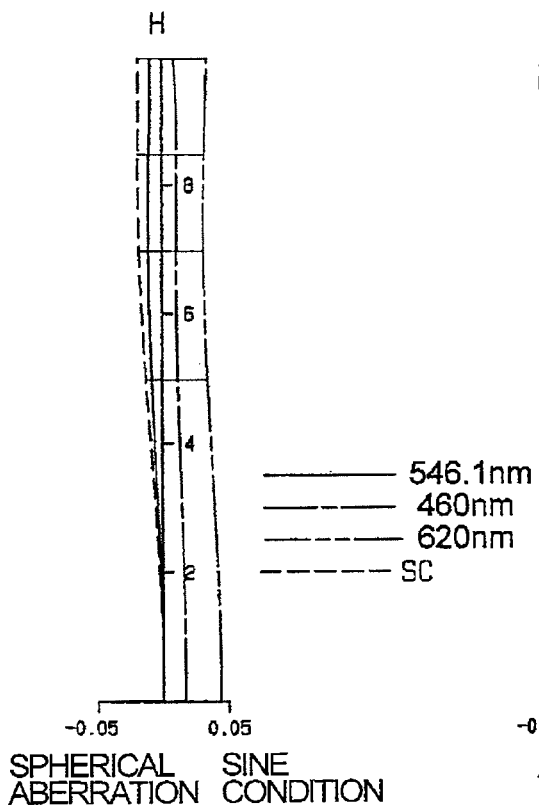
FIG.32A
FIG.32B
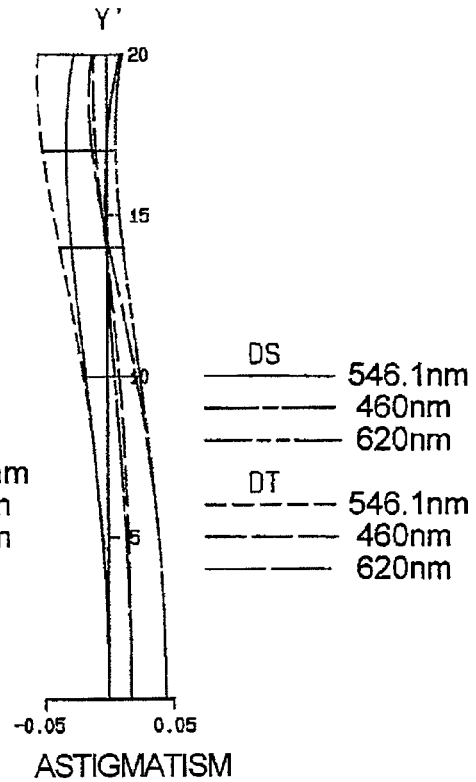
FIG.32C
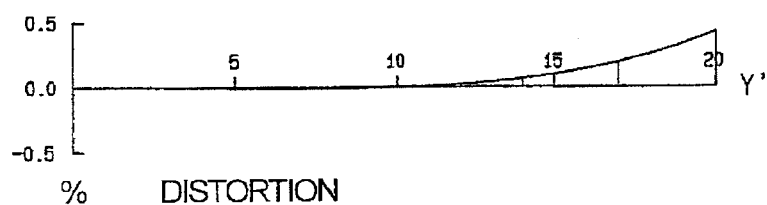
FIG.32D
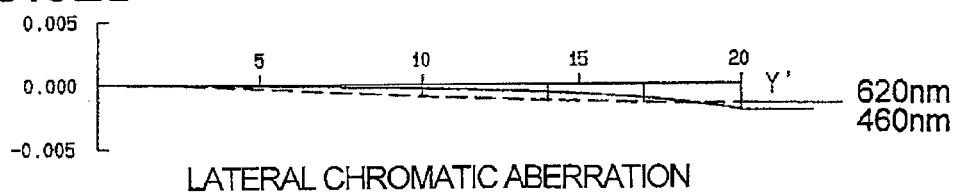

EX4 (M)
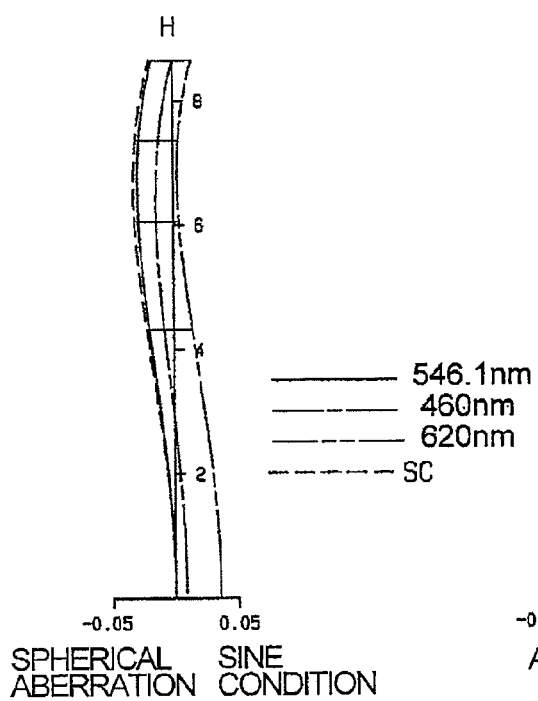
FIG. 33A
FIG. 33B
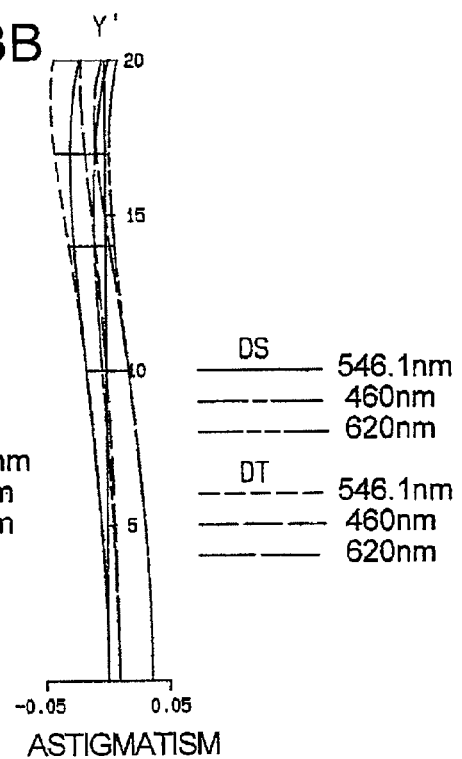
FIG. 33C
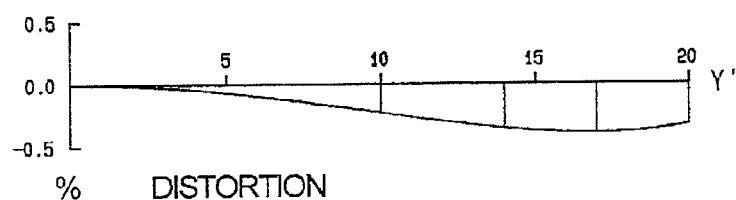
FIG. 33D
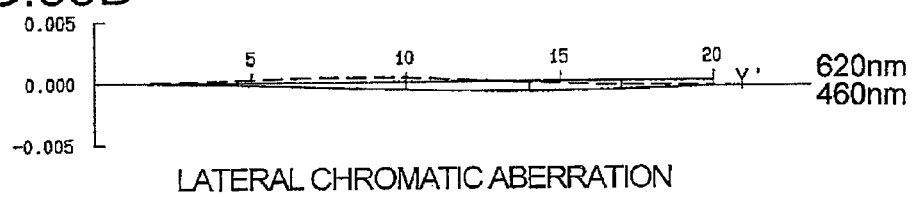

EX4 (W)
FIG.34A  FIG.34B
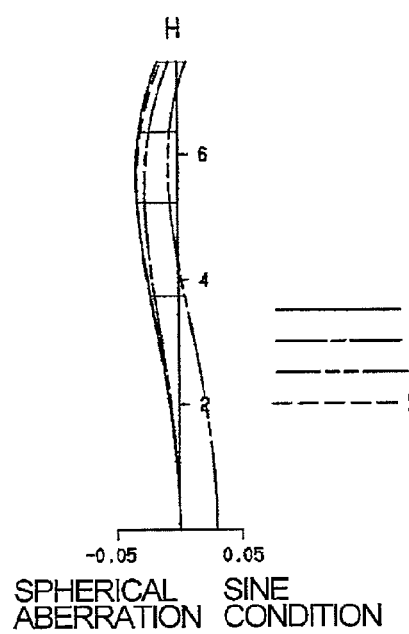
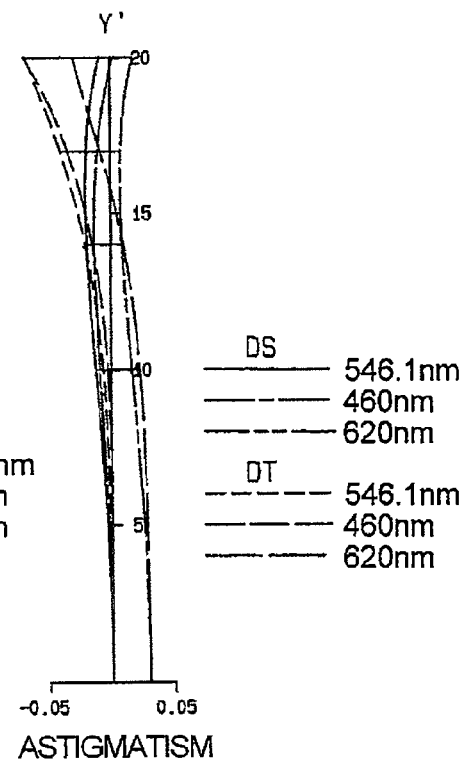
SPHERICAL  SINE
ABERRATION  CONDITION
ASTIGMATISM
FIG.34C
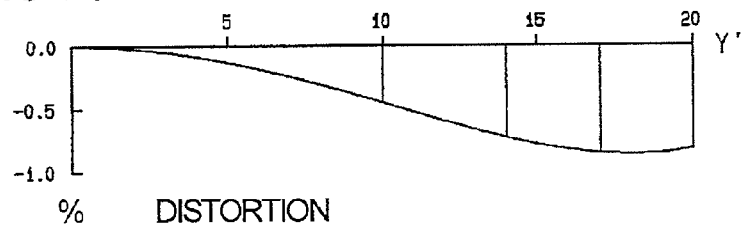
% DISTORTION
FIG.34D
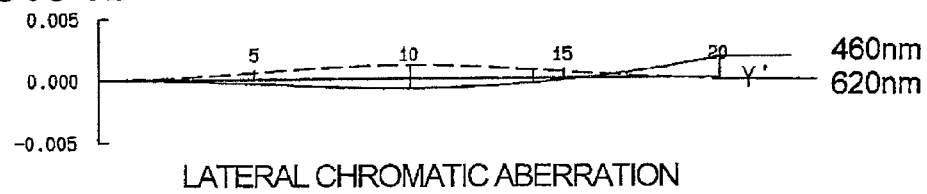
LATERAL CHROMATIC ABERRATION EX5 (T)
FIG.35A
FIG.35B
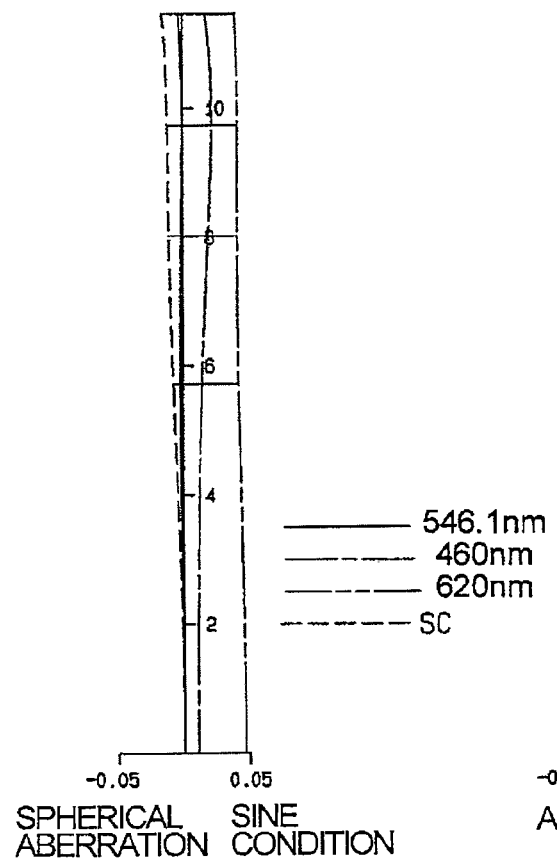
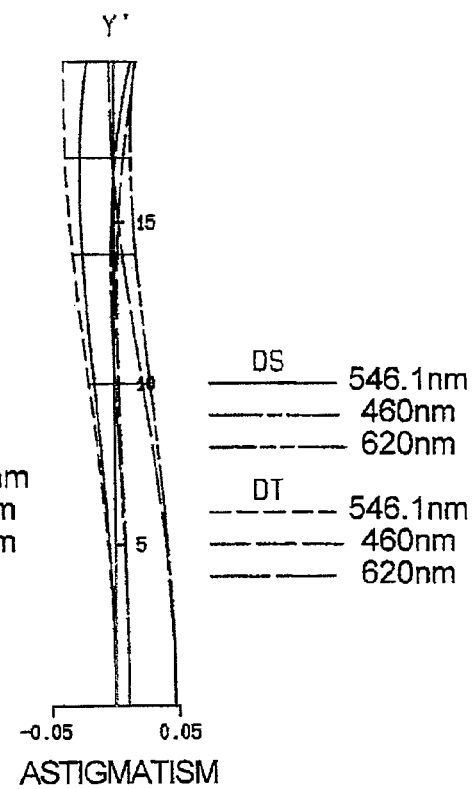
FIG.35C
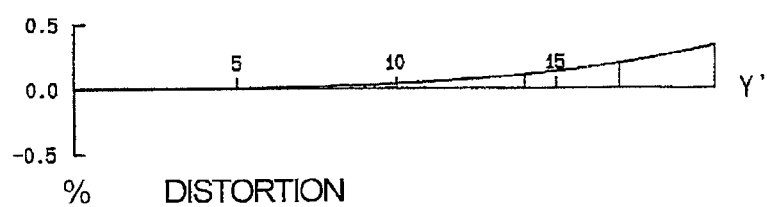
FIG.35D
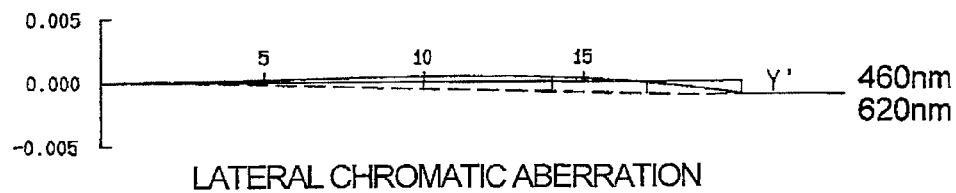

EX5 (M)
FIG.36A
FIG.36B
FIG.36C
FIG.36D
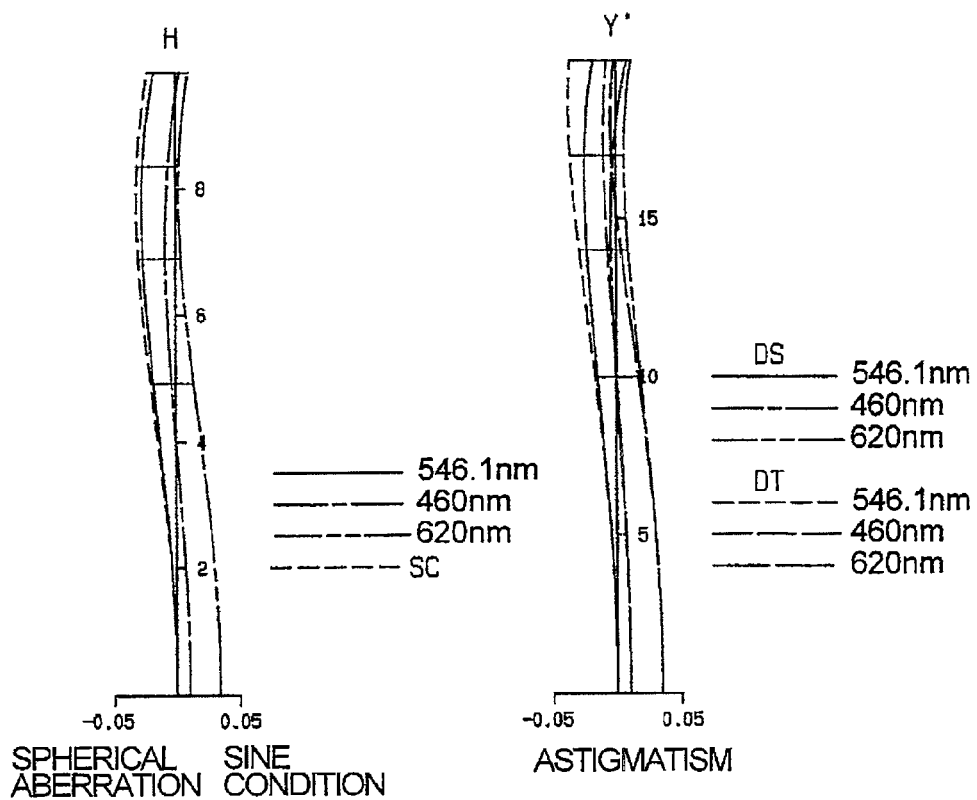
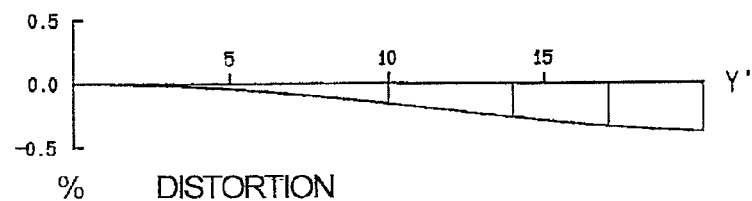
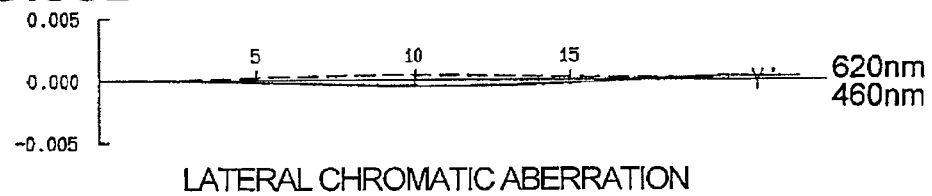

EX5 (W)
FIG.37A
FIG.37B
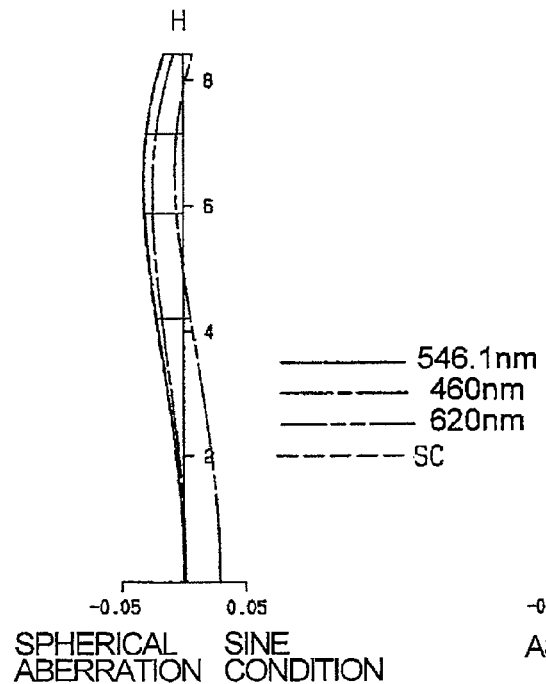
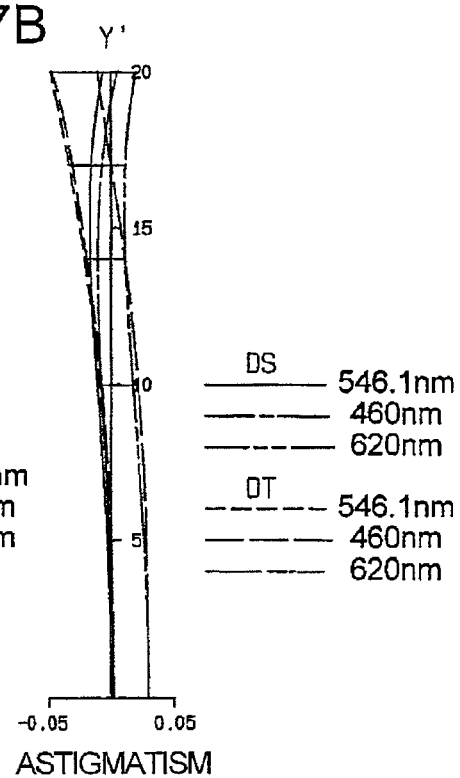
FIG.37C
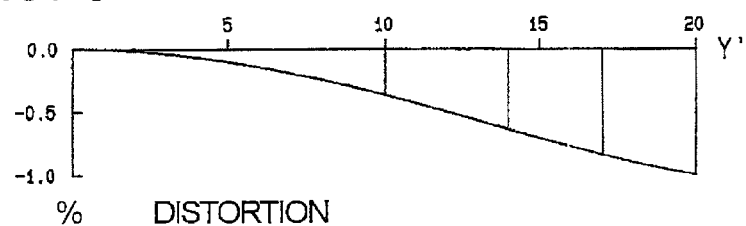
FIG.37D
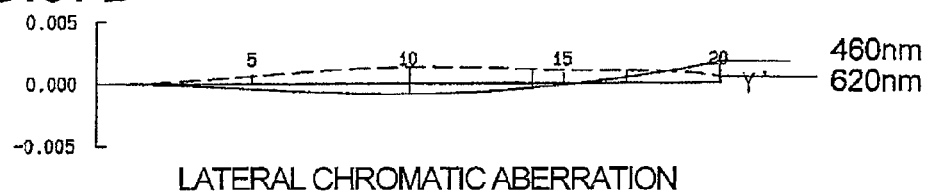

EX6 (T)

SPHERICAL ABERRATION   SINE CONDITION

ASTIGMATISM

% DISTORTION

LATERAL CHROMATIC ABERRATION

EX6 (M)

EX6 (W)

EX7 (T)
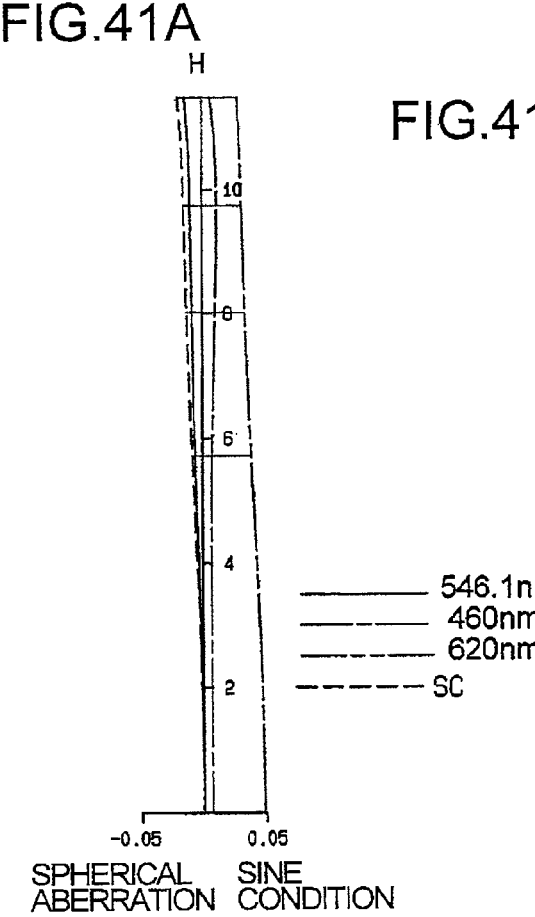
FIG.41A
FIG.41B
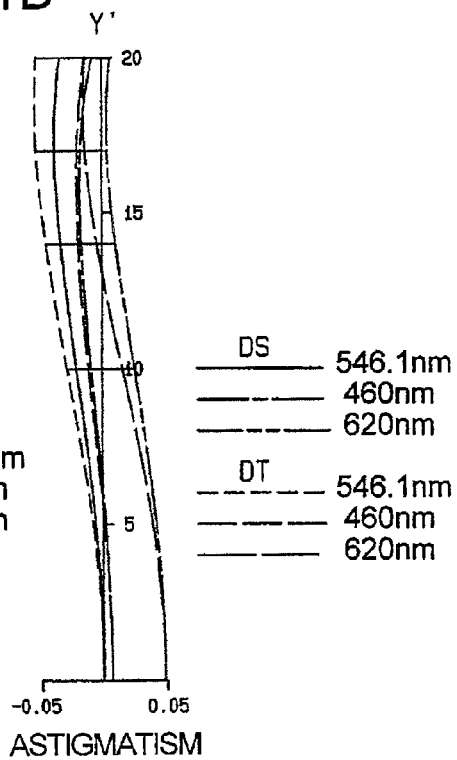
FIG.41C
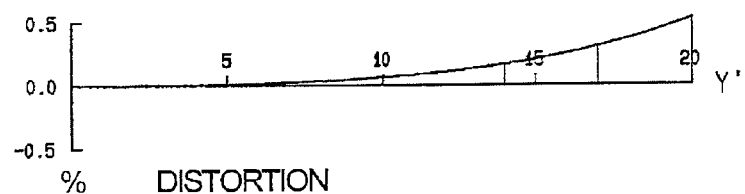
FIG.41D
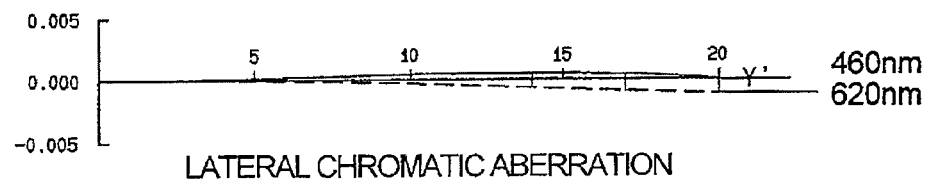

EX7 (M)

SPHERICAL  SINE
ABERRATION  CONDITION

ASTIGMATISM

DISTORTION

LATERAL CHROMATIC ABERRATION

EX7 (W)
FIG.43A FIG.43B
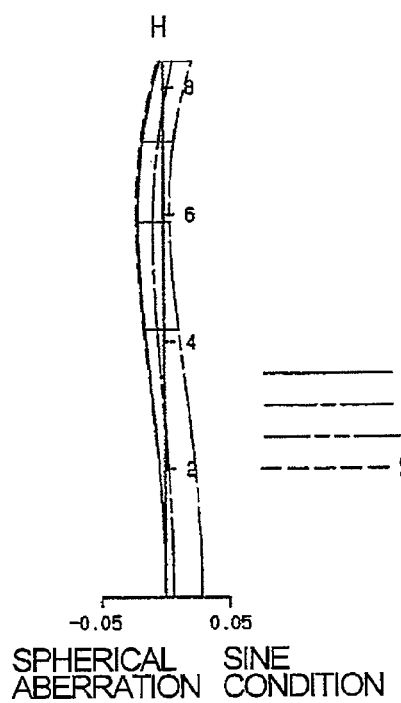
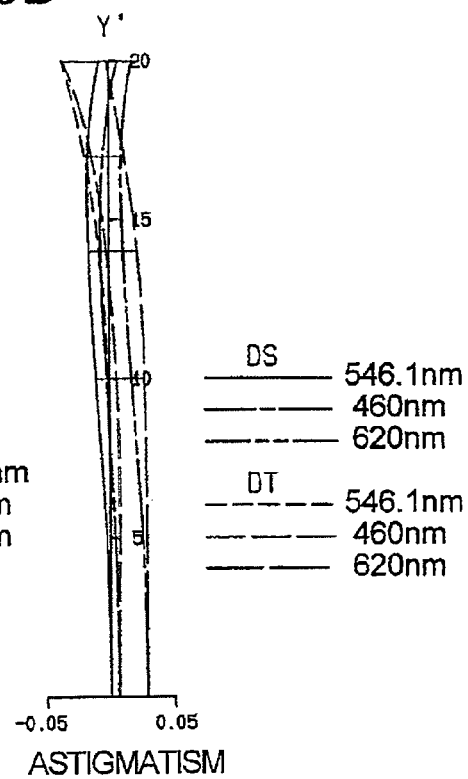
FIG.43C
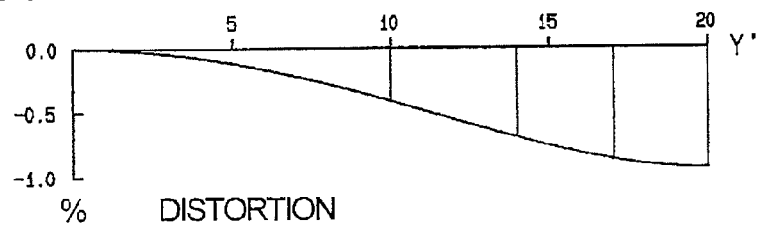
FIG.43D
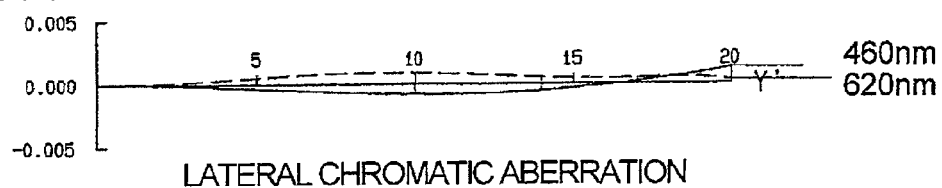

EX8 (T)

EX8 (M)

SPHERICAL  SINE
ABERRATION  CONDITION

ASTIGMATISM

% DISTORTION

LATERAL CHROMATIC ABERRATION

EX8 (W)
FIG.46A  FIG.46B
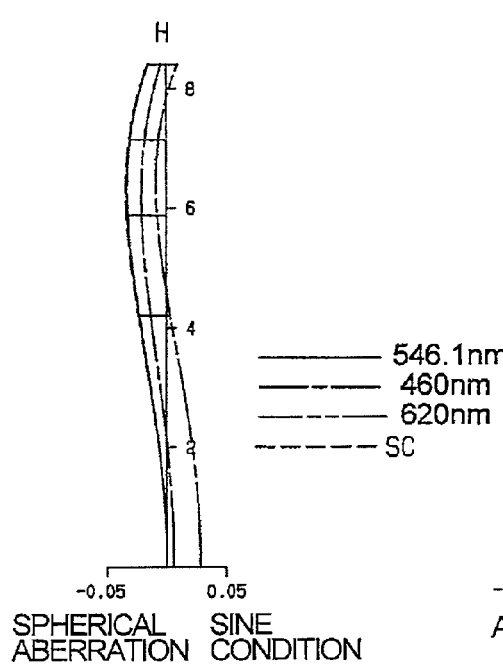
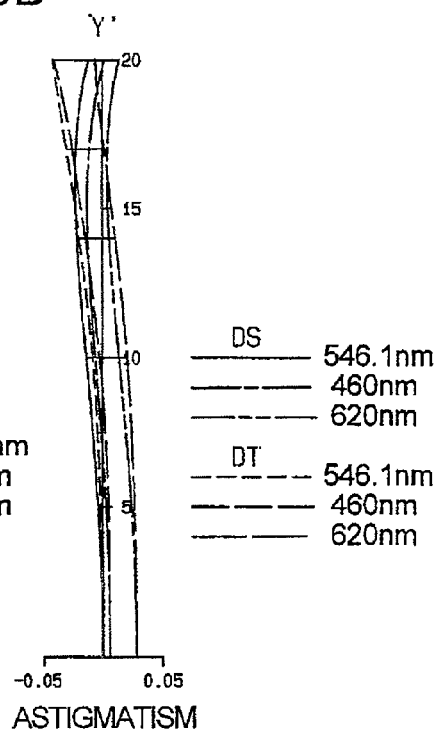
FIG.46C
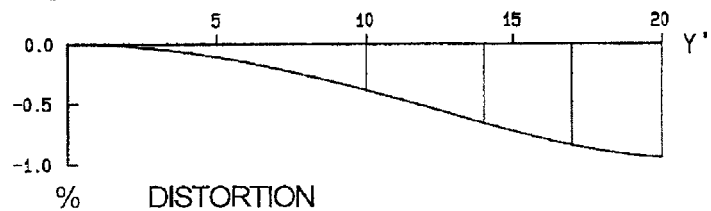
FIG.46D
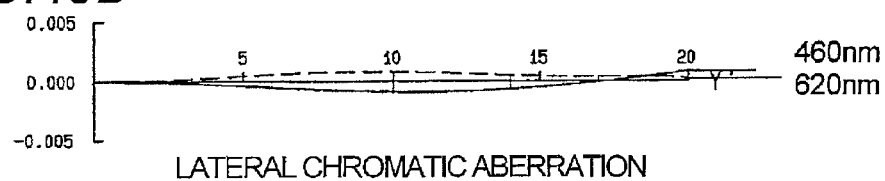

EX9 (T)

SPHERICAL SINE
ABERRATION CONDITION

ASTIGMATISM

% DISTORTION

LATERAL CHROMATIC ABERRATION

EX9 (M)

SPHERICAL SINE
ABERRATION CONDITION

ASTIGMATISM

% DISTORTION

LATERAL CHROMATIC ABERRATION

EX9 (W)

SPHERICAL ABERRATION  SINE CONDITION

ASTIGMATISM

% DISTORTION

LATERAL CHROMATIC ABERRATION

EX10 (T)
FIG.50A  FIG.50B
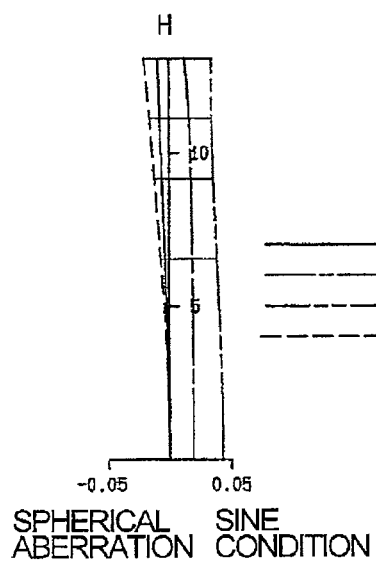
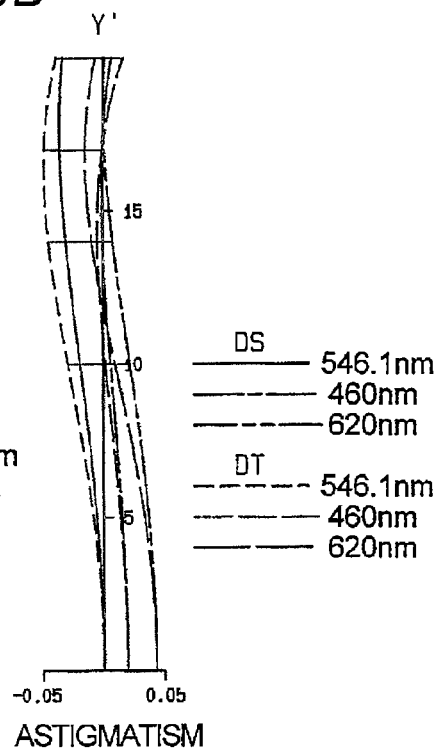
FIG.50C
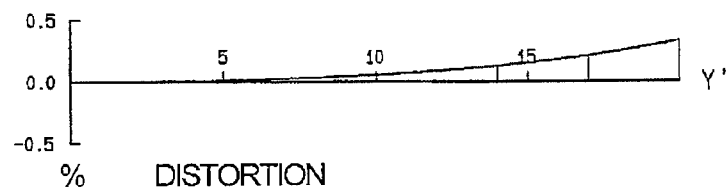
FIG.50D
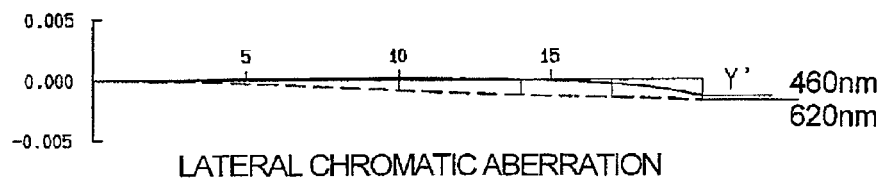

EX10 (M)

EX10 (W)
FIG.52A
FIG.52B
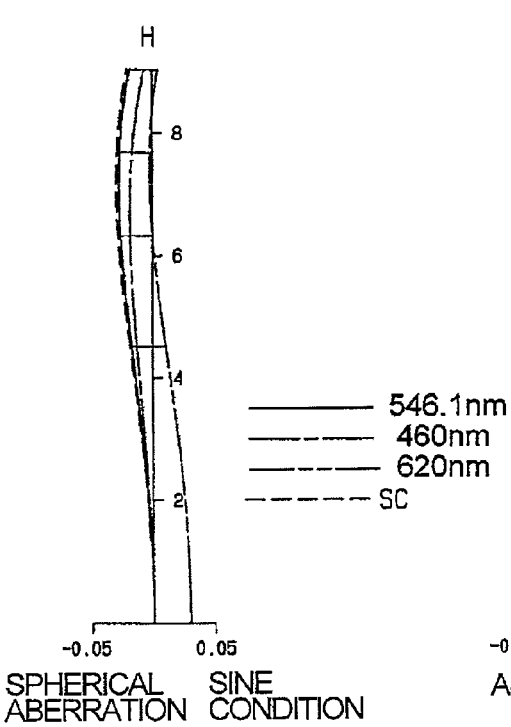
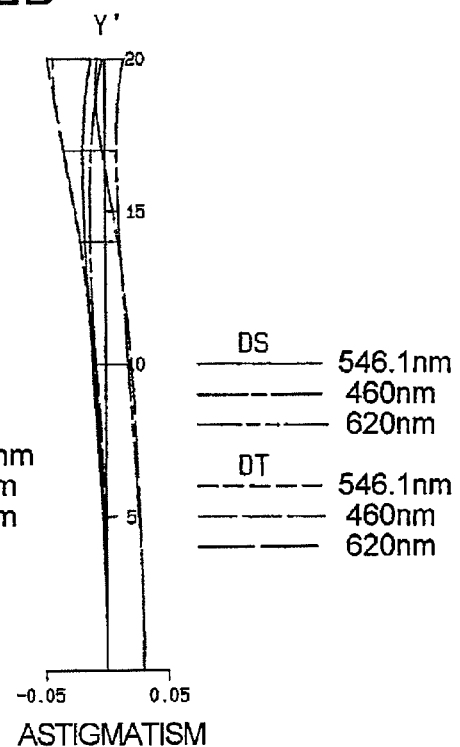
FIG.52C
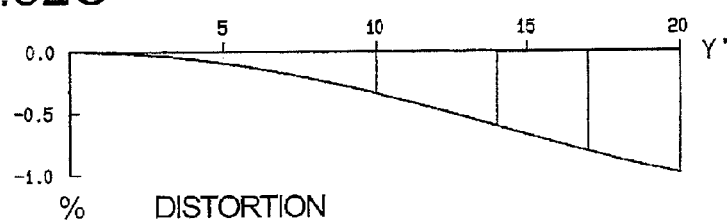
FIG.52D
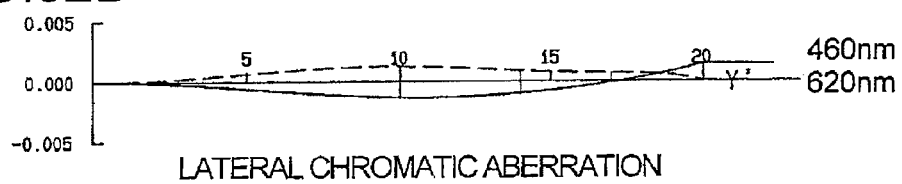

EX11 (T)

SPHERICAL ABERRATION   SINE CONDITION

ASTIGMATISM

% DISTORTION

LATERAL CHROMATIC ABERRATION

EX11 (M)

EX11 (W)
FIG.55A
FIG.55B
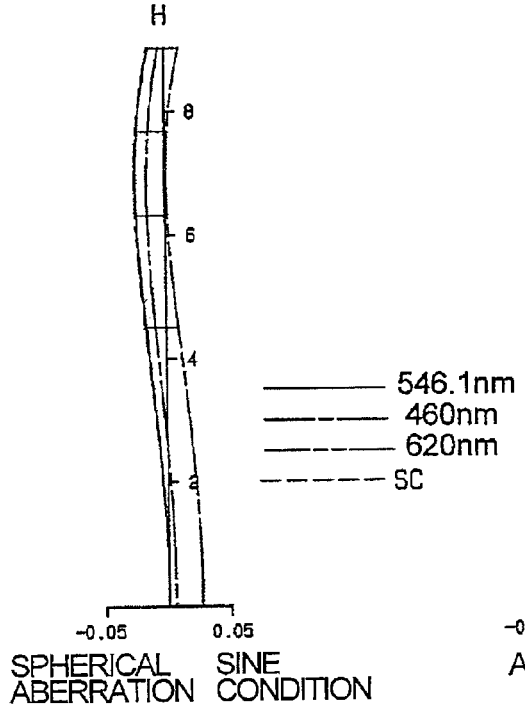
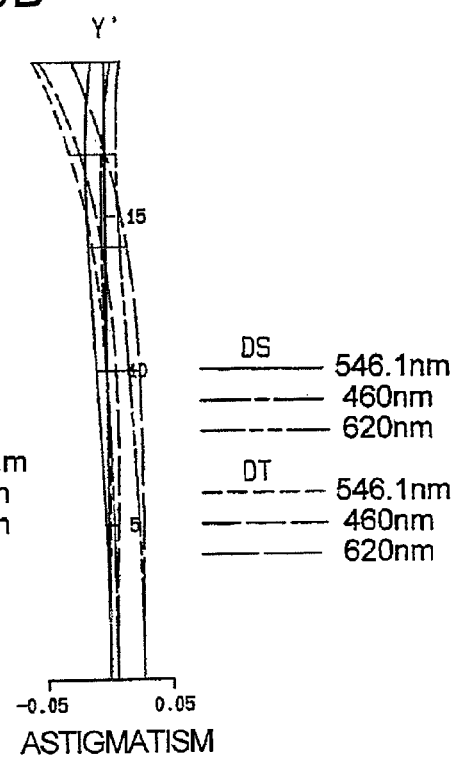
SPHERICAL ABERRATION  SINE CONDITION
ASTIGMATISM
FIG.55C
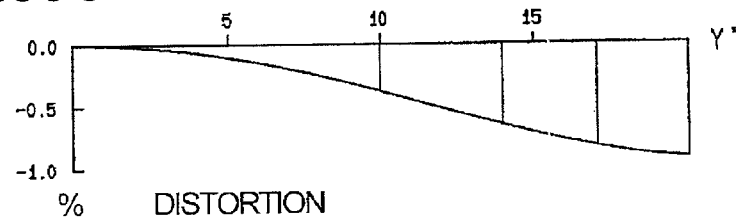
% DISTORTION
FIG.55D
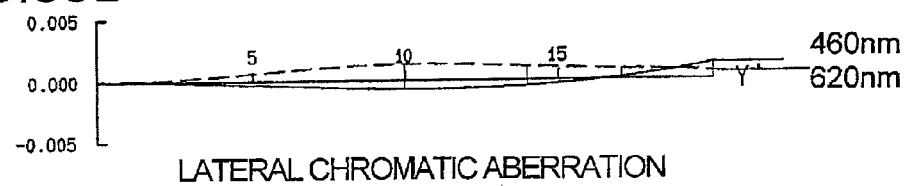
LATERAL CHROMATIC ABERRATION

PROJECTION LENS SYSTEM AND PROJECTOR

RELATED APPLICATIONS

This is a U.S. national stage of International application No. PCT/JP2011/074505 filed on Oct. 25, 2011.

This patent application claims the priority of Japanese application no. 2010-242288 filed Oct. 28, 2010, the disclosure content of which is hereby incorporated by reference.

TECHNICAL FIELD

The present invention relates to projection lens systems and projectors. More particularly, the present invention relates to projection lens systems that have a zooming capability suitable for projection of an image displayed on an image display device such as a digital micromirror device or an LCD (liquid crystal display) onto a screen on an enlarged scale, and to projectors provided with such a projection lens system.

BACKGROUND ART

As a projection lens system for projectors having a zooming capability, Patent Document 1 listed below proposes one aimed at correcting lateral chromatic aberration satisfactorily. In the projection lens system, a group with a positive optical power that is arranged on the enlargement side of an aperture stop and that includes anomalous dispersion glass is moved greatly backward (that is toward the aperture stop) from the telephoto end to the wide-angle end so as to correct lateral chromatic aberration while maintaining telecentricty.

LIST OF CITATIONS

Patent Literature

Patent Document 1: Japanese Patent Application Publication No. 2010-8797

SUMMARY OF INVENTION

Technical Problem

With the recent development of high-resolution image display devices (with each pixel about half as large as before), projection lens systems are now required to have about twice as high definition as before. Accordingly, with conventional techniques such as that proposed in Patent Document 1, in particular in projection lens systems with high zoom ratios, the variation in curvature of field that results from the movement of groups (from the telephoto end through the middle position to the wide-angle end) is no longer tolerable. Also demanded is about half as large lateral chromatic aberration as before. Thus, with conventional techniques, it is difficult to obtain sufficient optical performance (in terms of lateral chromatic aberration, curvature of field, etc.) to cope with recent image display devices which provide high resolution over a wide zooming range.

Devised against the background discussed above, the present invention aims to provide a projection lens system that can cope with high-resolution image display devices and that offers greatly improved aberration performance in terms of lateral chromatic aberration, curvature of field, etc., and to provide a projector employing such a projection lens system.

Solution to Problem

To achieve the above object, according to a first aspect of the invention, a projection lens system of a five- or six-group design which achieves zooming by varying the distances between the groups is characterized in that: the most enlargement-side group has a negative optical power, and the most reduction-side group has a positive optical power; when the group having the largest movement amount during zooming is referred to as the $\alpha$-th group and the group located next to the $\alpha$-th group and having the second largest movement amount during zooming is referred to as the $\beta$-th group, the composite optical power of the $\alpha$-th and $\beta$-th groups is constantly positive; when the $\alpha$-th and $\beta$-th groups are together considered a single component referred to as the $(\alpha+\beta)$ component, the group next to the $(\alpha+\beta)$ component on its enlargement side is referred to as the $\gamma$-th group, and the group next to the $(\alpha+\beta)$ component on its reduction side is referred to as the $\delta$-th group, at least one of the $\gamma$-th and $\delta$-th groups moves during zooming, and an aperture stop is arranged on the reduction side of the $(\alpha+\beta)$ component; during zooming from the telephoto end to the wide-angle end through a predetermined middle position that fulfills conditional formula (0) below, while the most enlargement-side and most reduction-side groups remain stationary, the $\alpha$-th and $\beta$-th groups move from the enlargement side to the reduction side, and conditional formulae (X1A), (X1B), (X2A), (X2B), (X3A), and (X3B) below are fulfilled:

$$0.99 < fm/(ft \times fw)^{1/2} < 1.01 \tag{0}$$

$$7 < \Delta TM\alpha/|\Delta TM\gamma\delta| \tag{X1A}$$

$$7 < \Delta TW\alpha/|\Delta TW\gamma\delta| \tag{X1B}$$

$$7 < \Delta TM\beta/|\Delta TM\gamma\delta| \tag{X2A}$$

$$7 < \Delta TW\beta/|\Delta TW\gamma\delta| \tag{X2B}$$

$$0.9 < \Delta TM\beta/\Delta TM\alpha \le 1 \tag{X3A}$$

$$0.9 < \Delta TW\beta/\Delta TW\alpha \le 1 \tag{X3B}$$

where
- ft represents a focal length of the entire system at the telephoto end;
- fm represents a focal length of the entire system at the middle position;
- fw represents a focal length of the entire system at the wide-angle end;
- $\Delta TM\alpha$ represents a movement amount of the $\alpha$-th group from the telephoto end to the middle position;
- $\Delta TM\beta$ represents a movement amount of the $\beta$-th group from the telephoto end to the middle position;
- $\Delta TM\gamma\delta$ represents the larger of movement amounts of the $\gamma$-th and $\delta$-th groups from the telephoto end to the middle position;
- $\Delta TW\alpha$ represents a movement amount of the $\alpha$-th group from the telephoto end to the wide-angle end;
- $\Delta TW\beta$ represents a movement amount of the $\beta$-th group from the telephoto end to the wide-angle end; and
- $\Delta TW\gamma\delta$ represents the larger of movement amounts of the $\gamma$-th and $\delta$-th groups from the telephoto end to the wide-angle end.

According to a second aspect of the invention, the projection lens system according to the first aspect described above is further characterized in that conditional formulae (4) and (5) below are fulfilled:

$$20 < |exp/ft| \quad (4)$$

$$1.3 < ft/fw \quad (5)$$

where
  exp represents the paraxial exit pupil position with respect to the reduction-side paraxial image plane (that is, the distance from the reduction-side paraxial image plane to the paraxial exit pupil).

According to a third aspect of the invention, the projection lens system according to the first or second aspect described above is further characterized in that, with respect to zooming from the telephoto end through the middle position to the wide-angle end, conditional formula (X6) below is fulfilled:

$$0.001 < (XLmax - XLmin)/\Delta TW\alpha < 0.040 \quad (X6)$$

where
  XLmax represents the maximum distance between the α-th and β-th groups among the distances between them at the telephoto end, the middle position, and the wide-angle end; and
  XLmin represents the minimum distance between the α-th and β-th groups among the distances between them at the telephoto end, the middle position, and the wide-angle end.

According to a fourth aspect of the invention, the projection lens system according to any of the first to third aspects described above is further characterized in that one or both of the α-th and β-th groups include a positive lens element, only one of the α-th and β-th groups includes a negative lens element, the total number of lens elements constituting the α-th and β-th groups is three or four, and at least one of the positive lens element is formed of a lens material that fulfills conditional formula (7) below:

$$0.652 < Pg,F + 0.00181 \times vd \quad (7)$$

where
  Pg,F represents the partial dispersion ratio of the lens material; and
  vd represents the Abbe number of the lens material.

According to a fifth aspect of the invention, the projection lens system according to the fourth aspect described above is further characterized in that, with respect to the optical power of the group that includes the negative lens element, conditional formula (8) below is fulfilled:

$$\Phi n/\Phi w < 0.1 \quad (8)$$

where
  Φn represents the optical power of the group that includes the negative lens element; and
  Φw represents the optical power of the entire system at the wide-angle end.

According to a sixth aspect of the invention, the projection lens system according to any of the first to fifth aspects described above is further characterized in that the most enlargement-side group includes at least one negative lens element that is formed of a lens material that fulfills conditional formula (7) below:

$$0.652 < Pg,F + 0.00181 \times vd \quad (7)$$

where
  Pg,F represents the partial dispersion ratio of the lens material; and
  vd represents the Abbe number of the lens material.

According to a seventh aspect of the invention, the projection lens system according to any of the first to sixth aspects described above is further characterized in that the most enlargement-side lens element in the δ-th group is a negative lens element that fulfills conditional formula (7) below:

$$0.652 < Pg,F + 0.00181 \times vd \quad (7)$$

where
  Pg,F represents the partial dispersion ratio of the lens material; and
  vd represents the Abbe number of the lens material.

According to an eighth aspect of the invention, the projection lens system according to any one of the first to seventh aspects described above is further characterized in that, with respect to the composite optical power of the α-th and β-th groups, conditional formulae (X9A) and (X9B) are fulfilled:

$$0.9 < \Phi\alpha\beta W/\Phi\alpha\beta T < 1.1 \quad (X9A)$$

$$0.9 < \Phi\alpha\beta M/\Phi\alpha\beta T < 1.1 \quad (X9B)$$

where
  ΦαβT represents the composite optical power of the α-th and β-th groups at the telephoto end;
  ΦαβM represents the composite optical power of the α-th and β-th groups at the middle position; and
  ΦαβW represents the composite optical power of the α-th and β-th groups at the wide-angle end.

According to a ninth aspect of the invention, a projection lens system of a five-group design that comprises, from the enlargement side, a first group having a negative optical power, a second group having a positive optical power, a third group, a fourth group, and a fifth group having a positive optical power and that achieves zooming by varying distances between the groups is characterized in that: an aperture stop is arranged on the reduction side of the most reduction-side lens element in the fourth group; during zooming from the telephoto end to the wide-angle end through a predetermined middle position that fulfills conditional formula (0) below, the first and fifth groups remain stationary, the composite optical power of the third and fourth groups is constantly positive, the third and fourth groups move from the enlargement side to the reduction side, and conditional formulae (1A), (1B), (2A), (2B), (3A), and (3B) are fulfilled:

$$0.99 < fm/(ft \times fw)^{1/2} < 1.01 \quad (0)$$

$$7 < |\Delta TM3/|\Delta TM2| \quad (1A)$$

$$7 < |\Delta TW3/|\Delta TW2| \quad (1B)$$

$$7 < |\Delta TM4/|\Delta TM2| \quad (2A)$$

$$7 < |\Delta TW4/|\Delta TW2| \quad (2B)$$

$$0.9 < \Delta TM4/\Delta TM3 < 1.1 \quad (3A)$$

$$0.9 < \Delta TW4/\Delta TW3 < 1.1 \quad (3B)$$

where
  ft represents the focal length of the entire system at the telephoto end;
  fm represents the focal length of the entire system at the middle position;
  fw represents the focal length of the entire system at the wide-angle end;
  ΔTM2 represents the movement amount of the second group from the telephoto end to the middle position;
  ΔTM3 represents the movement amount of the third group from the telephoto end to the middle position;

ΔTM4 represents the movement amount of the fourth group from the telephoto end to the middle position;
ΔTW2 represents the movement amount of the second group from the telephoto end to the wide-angle end;
ΔTW3 represents the movement amount of the third group from the telephoto end to the wide-angle end; and
ΔTW4 represents the movement amount of the fourth group from the telephoto end to the wide-angle end.

According to a tenth aspect of the invention, the projection lens system according to the ninth aspect described above is further characterized in that the aperture stop is stationarily arranged in the fifth group, and conditional formulae (4) and (5) below are fulfilled:

$$20 < |\exp/ft| \tag{4}$$

$$1.3 < ft/fw \tag{5}$$

where
  exp represents the paraxial exit pupil position with respect to the reduction-side paraxial image plane (that is, the distance from the reduction-side paraxial image plane to the paraxial exit pupil).

According to an eleventh aspect of the invention, the projection lens system according to the ninth or tenth aspect described above is further characterized in that, when the distance from the lens surface located at the most reduction-side position in the third group to the lens surface located at the most enlargement-side position in the fourth group is referred to as the third-to-fourth-group distance, with respect to zooming from the telephoto end through the middle position to the wide-angle end, conditional formula (6) below is fulfilled:

$$0.001 < (Lmax - Lmin)/\Delta zm < 0.040 \tag{6}$$

where
  Lmax represents the maximum value of the third-to-fourth-group distance among the values thereof at the telephoto end, the middle position, and the wide-angle end;
  Lmin represents the minimum value of the third-to-fourth-group distance among the values thereof at the telephoto end, the middle position, and the wide-angle end; and
  Δzm represents the larger of ΔTW3 and ΔTW4.

According to a twelfth aspect of the invention, the projection lens system according to any of the ninth to eleventh aspects described above is further characterized in that one or both of the third and fourth groups include a positive lens element, only one of the third and fourth groups includes a negative lens element, the total number of lens elements constituting the third and fourth groups is three or four, and at least one of the positive lens element fulfills conditional formula (7) below:

$$0.652 < Pg,F + 0.00181 \times vd \tag{7}$$

where
  Pg,F represents the partial dispersion ratio of the lens material; and
  vd represents the Abbe number of the lens material.

According to a thirteenth aspect of the invention, the projection lens system according to the twelfth aspect described above is further characterized in that, with respect to the optical power of the group that includes the negative lens element, conditional formula (8) below is fulfilled:

$$\Phi n/\Phi w < 0.1 \tag{8}$$

where
  Φn represents the optical power of the group that includes the negative lens element; and
  Φw represents the optical power of the entire system at the wide-angle end.

According to a fourteenth aspect of the invention, the projection lens system according to any of the ninth to thirteenth aspects described above is further characterized in that the second group includes two or less lens elements.

According to a fifteenth aspect of the invention, the projection lens system according to any one the ninth to fourteenth aspect described above is further characterized in that the first group includes at least one negative lens element that is formed of a lens material that fulfills conditional formula (7) below:

$$0.652 < Pg,F + 0.00181 \times vd \tag{7}$$

where
  Pg,F represents the partial dispersion ratio of the lens material; and
  vd represents the Abbe number of the lens material.

According to a sixteenth aspect of the invention, the projection lens system according to any of the ninth to fifteenth aspect described above is further characterized in that the most enlargement-side lens element in the fifth group is a negative lens element that fulfills conditional formula (7) below:

$$0.652 < Pg,F + 0.00181 \times vd \tag{7}$$

where
  Pg,F represents the partial dispersion ratio of the lens material; and
  vd represents the Abbe number of the lens material.

According to a seventeenth aspect of the invention, the projection lens system according to any one of the ninth to sixteenth aspect described above is further characterized in that, with respect to the composite optical power of the third and fourth groups, conditional formulae (9A) and (9B) below are fulfilled:

$$0.9 < \Phi 34W/\Phi 34T < 1.1 \tag{9A}$$

$$0.9 < \Phi 34M/\Phi 34T < 1.1 \tag{9B}$$

where
  Φ34T represents the composite optical power of the third and fourth groups at the telephoto end;
  Φ34M represents the composite optical power of the third and fourth groups at the middle position; and
  Φ34W represents the composite optical power of the third and fourth groups at the wide-angle end.

According to an eighteenth aspect of the invention, the projection lens system according to any of the ninth to seventeenth aspects described above is further characterized in that the third and fourth groups have different movement loci.

According to a nineteenth aspect of the invention, a projector is characterized by the provision of an image display device for displaying an image, a light source, an illumination optical system for directing light from the light source to the image display device, and the projection lens system according to any one of the first to eighteenth aspects described above for projecting the image displayed on the image display device onto a screen surface on an enlarged scale.

Advantageous Effects of the Invention

According to the present invention, owing to the adoption of a construction where, among others, the movement amounts of the α-th and β-th groups (for example, the third and fourth groups) during zooming fulfill predetermined conditions, it is possible to cope with high-resolution image display devices, and it is possible to obtain high performance with greatly improved aberration performance in terms of lateral chromatic aberration, curvature of field, etc.

BRIEF DESCRIPTION OF DRAWINGS

FIG. 12 is an optical path diagram of the first embodiment (Example 1);
FIG. 13 is an optical path diagram of the second embodiment (Example 2);
FIG. 14 is an optical path diagram of the third embodiment (Example 3);
FIG. 15 is an optical path diagram of the fourth embodiment (Example 4);
FIG. 16 is an optical path diagram of the fifth embodiment (Example 5);
FIG. 17 is an optical path diagram of the sixth embodiment (Example 6);
FIG. 18 is an optical path diagram of the seventh embodiment (Example 7);
FIG. 19 is an optical path diagram of the eighth embodiment (Example 8);
FIG. 20 is an optical path diagram of the ninth embodiment (Example 9);
FIG. 21 is an optical path diagram of the tenth embodiment (Example 10);
FIG. 22 is an optical path diagram of the eleventh embodiment (Example 11);
FIGS. 25A-D are aberrations diagrams of Example 1 at the wide-angle end;
FIGS. 26A-D are aberrations diagrams of Example 2 at the telephoto end;
FIGS. 29A-D are aberrations diagrams of Example 3 at the telephoto end;
FIGS. 31A-D are aberrations diagrams of Example 3 at the wide-angle end;
FIGS. 32A-D are aberrations diagrams of Example 4 at the telephoto end;
FIGS. 33A-D are aberrations diagrams of Example 4 at the middle position;
FIGS. 34A-D are aberrations diagrams of Example 4 at the wide-angle end;
FIGS. 35A-D are aberrations diagrams of Example 5 at the telephoto end;
FIGS. 36A-D are aberrations diagrams of Example 5 at the middle position;
FIGS. 37A-D are aberrations diagrams of Example 5 at the wide-angle end;
FIGS. 41A-D are aberrations diagrams of Example 7 at the telephoto end;
FIGS. 43A-D are aberrations diagrams of Example 7 at the wide-angle end;
FIGS. 46A-D are aberrations diagrams of Example 8 at the wide-angle end;
FIGS. 50A-D are aberrations diagrams of Example 10 at the telephoto end;
FIGS. 52A-D are aberrations diagrams of Example 10 at the wide-angle end;
FIGS. 55A-D are aberrations diagrams of Example 11 at the wide-angle end.

DESCRIPTION OF EMBODIMENTS

Figure 1:
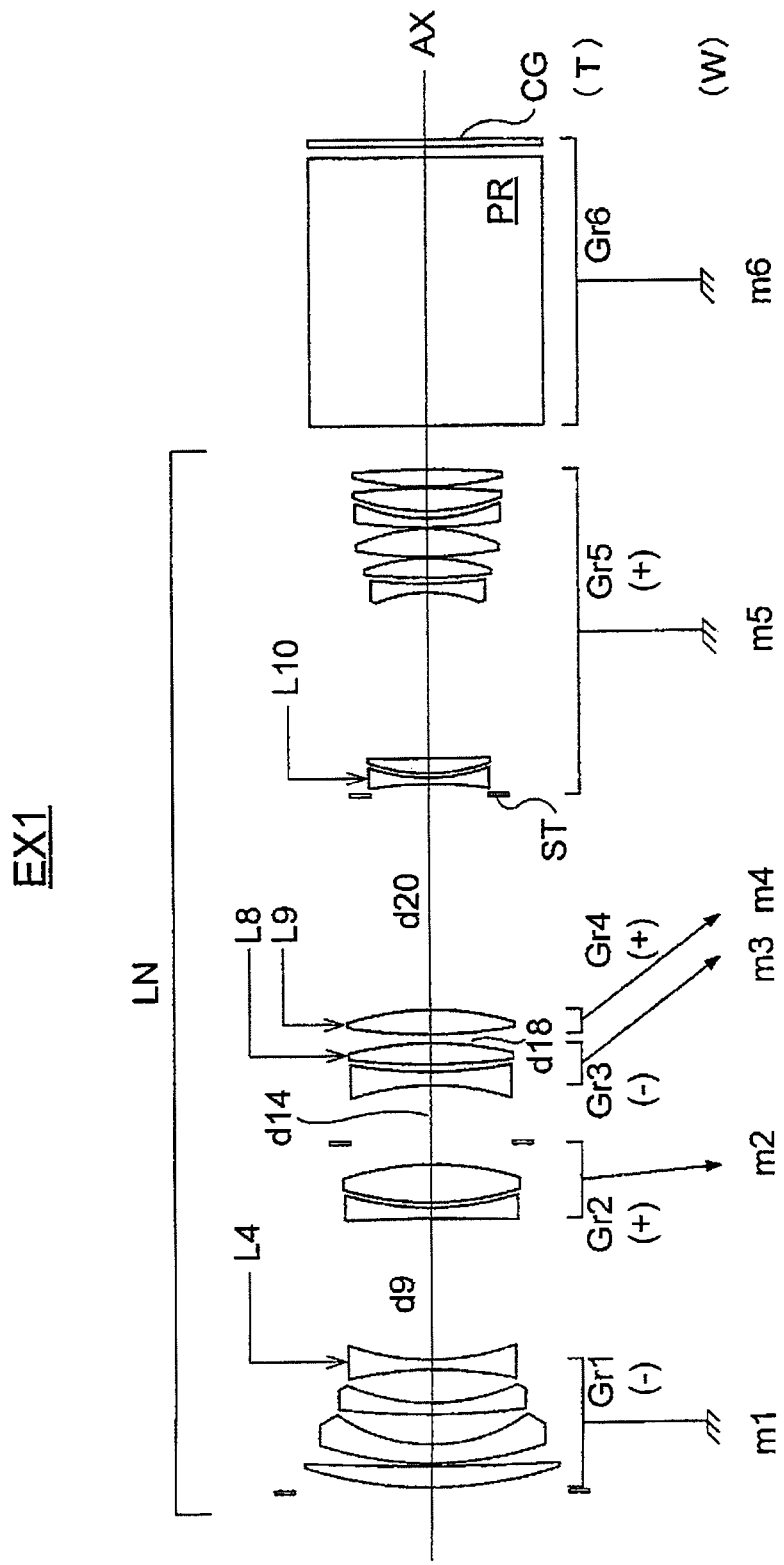
FIG. 1 is an optical construction diagram of a first embodiment (Example 1) of the invention.
Figure 2:
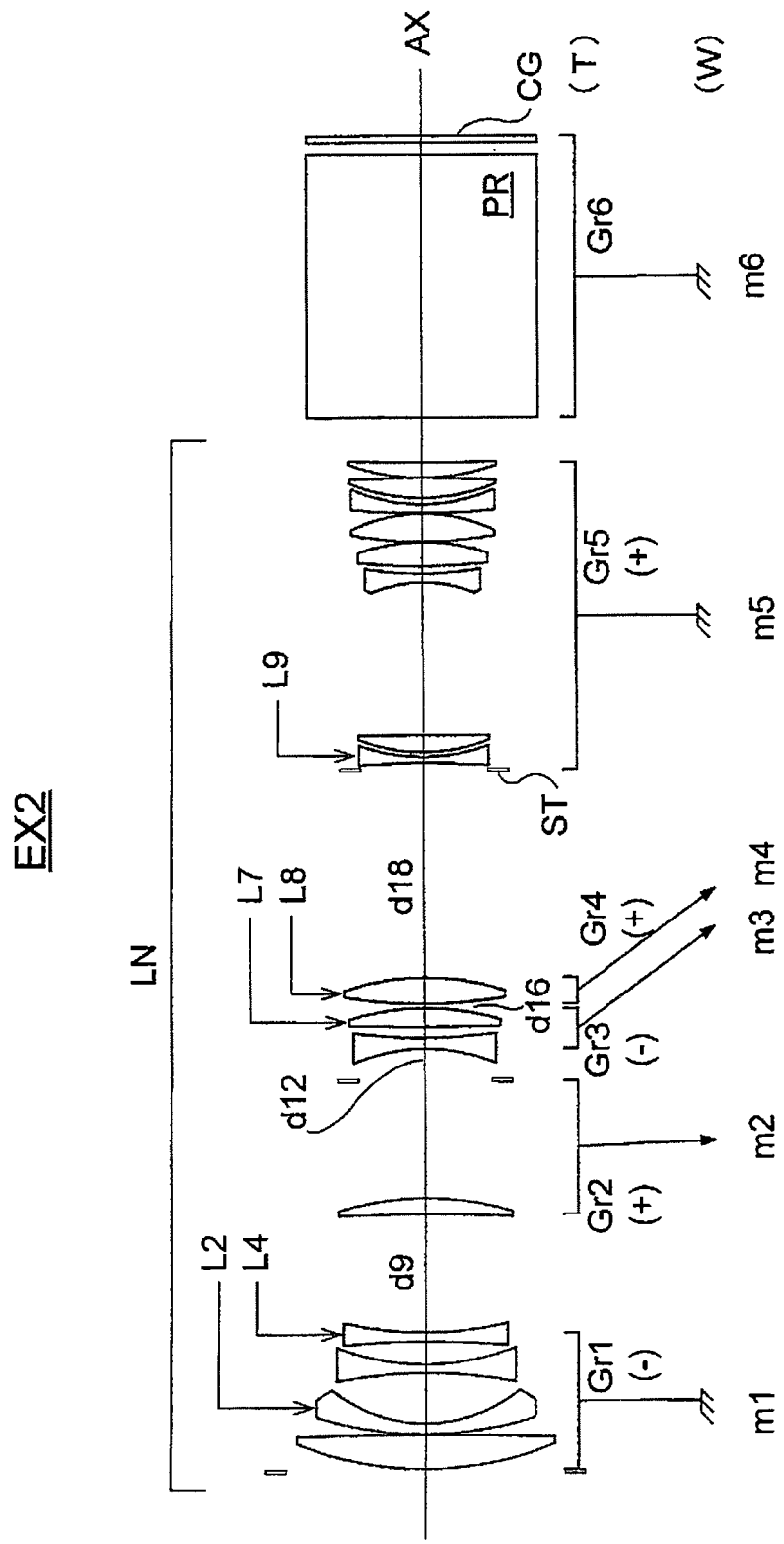
FIG. 2 is an optical construction diagram of a second embodiment (Example 2) of the invention.
Figure 3:
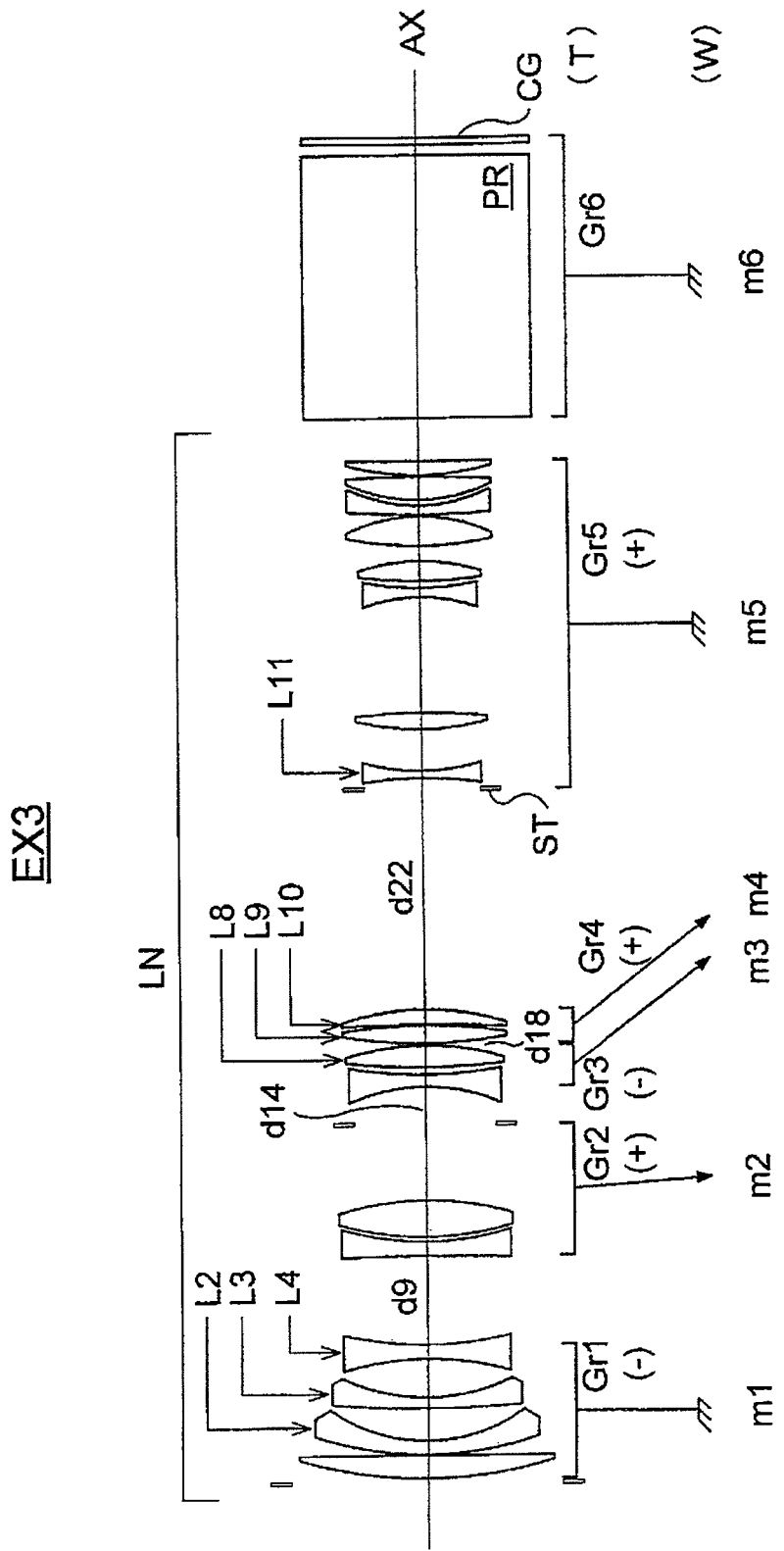
FIG. 3 is an optical construction diagram of a third embodiment (Example 3) of the invention.
Figure 4:
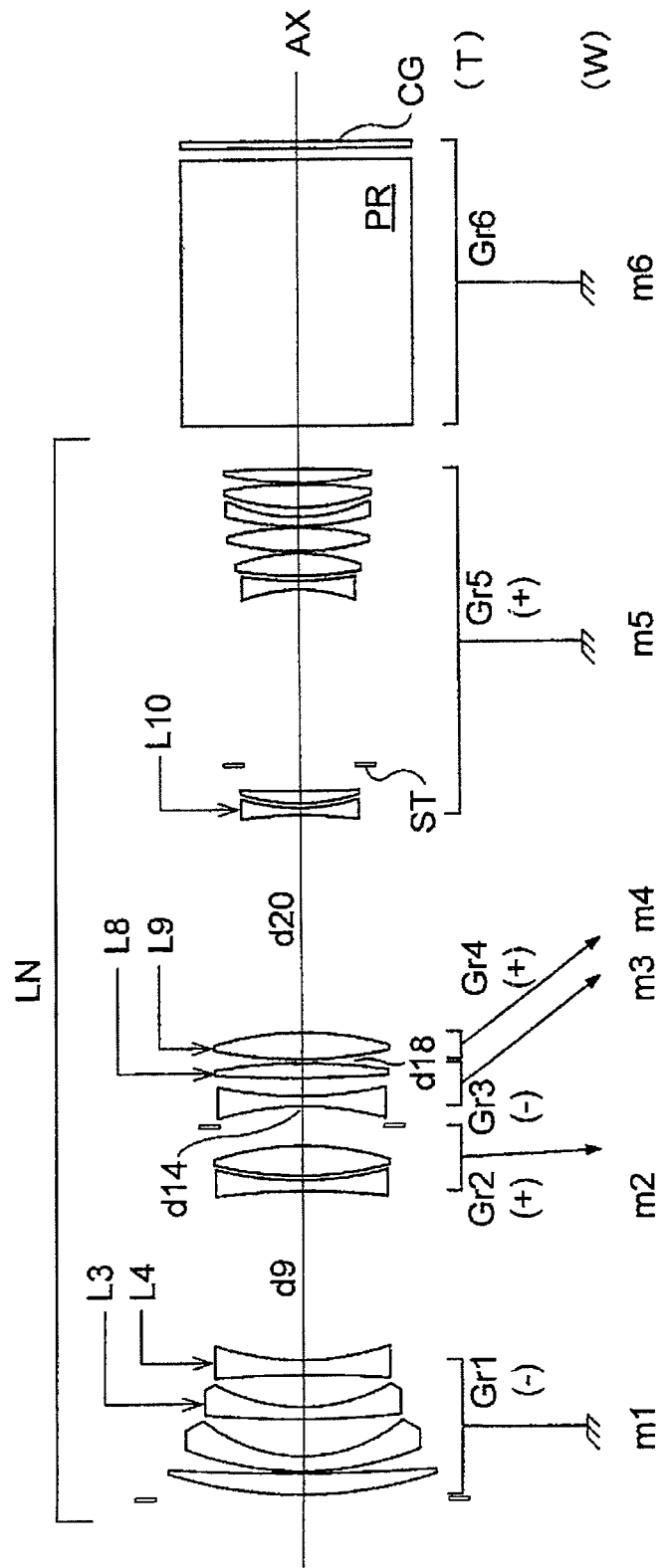
FIG. 4 is an optical construction diagram of a fourth embodiment (Example 4) of the invention.
Figure 5:
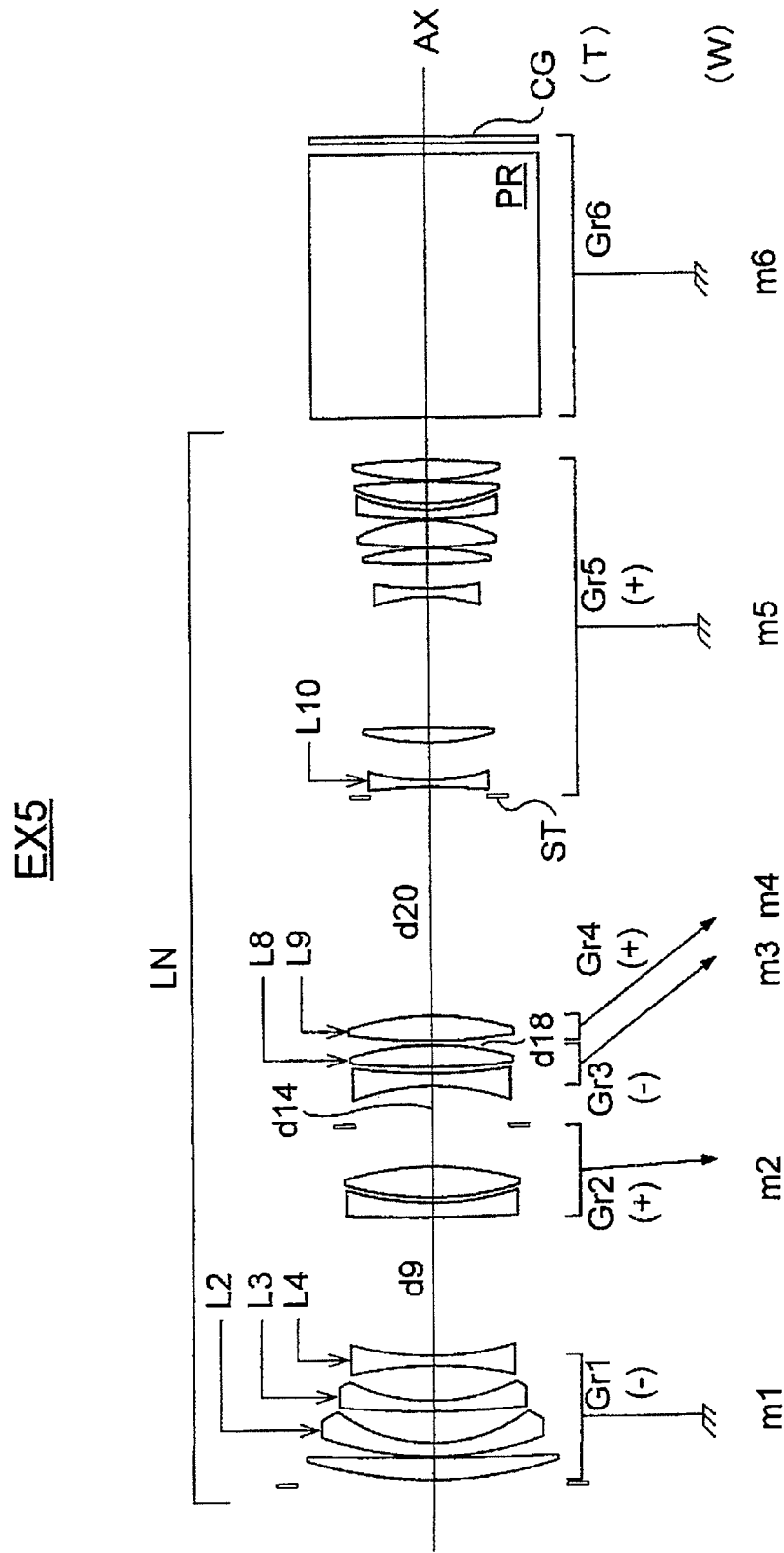
FIG. 5 is an optical construction diagram of a fifth embodiment (Example 5) of the invention.
Figure 6:
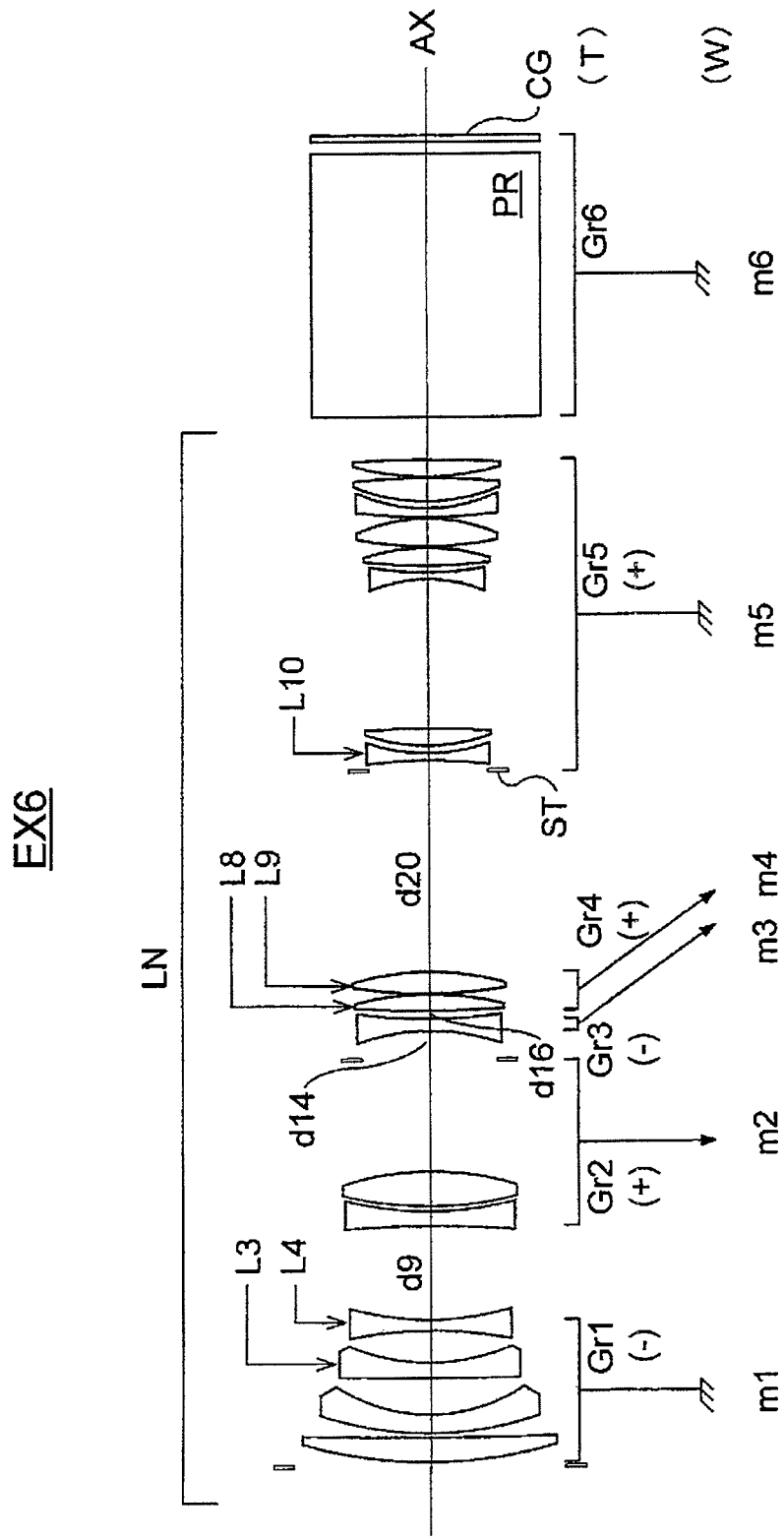
FIG. 6 is an optical construction diagram of a sixth embodiment (Example 6) of the invention.
Figure 7:
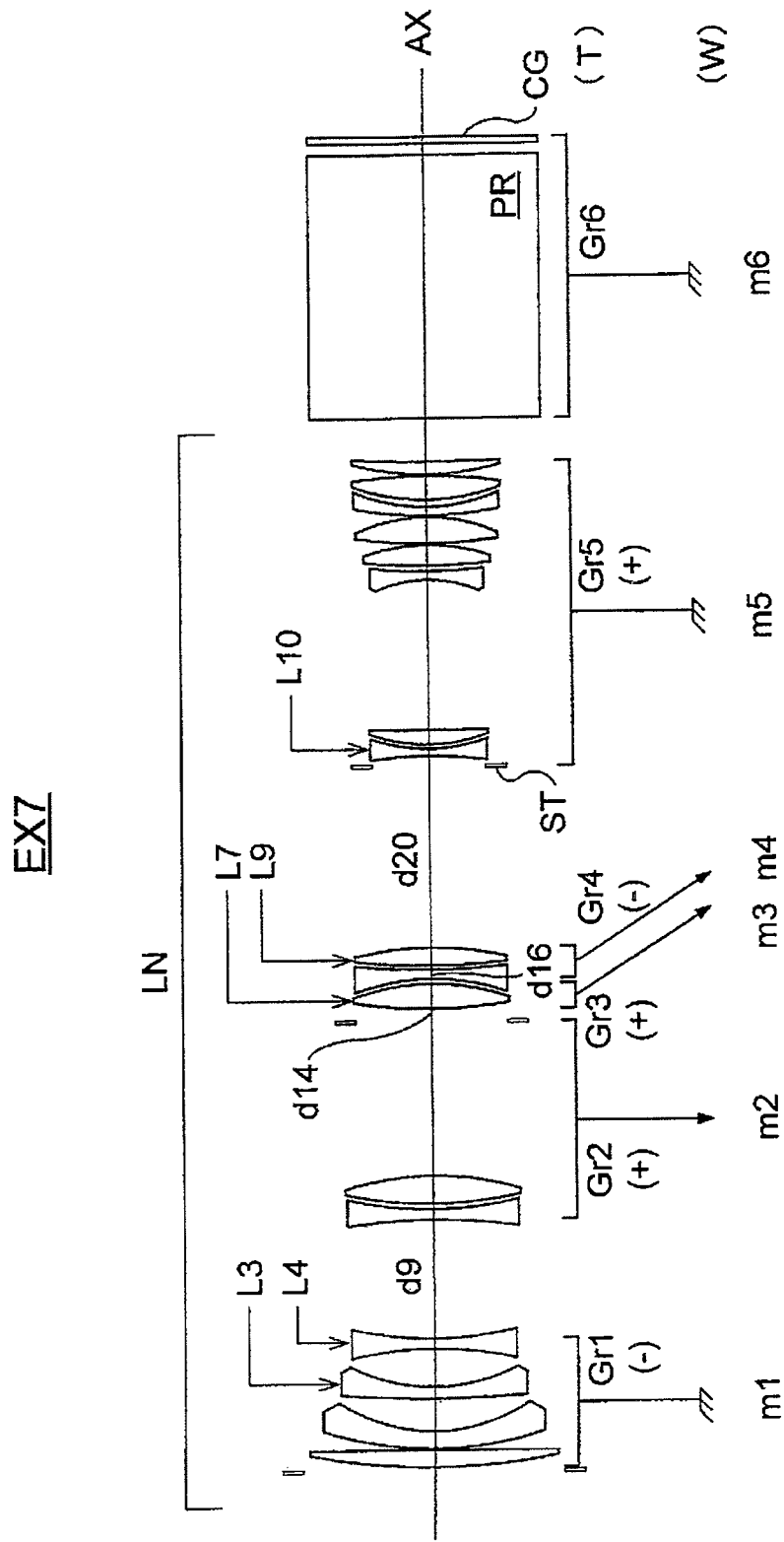
FIG. 7 is an optical construction diagram of a seventh embodiment (Example 7) of the invention.
Figure 8:
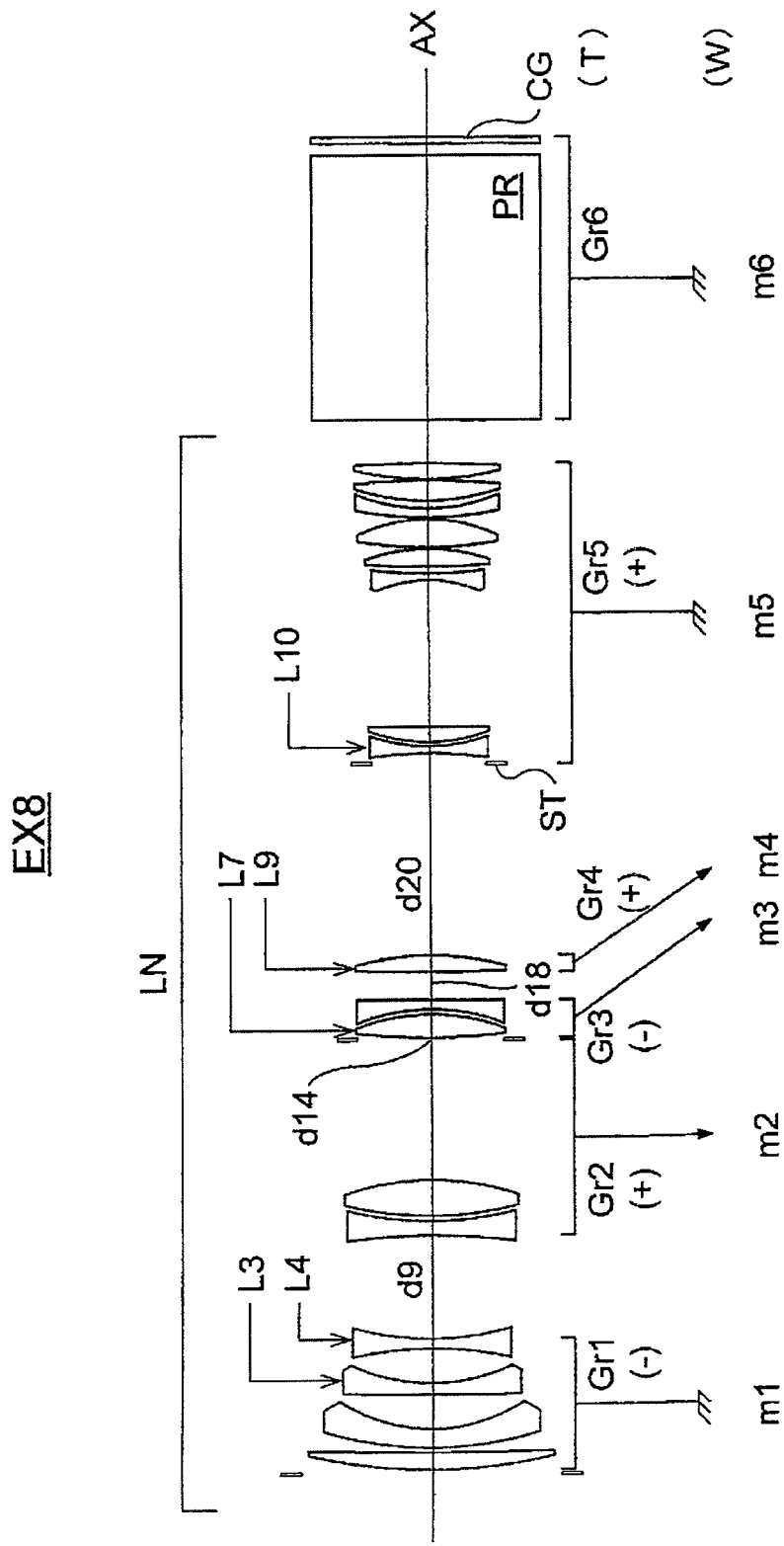
FIG. 8 is an optical construction diagram of an eighth embodiment (Example 8) of the invention.
Figure 9:
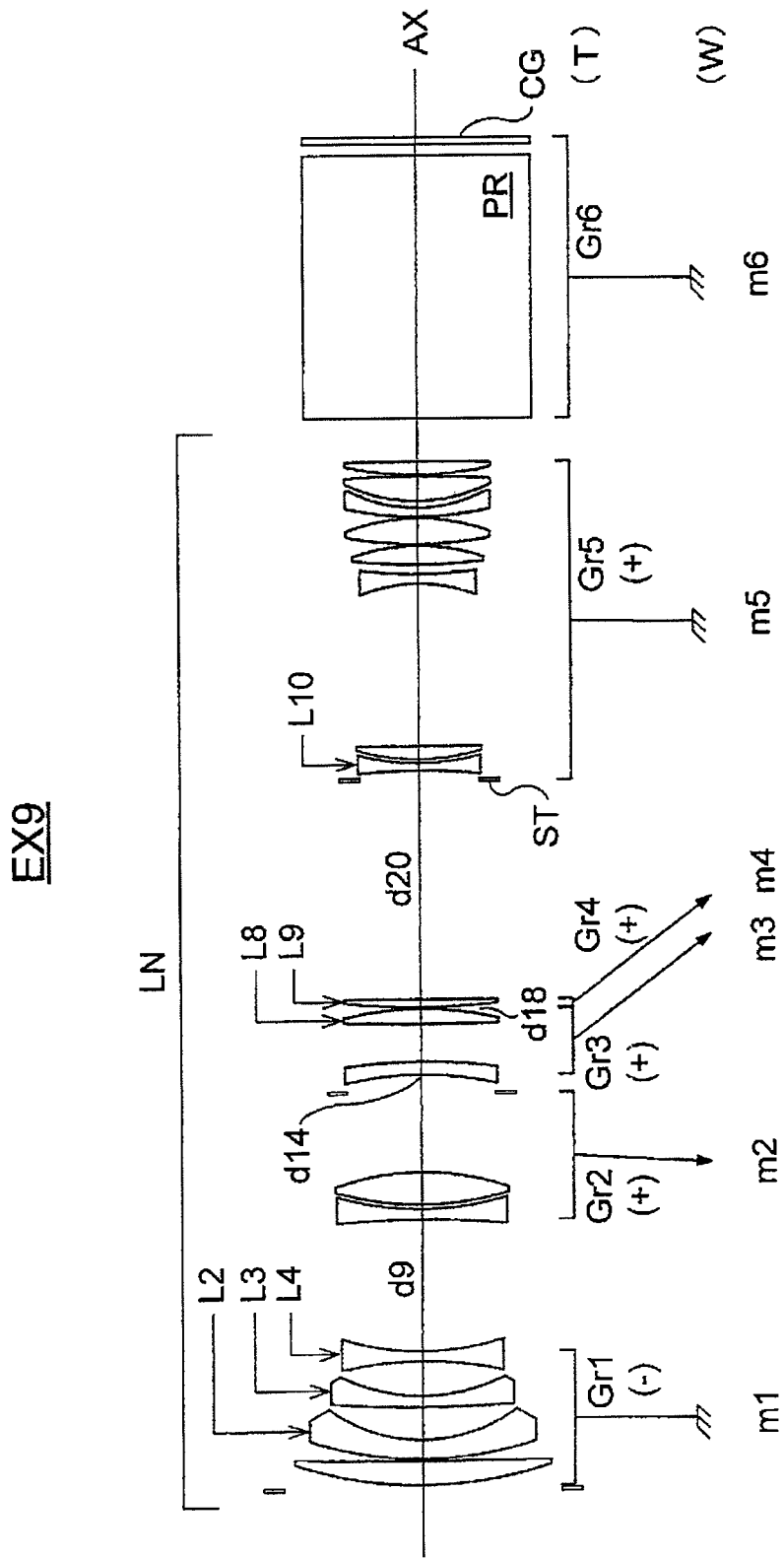
FIG. 9 is an optical construction diagram of a ninth embodiment (Example 9) of the invention.
Figure 10:
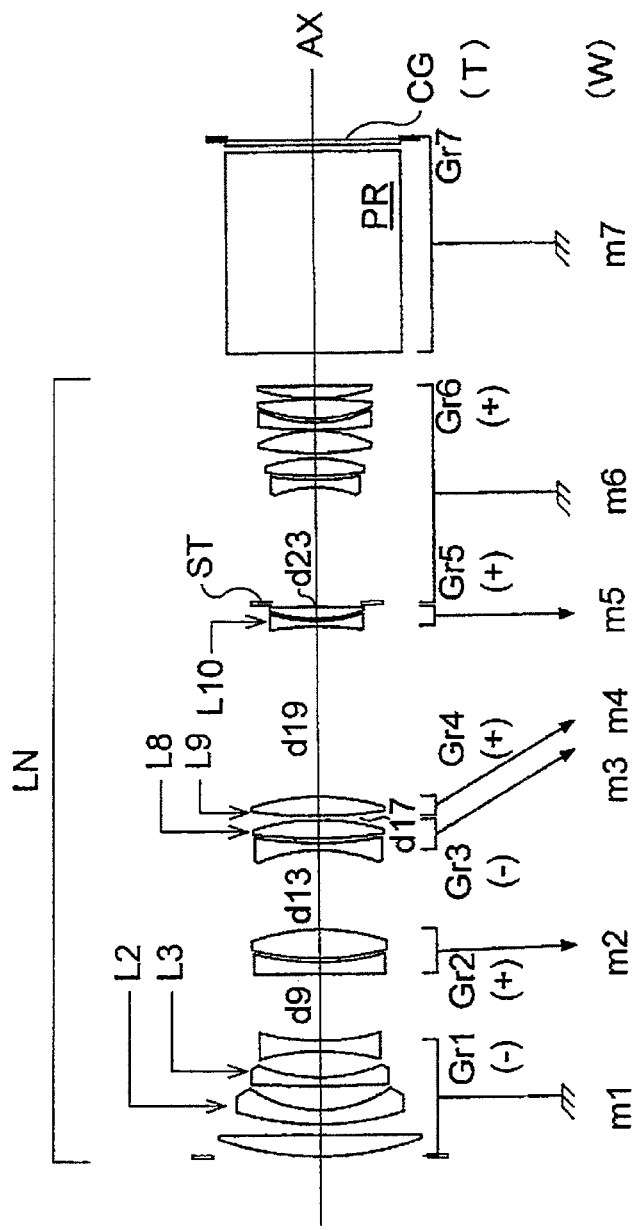
FIG. 10 is an optical construction diagram of a tenth embodiment (Example 10) of the invention.
Figure 11:
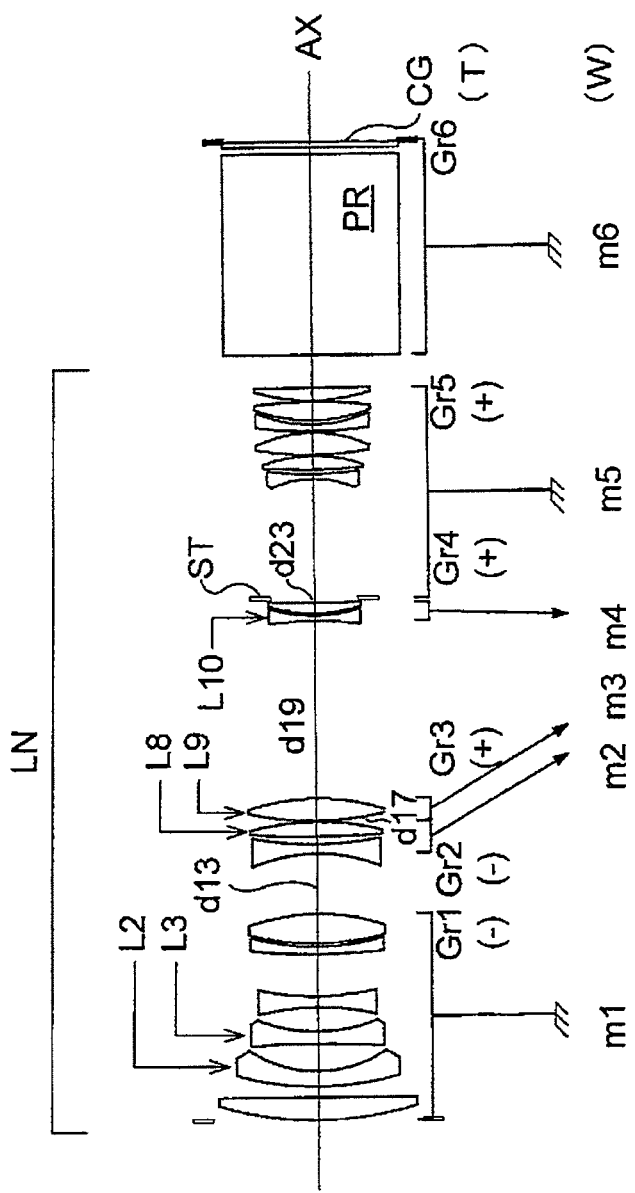
FIG. 11 is an optical construction diagram of an eleventh embodiment (Example 11) of the invention.
Figure 23A:
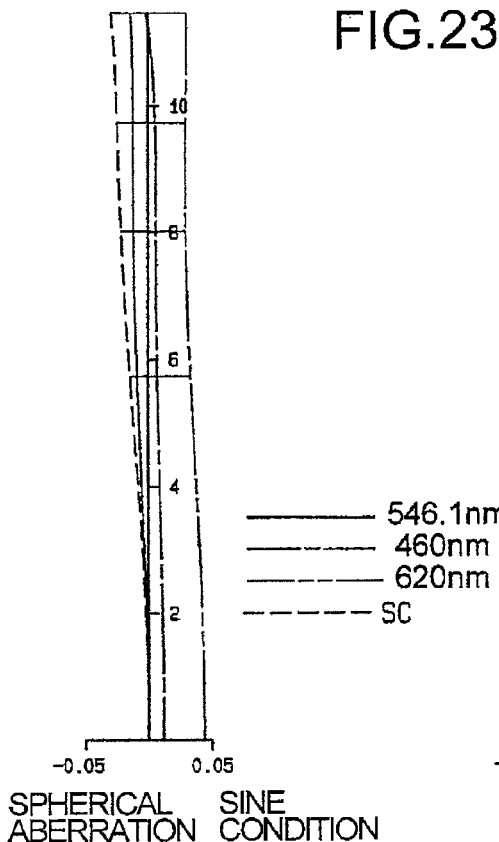
FIGS. 23A-D are aberrations diagrams of Example 1 at the telephoto end.
Figure 23B:
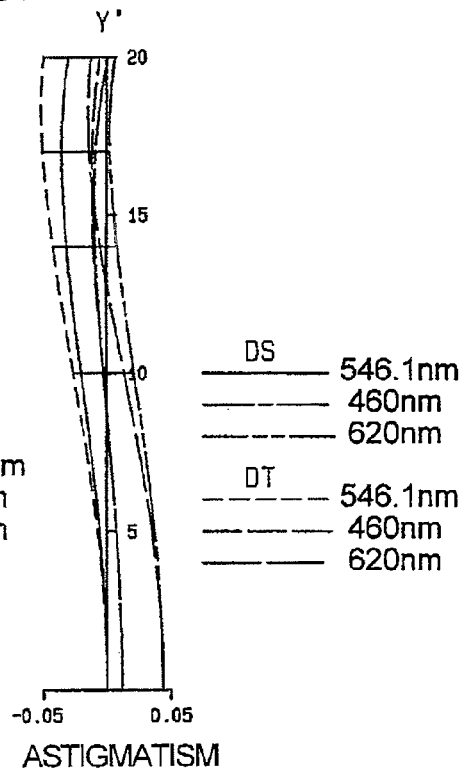
Figure 23C:
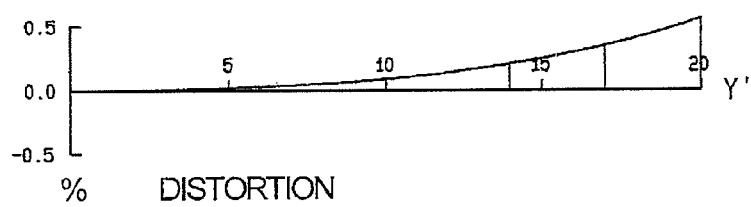
Figure 23D:
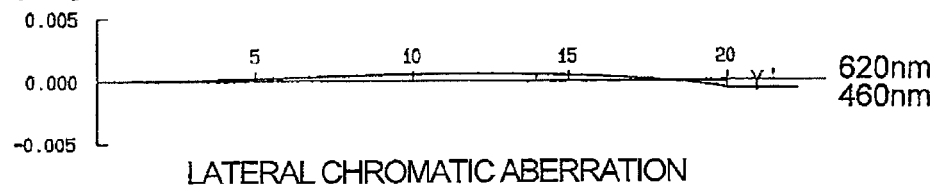
Figure 24A:
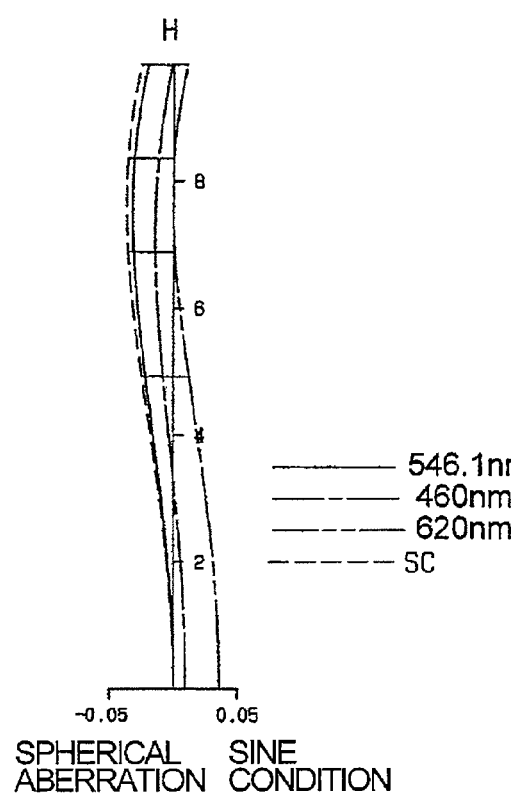
FIGS. 24A-D are aberrations diagrams of Example 1 at the middle position.
Figure 24B:
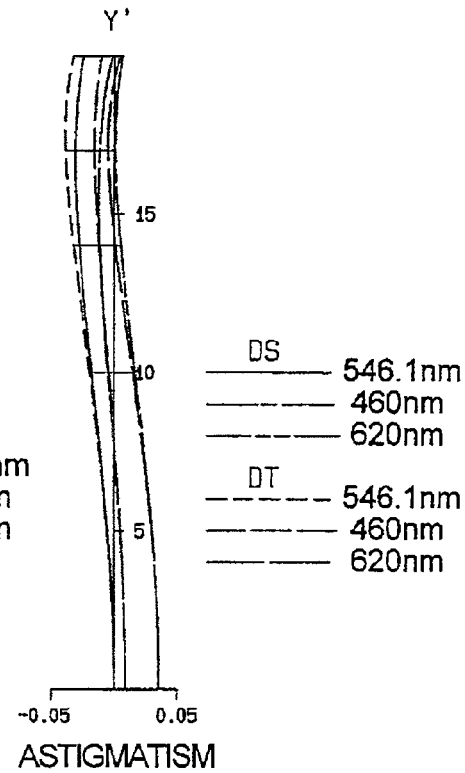
Figure 24C:
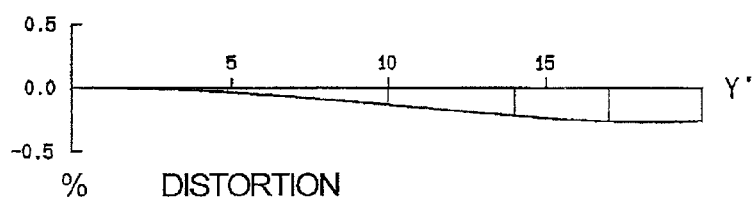
Figure 24D:
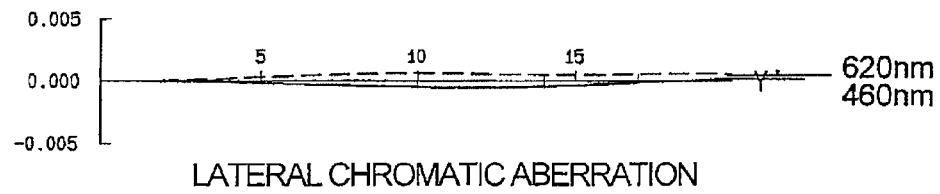
Figure 27A:
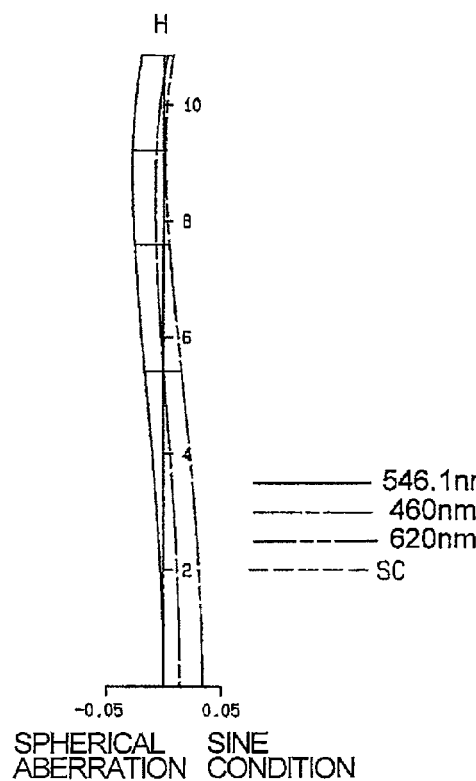
FIGS. 27A-D are aberrations diagrams of Example 2 at the middle position.
Figure 27B:
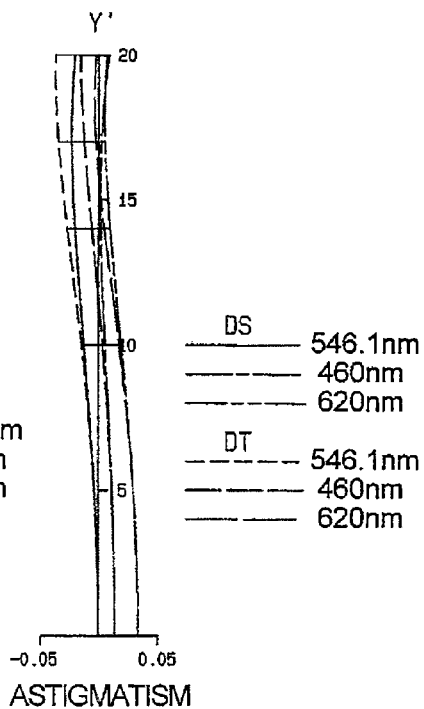
Figure 27C:
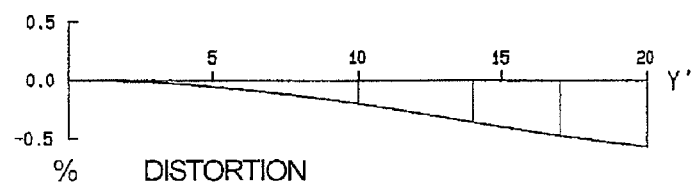
Figure 27D:
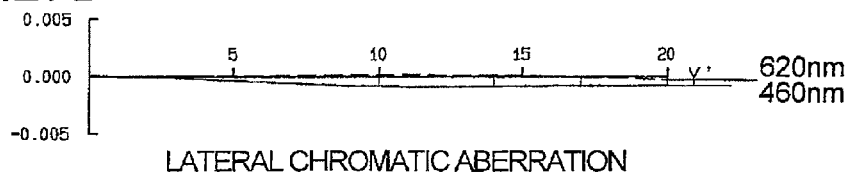
Figure 28A:
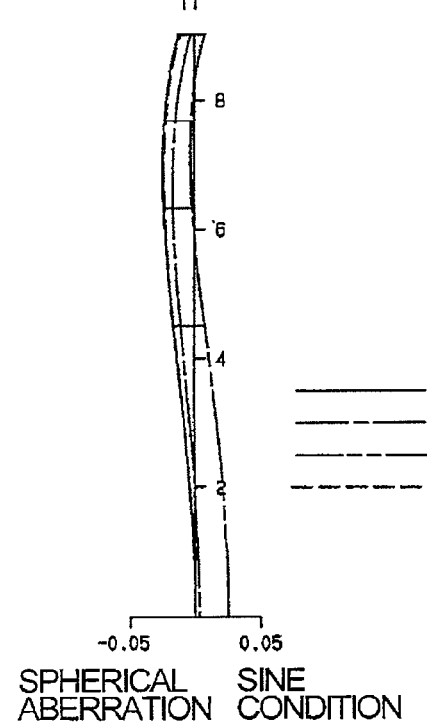
FIGS. 28A-D are aberrations diagrams of Example 2 at the wide-angle end.
Figure 28B:
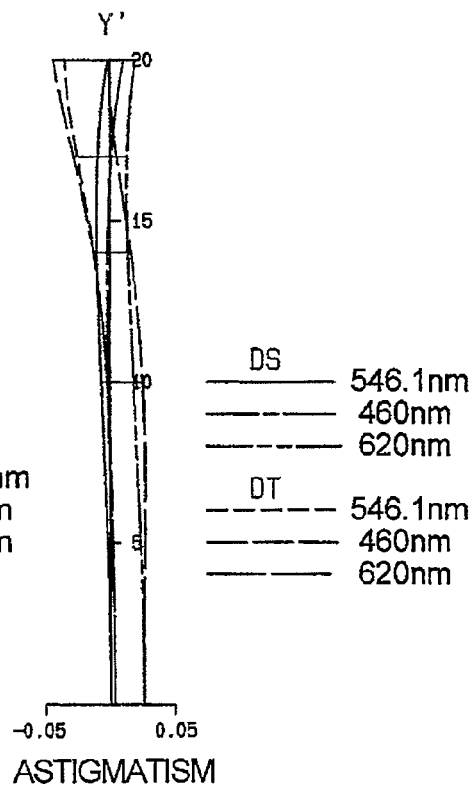
Figure 28C:
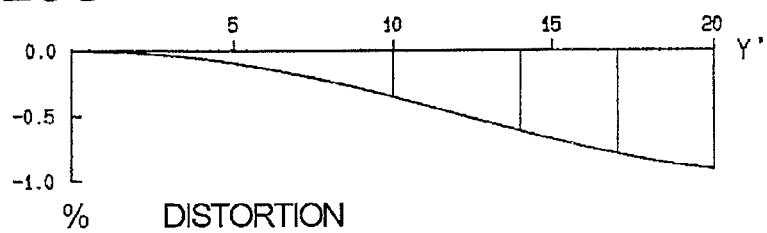
Figure 28D:
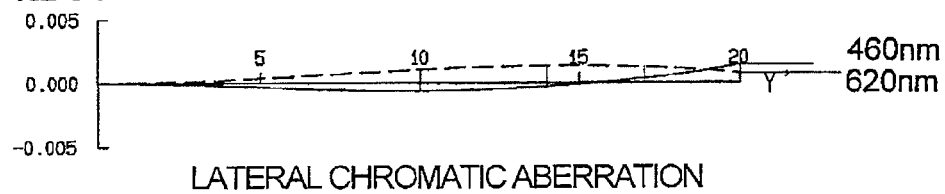
Figure 30A:
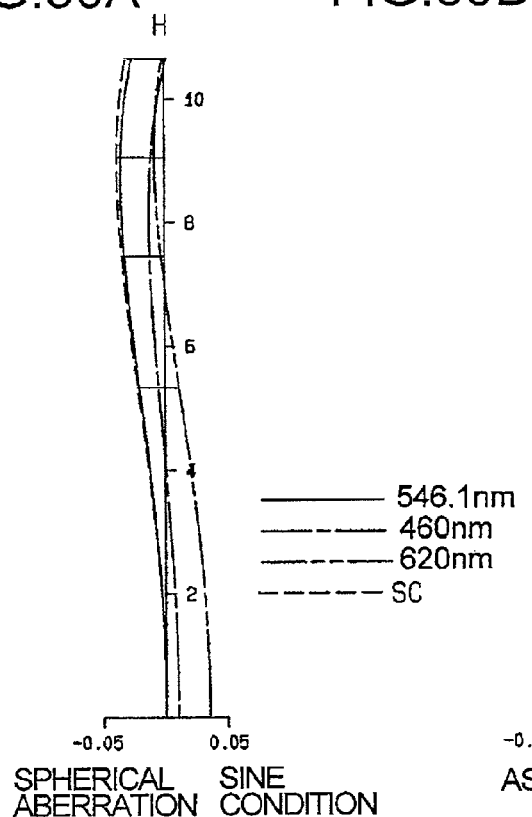
FIGS. 30A-D are aberrations diagrams of Example 3 at the middle position.
Figure 30B:
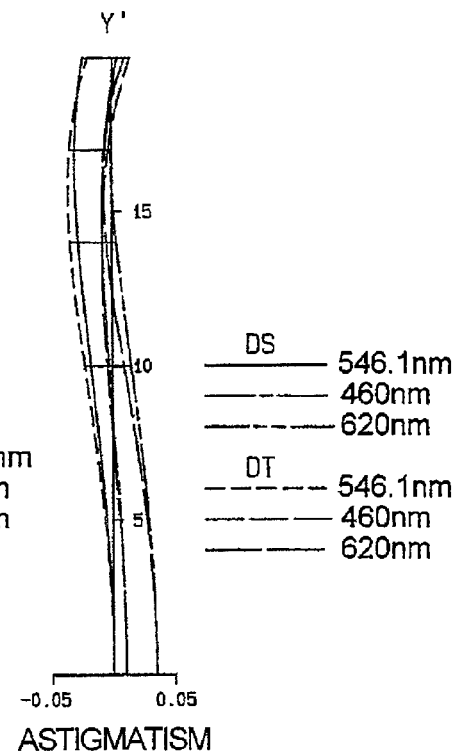
Figure 30C:
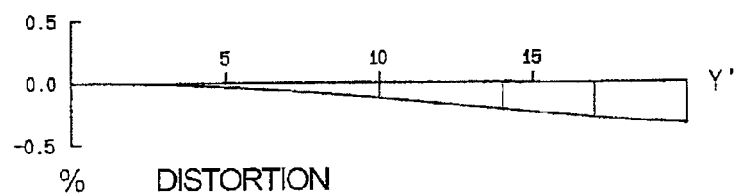
Figure 30D:
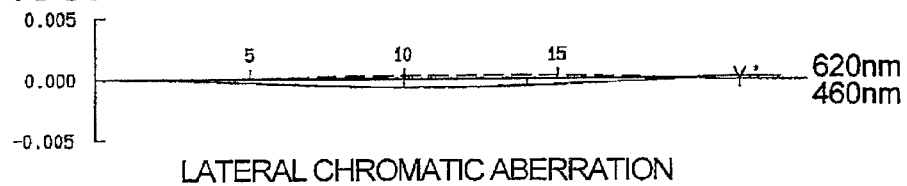
Figure 38A:
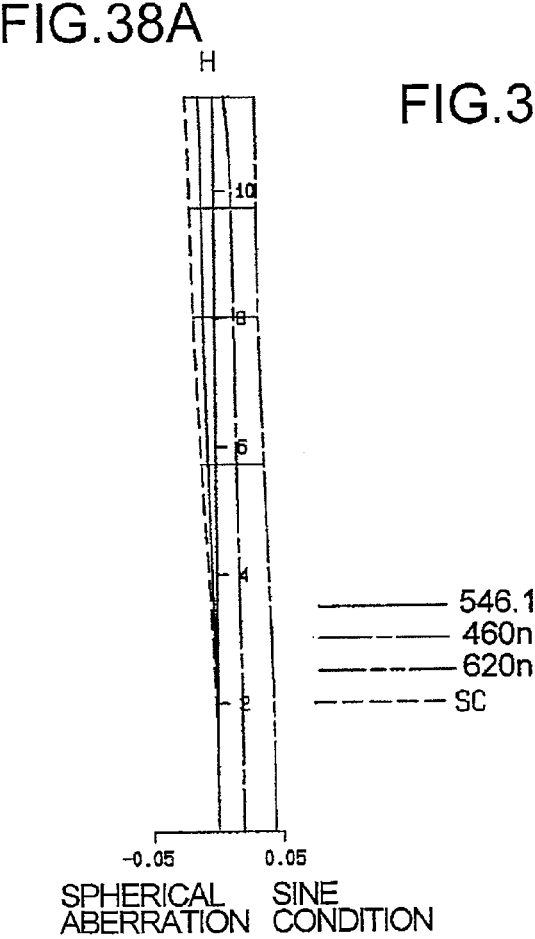
FIGS. 38A-D are aberrations diagrams of Example 6 at the telephoto end.
Figure 38B:
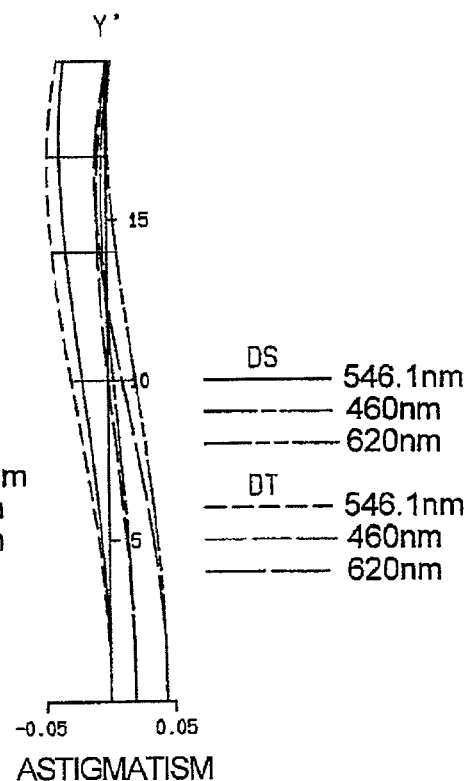
Figure 38C:
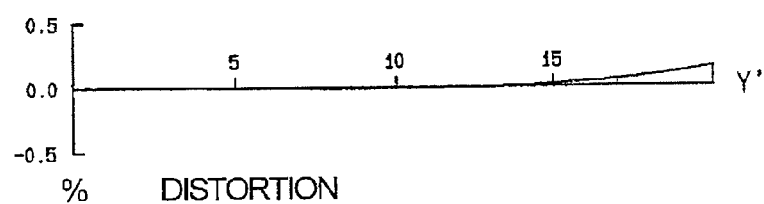
Figure 38D:
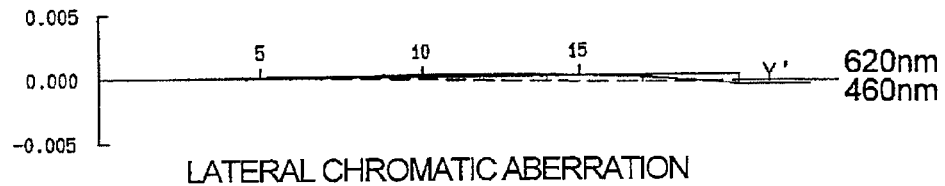
Figure 39A:
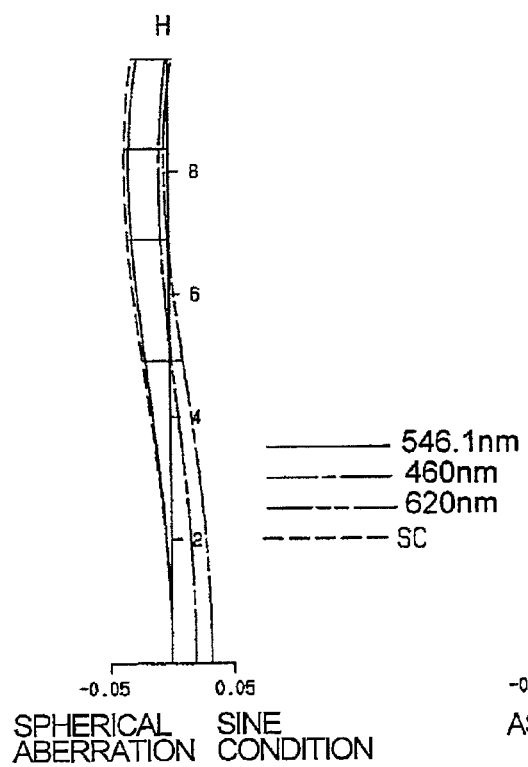
FIGS. 39A-D are aberrations diagrams of Example 6 at the middle position.
Figure 39B:
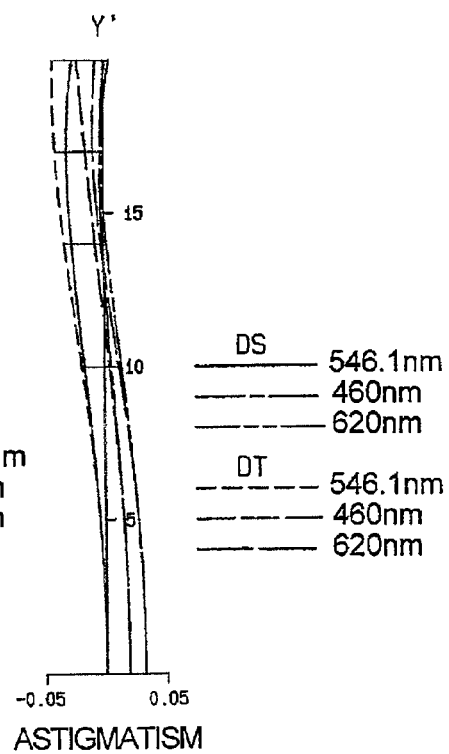
Figure 39C:
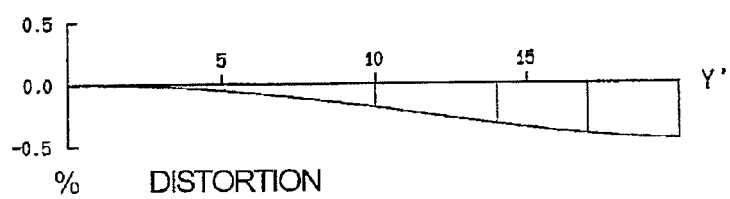
Figure 39D:
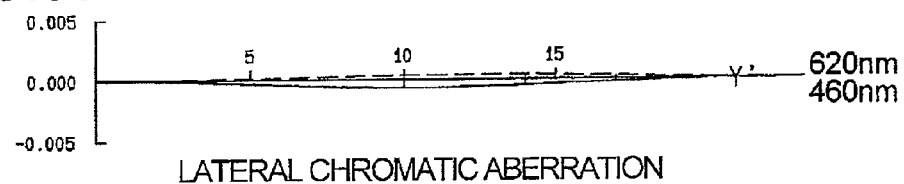
Figures 40A, 40B:
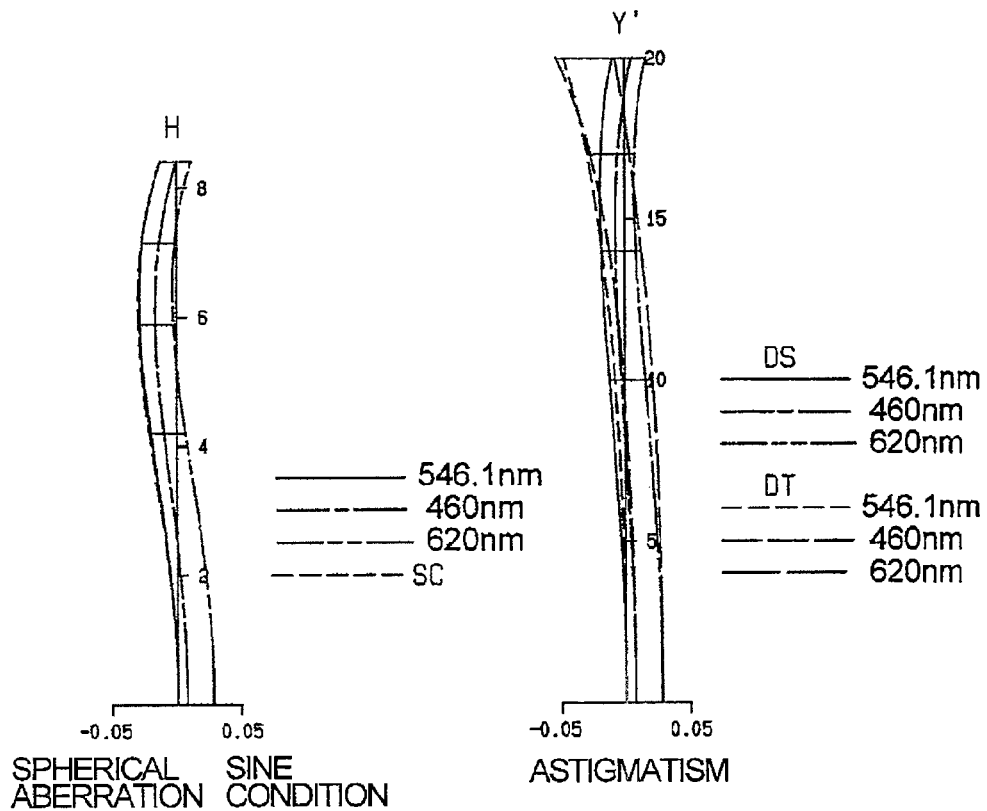
FIGS. 40A-D are aberrations diagrams of Example 6 at the wide-angle end.
Figure 40C:
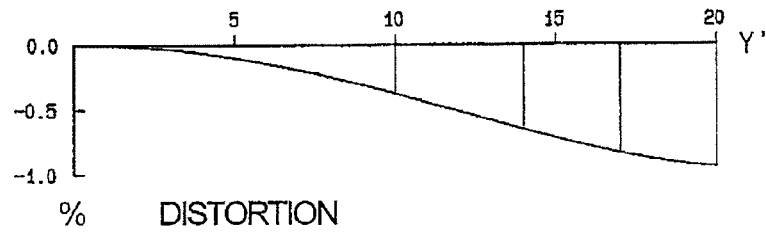
Figure 40D:
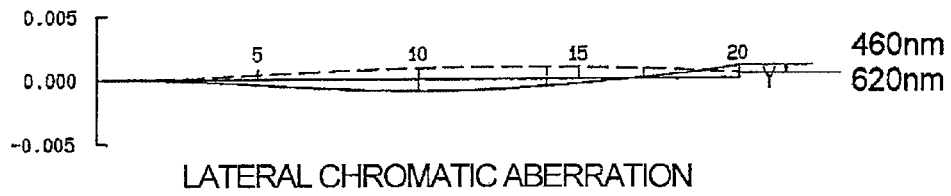
Figure 42A:
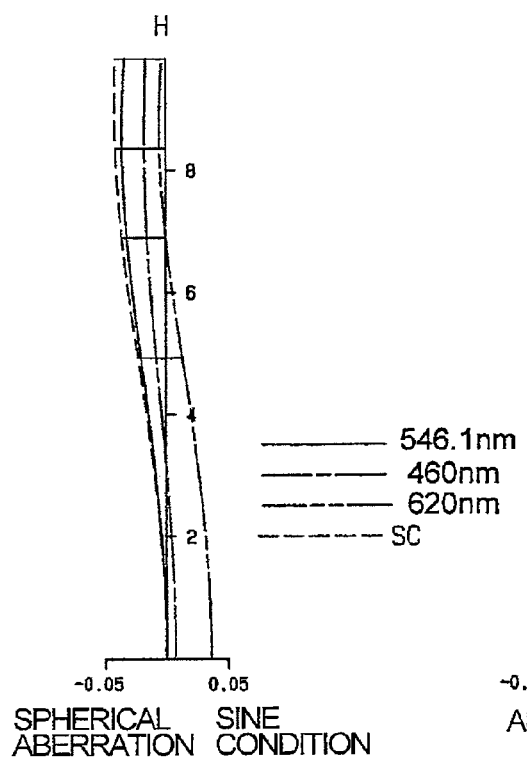
FIGS. 42A-D are aberrations diagrams of Example 7 at the middle position.
Figure 42B:
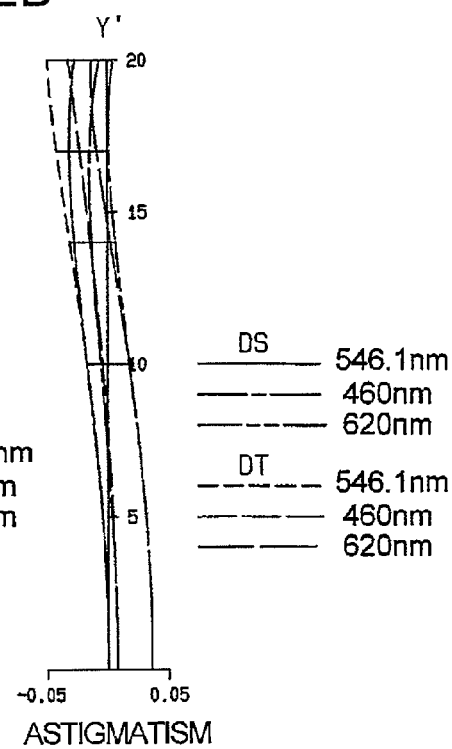
Figure 42C:
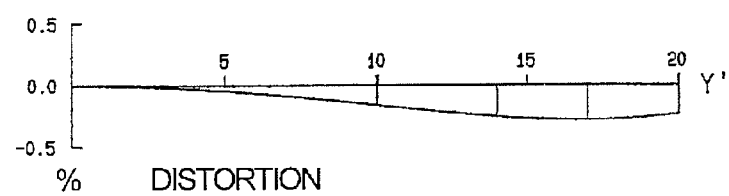
Figure 42D:
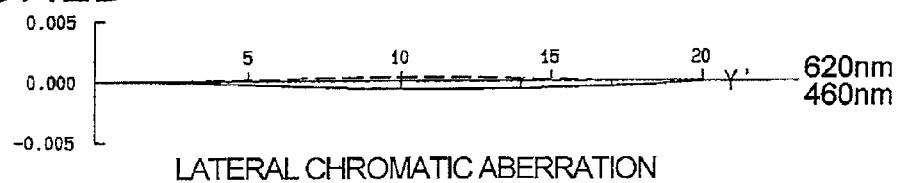
Figure 44A:
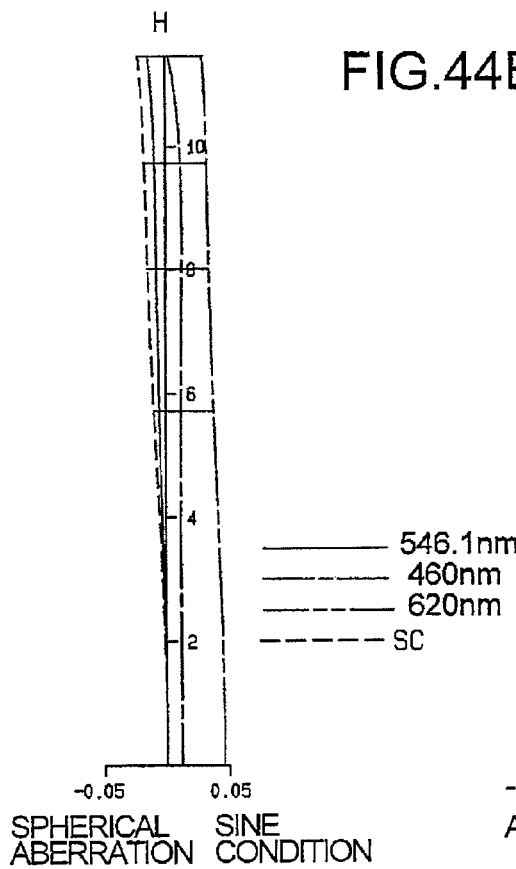
FIGS. 44A-D are aberrations diagrams of Example 8 at the telephoto end.
Figure 44B:
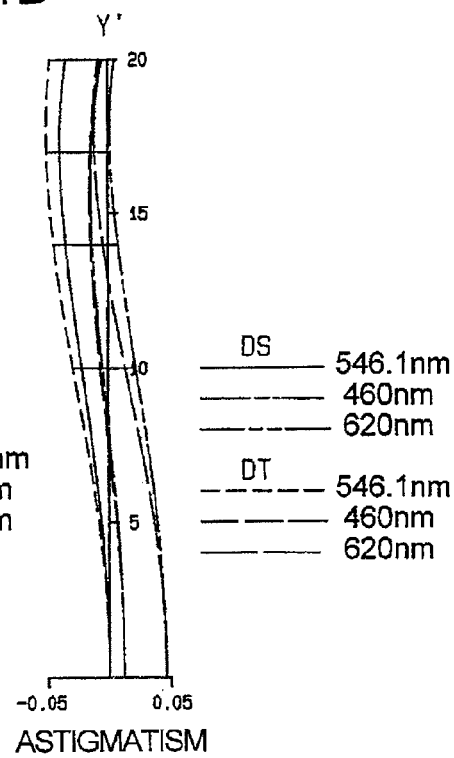
Figure 44C:
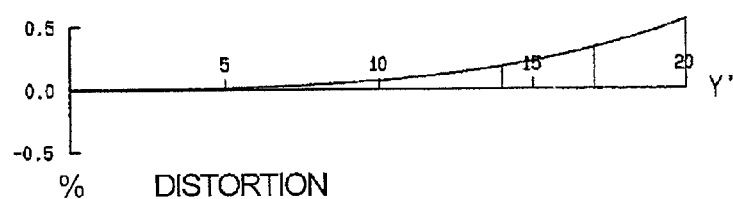
Figure 44D:
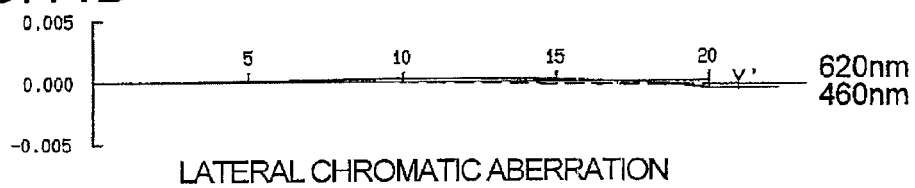
Figure 45A:
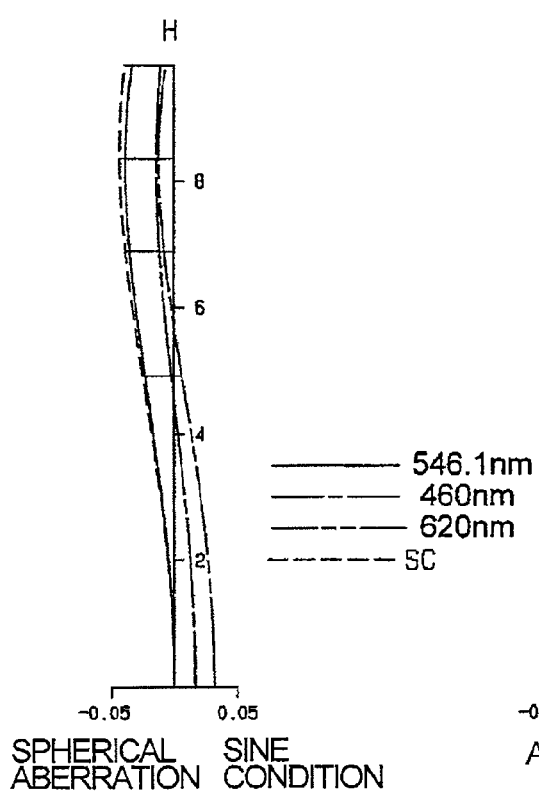
FIGS. 45A-D are aberrations diagrams of Example 8 at the middle position.
Figure 45B:
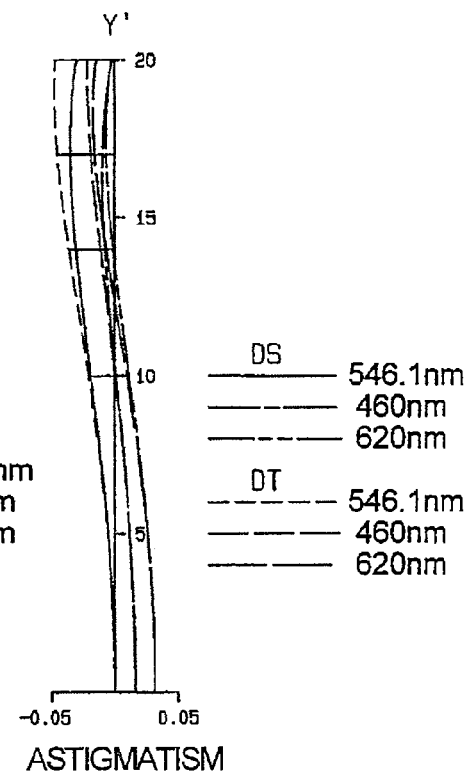
Figure 45C:
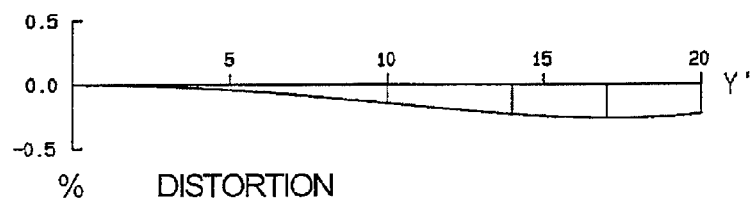
Figure 45D:
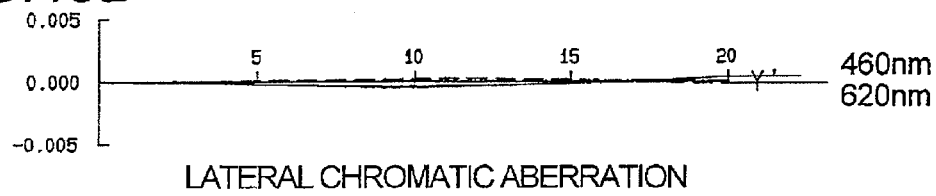
Figure 47A:
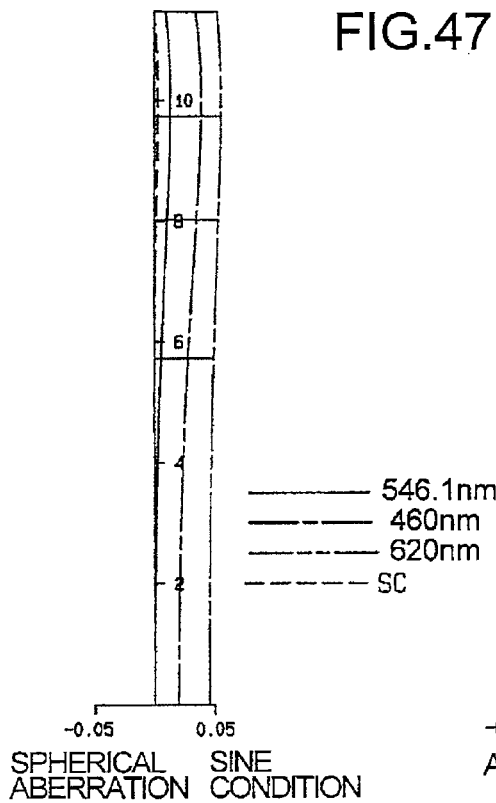
FIGS. 47A-D are aberrations diagrams of Example 9 at the telephoto end.
Figure 47B:
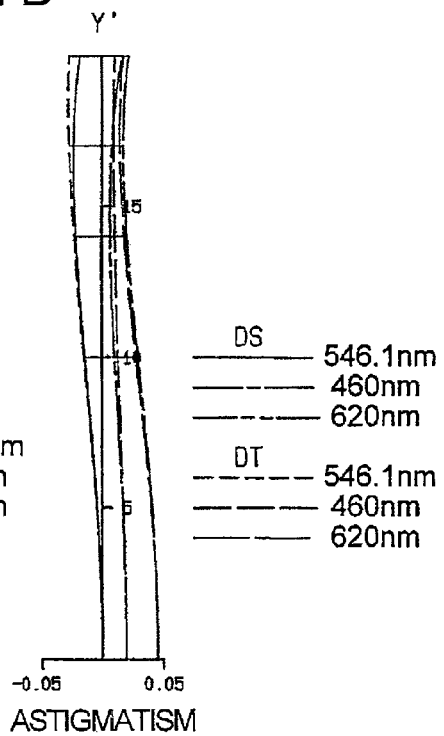
Figure 47C:
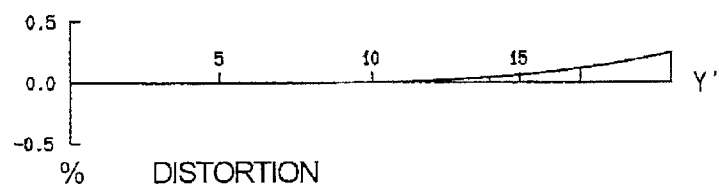
Figure 47D:
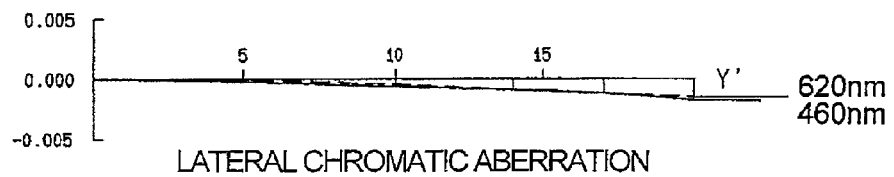
Figure 48A:
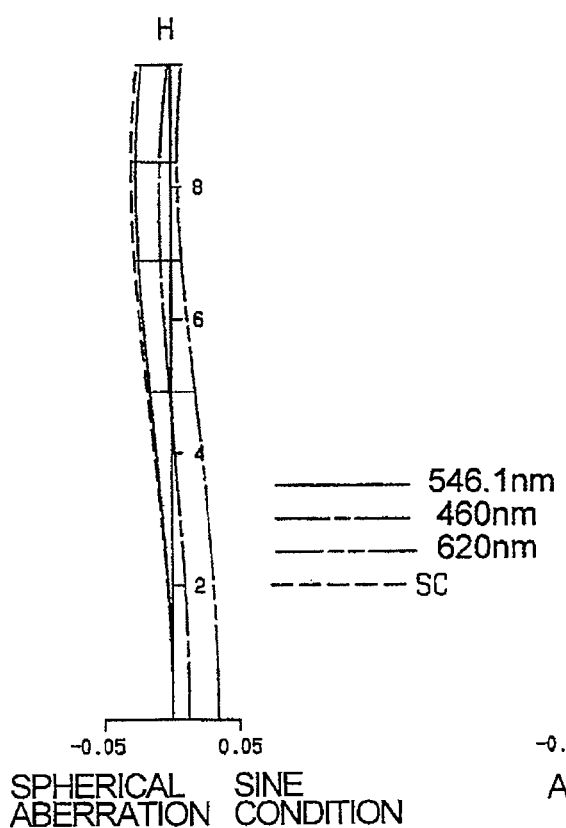
FIGS. 48A-D are aberrations diagrams of Example 9 at the middle position.
Figure 48B:
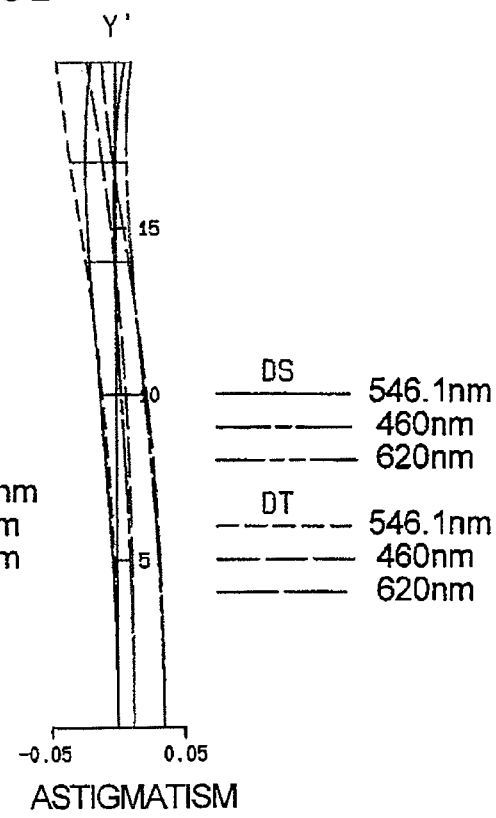
Figure 48C:
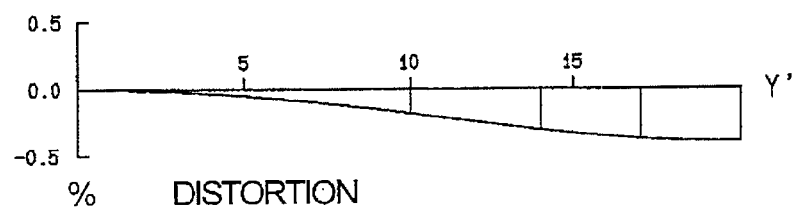
Figure 48D:
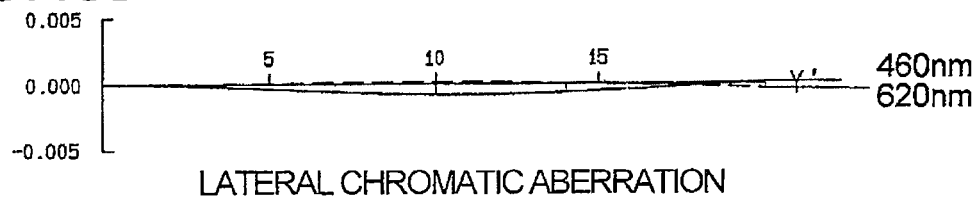
Figure 49A:
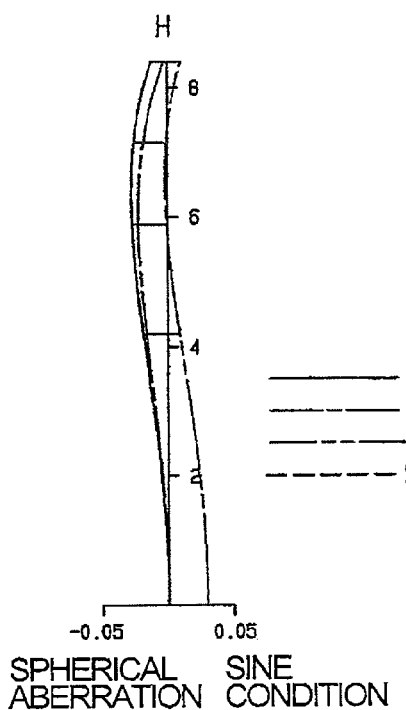
FIGS. 49A-D are aberrations diagrams of Example 9 at the wide-angle end.
Figure 49B:
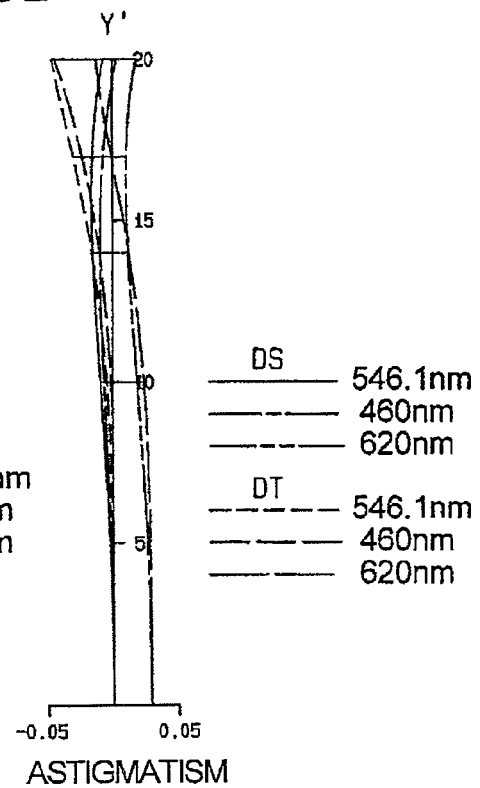
Figure 49C:
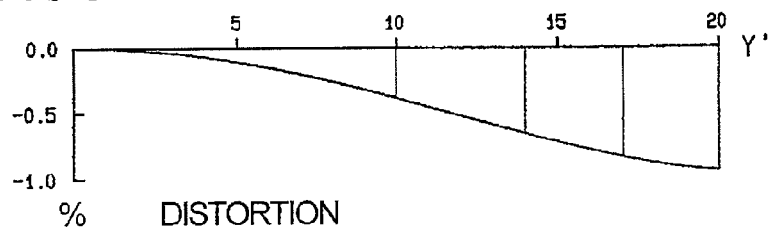
Figure 49D:
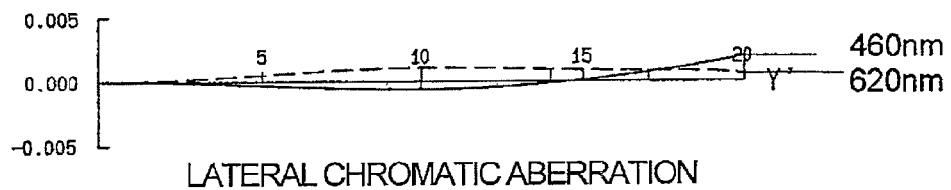
Figures 51A, 51B:
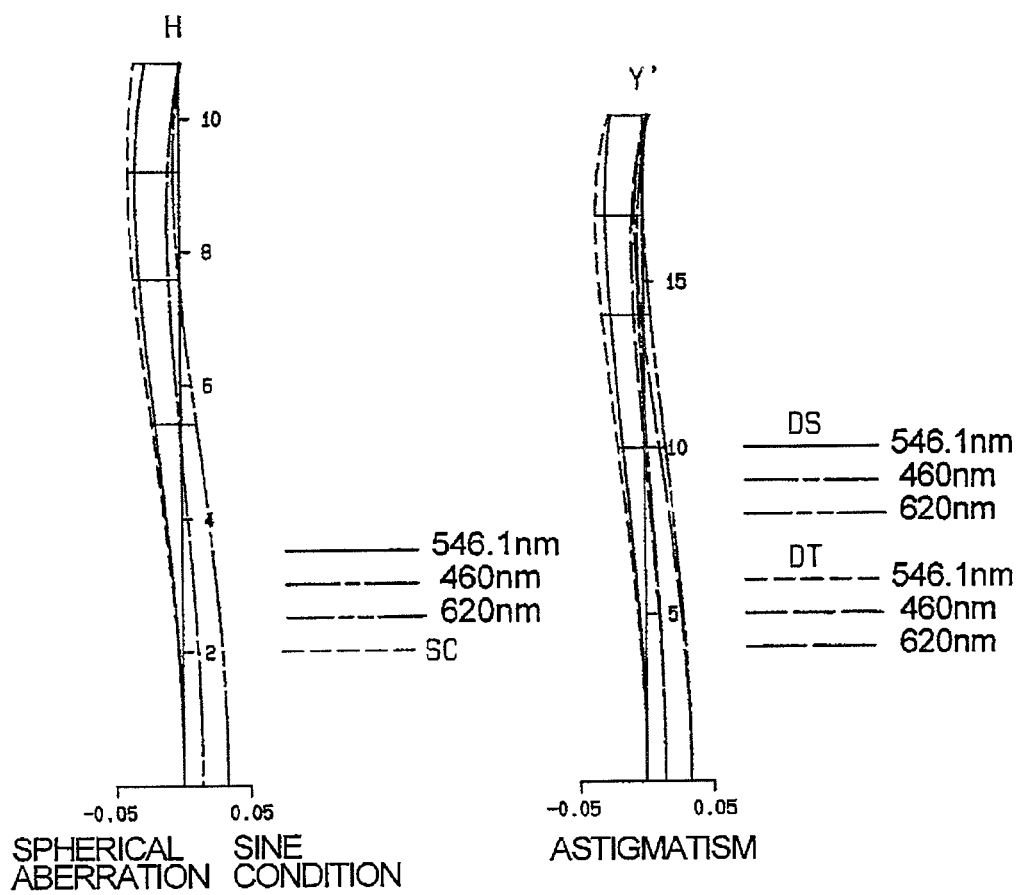
FIGS. 51A-D are aberrations diagrams of Example 10 at the middle position.
Figure 51C:
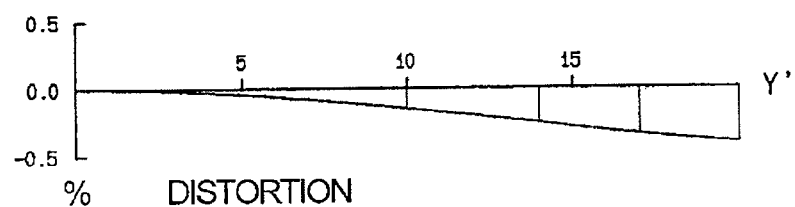
Figure 51D:
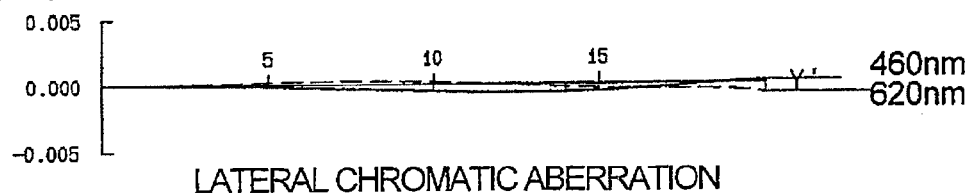
Figure 53A:
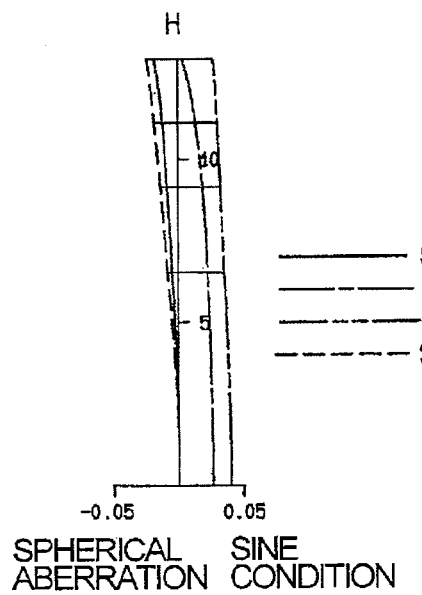
FIGS. 53A-D are aberrations diagrams of Example 11 at the telephoto end.
Figure 53B:
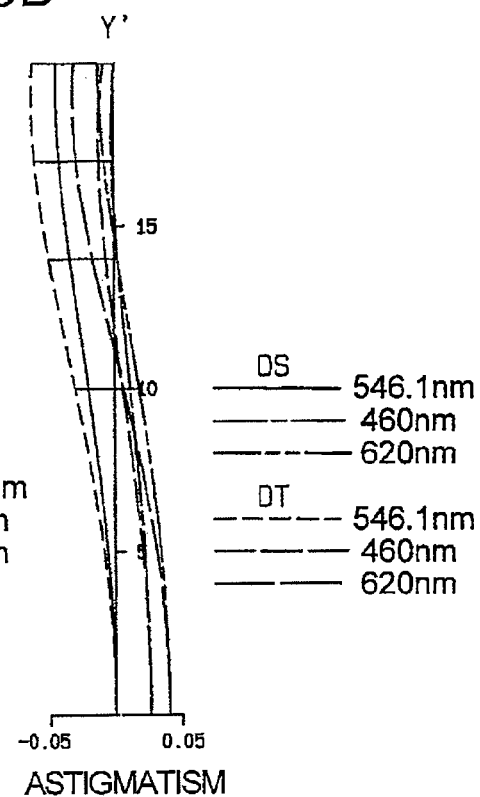
Figure 53C:
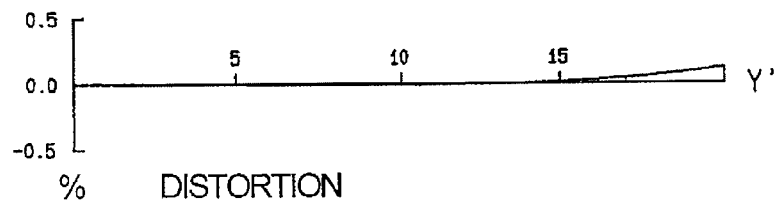
Figure 53D:
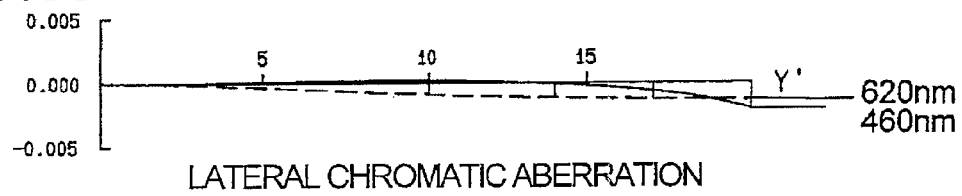
Figure 54A:
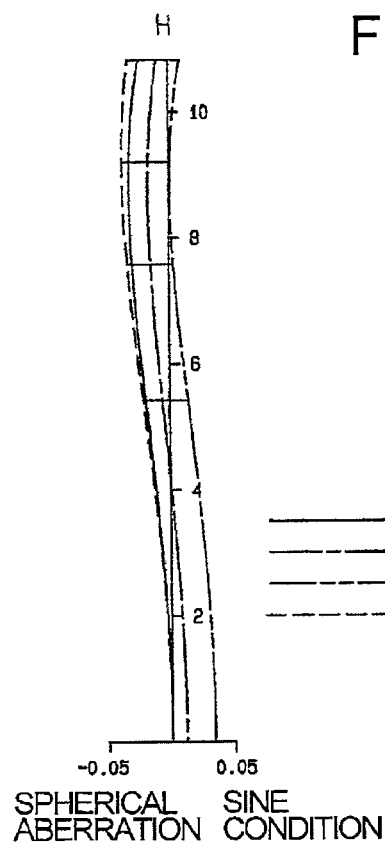
FIGS. 54A-D are aberrations diagrams of Example 11 at the middle position.
Figure 54B:
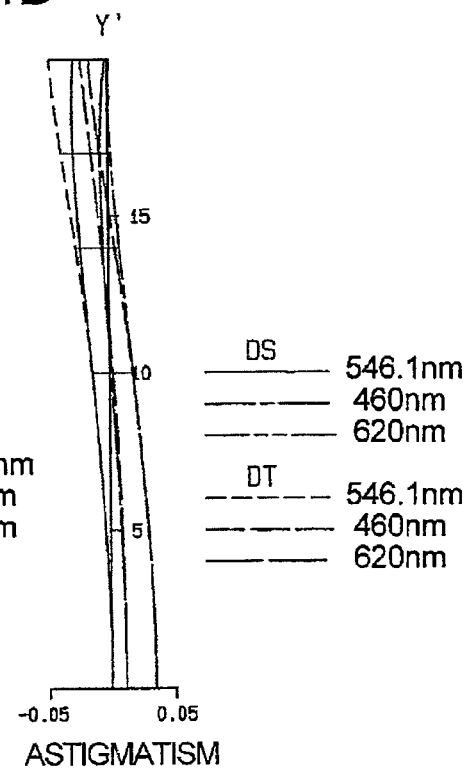
Figure 54C:
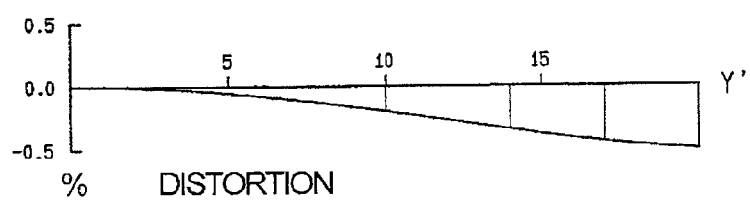
Figure 54D:
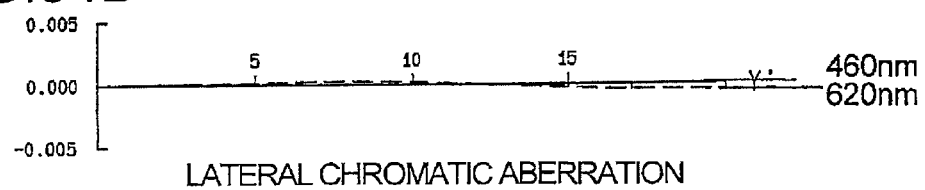

Hereinafter, projection lens systems etc. according to the present invention will be described. A projection lens system according to the invention is a projection lens system of a five- or six-group design which achieves zooming by varying the distances between the groups. It is further characterized as follows. The most enlargement-side group has a negative optical power (an optical power denotes the quantity defined as the reciprocal of a focal length), and the most reduction-side group has a positive optical power. When the group having the largest movement amount during zooming is referred to as the $\alpha$-th group and the group located next to the $\alpha$-th group and having the second largest movement amount during zooming is referred to as the β-th group, the composite optical power of the α-th and β-th groups is constantly positive. When the α-th and β-th groups are together regarded as a single component referred to as the (α+β) component, the group located next to the (α+β) component on its enlargement side is referred to as the γ-th group, and the group located next to the (α+β) component on its reduction side is referred to as the δ-th group, at least one of the γ-th and δ-th groups moves during zooming. On the reduction side of the (α+β) component, an aperture stop is arranged. During zooming from the telephoto end to the wide-angle end through a predetermined middle position that fulfills conditional formula (0) below, while the most enlargement-side and most reduction-side groups remain stationary, the α-th and β-th groups move from the enlargement side to the reduction side. Conditional formulae (X1A), (X1B), (X2A), (X2B), (X3A), and (X3B) below are fulfilled.

$$0.99 < fm/(ft \times fw)^{1/2} < 1.01 \qquad (0)$$

$$7 < \Delta TM\alpha/|\Delta TM\gamma\delta| \qquad (X1A)$$

$$7 < \Delta TW\alpha/|\Delta TW\gamma\delta| \qquad (X1B)$$

$$7 < \Delta TM\beta/|\Delta TM\gamma\delta| \qquad (X2A)$$

$$7 < \Delta TW\beta/|\Delta TW\gamma\delta| \qquad (X2B)$$

$$0.9 < \Delta TM\beta/\Delta TM\alpha \leq 1 \qquad (X3A)$$

$$0.9 < \Delta TW\beta/\Delta TW\alpha \leq 1 \qquad (X3B)$$

where
- ft represents the focal length of the entire system at the telephoto end;
- fm represents the focal length of the entire system at the middle position;
- fw represents the focal length of the entire system at the wide-angle end;
- $\Delta TM\alpha$ represents the movement amount of the α-th group from the telephoto end to the middle position;
- $\Delta TM\beta$ represents the movement amount of the β-th group from the telephoto end to the middle position;
- $\Delta TM\gamma\delta$ represents the larger of the movement amounts of the γ-th and δ-th groups from the telephoto end to the middle position;
- $\Delta TW\alpha$ represents the movement amount of the α-th group from the telephoto end to the wide-angle end;
- $\Delta TW\beta$ represents the movement amount of the β-th group from the telephoto end to the wide-angle end; and
- $\Delta TW\gamma\delta$ represents the larger of the movement amounts of the γ-th and δ-th groups from the telephoto end to the wide-angle end.

Conditional formulae (X1A), (X1B), (X2A), and (X2B) indicate that the α-th and β-th groups move more than the γ-th and δ-th groups. Owing to the large movement of the α-th and β-th groups, which are located on the enlargement side of the aperture stop, it is easy to correct, in particular, lateral chromatic aberration; in this connection, conditional formulae (X1A), (X1B), (X2A), and (X2B) define the optimum movement amounts in a projection lens system adapted to high-resolution image display devices. Below the lower limit of conditional formulae (X1A), (X1B), (X2A), or (X2B), degraded curvature of field results, in particular, at great image heights (that is, at large viewing angles) at the middle position (the zoom position given by conditional formula (0)) and at the wide-angle end, leading to degraded projection performance.

It is preferable that conditional formulae (X1Aa), (X1Ba), (X2Aa), or (X2Ba) be fulfilled, and it is further preferable that conditional formulae (X1Ab), (X1Bb), (X2Ab), or (X2Bb) be fulfilled. These conditional formulae (X1Aa), (X1Ba), (X2Aa), (X2Ba), (X1Ab), (X1Bb), (X2Ab), and (X2Bb) define further preferable conditional ranges within the conditional ranges defined by conditional formulae (X1A), (X1B), (X2A), and (X2B) above, and settings below the upper limit of conditional formulae (X1Aa), (X1Ba), (X2Aa), (X2Ba), (X1Ab), (X1Bb), (X2Ab), or (X2Bb) below allow more effective prevention of degraded curvature of field.

$$7 < \Delta TM\alpha/|\Delta TM\gamma\delta| < 500 \qquad (X1Aa)$$

$$7 < \Delta TW\alpha/|\Delta TW\gamma\delta| < 500 \qquad (X1Ba)$$

$$7 < \Delta TM\beta/|\Delta TM\gamma\delta| < 500 \qquad (X2Aa)$$

$$7 < \Delta TW\beta/|\Delta TW\gamma\delta| < 500 \qquad (X2Ba)$$

$$7 < \Delta TM\alpha/|\Delta TM\gamma\delta| < 20 \qquad (X1Ab)$$

$$7 < \Delta TW\alpha/|\Delta TW\gamma\delta| < 20 \qquad (X1Bb)$$

$$7 < \Delta TM\beta/|\Delta TM\gamma\delta| < 20 \qquad (X2Ab)$$

$$7 < \Delta TW\beta/|TW\gamma\delta| < 20 \qquad (X2Bb)$$

In a projection lens system according to the invention, at least the α-th and β-th groups or the γ-th and δ-th groups are movable groups. During zooming, the distances between the relevant groups vary. The α-th and β-th groups move in one of the following four patterns: a pattern where their distance becomes smallest in the middle of zooming; a pattern where their distance becomes greatest in the middle of zooming; a pattern where their distance monotonically increases with zooming; and pattern where their distance monotonically decreases with zooming. Conditional formulae (X3A) and (X3B) indicate that the movement amounts of the α-th and β-th groups differ slightly, and giving a slight difference between the movement amounts of the α-th and β-th groups makes it possible to optimize various aberrations over the range from the telephoto end through the middle position to the wide-angle end.

Below the lower limit of conditional formula (X3A) or (X3B), increased variation in curvature of field results over the range from the telephoto end through the middle position to the wide-angle end, and thus degraded lateral chromatic aberration results, leading to degraded projection performance. On the other hand, above the upper limit of conditional formula (X3A) or (X3B), degraded curvature of field results at the middle position and at the wide-angle end, and thus degraded lateral chromatic aberration results, leading to degraded projection performance. Since a projection lens system according to the invention has a five- or six-group design, even when $\Delta TM\beta/\Delta TM\alpha=1$ and $\Delta TW\beta/\Delta TW\alpha=1$, no assumption is made for cases where the movement loci on the way completely coincide.

With the distinctive construction described above, a projection lens system can maintain satisfactory lateral chromatic aberration performance during zooming while satisfactorily correcting curvature of field over the entire zoom range. Using such a projection lens system in projectors contributes to making them compact, high-performance, versatile, and otherwise improving them. A discussion will now be given of conditions etc. for obtaining those benefits with a proper balance and for achieving higher optical performance, further compactness, etc.

It is preferable that conditional formulae (4) and (5) below be fulfilled.

$$20 < |exp/ft| \quad (4)$$

$$1.3 < ft/fw \quad (5)$$

where
exp represents the paraxial exit pupil position with respect to the reduction-side paraxial image plane (that is, the distance from the reduction-side paraxial image plane to the paraxial exit pupil).

Conditional formula (4) defines telecentricity. Below the lower limit of conditional formula (4), off-axial rays have large angles. This, for example, degrades the efficiency of color integration by a dichroic prism used in projectors, and degrades the efficiency of intake of illumination light by a TIR (total internal reflection) prism in projectors that employ a digital micromirror device. Thus, degraded image quality such as uneven illuminance may result.

To effectively suppress the above-mentioned degradation in efficiency, it is further preferable that conditional formula (4a) below be fulfilled. Conditional formula (4a) defines a further preferable conditional range within the conditional range defined by conditional formula (4) above.

$$30 < |exp/ft| \quad (4a)$$

Conditional formula (5) defines a preferable zoom ratio. Fulfilling conditional formula (5) means a high zoom ratio. While the common zoom ratio is about 1.2, fulfilling conditional formula (5) such that the zoom ratio is, for example, 1.3 to 1.6 makes it possible to make the projection lens system usable in a wider variety of environments.

With respect to zooming from the telephoto end through the middle position to the wide-angle end, it is preferable that conditional formula (X6) below be fulfilled.

$$0.001 < (XLmax - XLmin)/\Delta TW\alpha < 0.040 \quad (X6)$$

where
XLmax represents the maximum distance between the α-th and β-th groups among their distances at the telephoto end, the middle position, and the wide-angle end; and
XLmin represents the minimum distance between the α-th and β-th groups among their distances at the telephoto end, the middle position, and the wide-angle end.

Conditional formula (X6) indicates that the movement amounts of the α-th and β-th groups differ slightly. Giving a slight difference between the movement amounts of the α-th and β-th groups makes it possible to optimize various aberrations over the range from the telephoto end through the middle position to the wide-angle end. It is also possible to maintain satisfactory lateral chromatic aberration performance while satisfactorily correcting curvature of field over the entire zoom range. Below the lower limit of conditional formula (X6), the difference between XLmax and XLmin and hence the difference between the loci of the α-th and β-th groups during zooming is so close to zero that an insufficient effect of aberration correction results. On the other hand, above the upper limit of the conditional formula (X6), the variation is so large that aberrations are overcorrected.

It is preferable that one or both of the α-th and β-th groups include a positive lens element, that only one of the α-th and β-th groups includes one negative lens element, that the total number of lens elements constituting the α-th and β-th groups be three or four, and that the at least one positive lens element be formed of a lens material that fulfills conditional formula (7) below.

$$0.652 < Pg,F + 0.00181 \times vd \quad (7)$$

where
Pg,F represents the partial dispersion ratio of the lens material; and
vd represents the Abbe number of the lens material.

With the above construction, the inclusion of an anomalous-dispersion positive lens element that fulfills conditional formula (7) in the α-th and β-th groups having large movement amounts makes it possible to correct lateral chromatic aberration satisfactorily. Accordingly, outside the conditional range given by conditional formula (7), it is difficult to correct lateral chromatic aberration satisfactorily. In conditional formula (7), the partial dispersion ratio Pg,F=(ng−nF)/(nF−nC) (where ng, nF, and nC represent the refractive indices for the g-, F-, and C-lines respectively).

With a construction where the α-th and β-th groups move greatly to the reduction side during zooming from the telephoto end to the wide-angle end, it is possible to raise the ray passage positions at the telephoto end and lower them at the wide-angle end. As shown in the optical path diagrams (FIGS. 12 to 22) referred to later, the ray passage positions of off-axial rays in the α-th and β-th groups at the wide-angle end are close to those of axial rays. Thus, at the wide-angle end, the effect of refracting off-axial rays in the α-th and β-th groups is almost the same as the effect of refracting axial rays. Accordingly, at the wide-angle end, in the α-th and β-th groups, the difference between the lateral chromatic aberration occurring in off-axial rays and the lateral chromatic aberration occurring on and near the optical axis is small, and the occurring lateral chromatic aberration is small. On the other hand, the beam width of off-axial rays passing through the α-th and β-th groups is large at the telephoto end and is small at the wide-angle end. Thus, the effect of refracting off-axial rays at the telephoto end gradually increases the farther away from the optical axis; accordingly, it is possible to gradually increase the effect of correcting lateral chromatic aberration the farther away from the optical axis, and thus it is possible to obtain a sufficient effect of correcting lateral chromatic aberration at image positions between the axial and most off-axial positions. In this construction, arranging a element having the property given by conditional formula (7) in the α-th and β-th groups makes it possible to suppress occurrence of and variation in lateral chromatic aberration over the range from the telephoto end to the wide-angle end.

It is further preferable that conditional formula (7a) below be fulfilled. Conditional formula (7) defines a further preferable conditional range within the conditional range defined by conditional formula (7) above.

$$0.67 < Pg,F + 0.00181 \times vd \quad (7a)$$

With respect to the optical power of the group that includes the above-mentioned negative lens element, it is preferable that conditional formula (8) below be fulfilled.

$$\Phi n/\Phi w < 0.1 \quad (8)$$

where
$\Phi n$ represents the optical power of the group that includes the negative lens element; and
$\Phi w$ represents the optical power of the entire system at the wide-angle end.

Conditional formula (8) defines, with respect to the optical power of whichever of the α-th and β-th groups includes the negative lens element, a range in which a satisfactory effect of aberration correction is obtained. Above the upper limit of conditional formula (8), the groups that do not include the negative lens element, which mainly corrects lateral chromatic aberration (which rays strike at great heights), have a comparatively weak optical power, and a diminished effect of aberration correction results. It is further preferable that whichever of the α-th and β-th groups includes the negative lens element have a negative optical power. For example, it is preferable that the negative lens element be included in the third group in a five-group design with a negative-positive-negative-positive-positive power arrangement and in the fourth group in a five-group design with a negative-positive-positive-negative-positive power arrangement.

In a case where the γ-th group is a movable group, it is preferable that it be composed of two or less lens elements. Reducing the number of lens elements in a lens group located close to the enlargement side and having a comparatively large lens diameter makes it possible to obtain a low-cost projection lens system.

It is preferable that the first group (that is, the most enlargement-side group) include at least one negative lens element formed of a lens material that fulfills conditional formula (7) below.

$$0.652 < Pg,F + 0.00181 \times vd \quad (7)$$

where
  Pg,F represents the partial dispersion ratio of the lens material; and
  vd represents the Abbe number of the lens material.

In the first group at the wide-angle end, rays on and near the optical axis and off-axial rays have greatly different passage positions. In the construction under discussion, arranging a lens element having the property given by conditional formula (7) in the first group makes it possible to reduce lateral chromatic aberration at the wide-angle end. It is then possible to satisfactorily correct lateral chromatic aberration, in particular, on the wide-angle side where rays strike at great heights.

It is preferable that the most enlargement-side lens element in the δ-th group be a negative lens element that fulfills conditional formula (7) below.

$$0.652 < Pg,F + 0.00181 \times vd \quad (7)$$

where
  Pg,F represents the partial dispersion ratio of the lens material; and
  vd represents the Abbe number of the lens material.

Using as the most enlargement-side lens element in the δ-th group a negative lens element that fulfills conditional formula (7) makes it possible to satisfactorily correct longitudinal chromatic aberration. Moreover, this construction is also effective in reducing the amount of image point variation resulting from a rise in the temperature of the projector.

With respect to the composite optical power of the α-th and β-th groups, it is preferable that conditional formulae (X9A) and (X9B) below be fulfilled.

$$0.9 < \Phi\alpha\beta W/\Phi\alpha\beta T < 1.1 \quad (X9A)$$

$$0.9 < \Phi\alpha\beta M/\Phi\alpha\beta T < 1.1 \quad (X9B)$$

where
  $\Phi\alpha\beta T$ represents the composite optical power of the α-th and β-th groups at the telephoto end;
  $\Phi\alpha\beta M$ represents the composite optical power of the α-th and β-th groups at the middle position; and
  $\Phi\alpha\beta W$ represents the composite optical power of the α-th and β-th groups at the wide-angle end.

Conditional formulae (X9A) and (X9B) indicate that the movement amounts of the α-th and β-th groups differ slightly. Giving a slight difference between the movement amounts of the α-th and β-th groups makes it possible to optimize various aberrations over the range from the telephoto end through the middle position to the wide-angle end. It is also possible to maintain satisfactory lateral chromatic aberration performance while satisfactorily correcting curvature of field over the entire zoom range.

Below the lower limit of conditional formula (X9A) or (X9B), increased variation in curvature of field results over the range from the telephoto end through the middle position to the wide-angle end, and thus degraded lateral chromatic aberration results, leading to degraded projection performance. On the other hand, above the upper limit of conditional formula (X9A) or (X9B), degraded curvature of field results at the middle position and at the wide-angle end, and thus degraded lateral chromatic aberration results, leading to degraded projection performance.

It is further preferable that conditional formulae (X9Aa) or (X9Ba) below be fulfilled. Conditional formulae (X9Aa) and (X9Ba) define further preferable conditional ranges within the conditional ranges defined by conditional formulae (X9A) and (X9B) above, and settings that fulfill (X9Aa) or (X9Ba) below allow more effective prevention of degraded curvature of field and lateral chromatic aberration.

$$0.95 < \Phi\alpha\beta W/\Phi\alpha\beta T < 1.05 \quad (X9Aa)$$

$$0.95 < \Phi\alpha\beta M/\Phi\alpha\beta T < 1.05 \quad (X9Ba)$$

A preferred example of a projection lens system according to the invention is a projection lens system of a five-group design which is composed of, from the enlargement side, a first group having a negative optical power, a second group having a positive optical power, a third group, a fourth group, and a fifth group having a positive optical power and which achieves zooming by varying the distances between the groups (an optical power denotes the quantity defined as the reciprocal of a focal length). It is further characterized as follows. On the reduction side of the most reduction-side lens element in the fourth group, an aperture stop is arranged. During zooming from the telephoto end to the wide-angle end through a predetermined middle position that fulfills conditional formula (0) below, the first and fifth groups remain stationary, the composite optical power of the third and fourth groups is constantly positive, and the third and fourth groups move from the enlargement side to the reduction side. Conditional formulae (1A), (1B), (2A), (2B), (3A), and (3B) are fulfilled.

$$0.99 < fm/(ft \times fw)^{1/2} < 1.01 \quad (0)$$

$$7 < |\Delta TM3/\Delta TM2| \quad (1A)$$

$$7 < |\Delta TW3/\Delta TW2| \quad (1B)$$

$$7 < |\Delta TM4/\Delta TM2| \quad (2A)$$

$$7 < |\Delta TW4/\Delta TW2| \quad (2B)$$

$$0.9 < \Delta TM4/\Delta TM3 < 1.1 \quad (3A)$$

$$0.9 < \Delta TW4/\Delta TW3 < 1.1 \quad (3B)$$

where
  ft represents the focal length of the entire system at the telephoto end;
  fm represents the focal length of the entire system at the middle position;

fw represents the focal length of the entire system at the wide-angle end;

ΔTM2 represents the movement amount of the second group from the telephoto end to the middle position;

ΔTM3 represents the movement amount of the third group from the telephoto end to the middle position;

ΔTM4 represents the movement amount of the fourth group from the telephoto end to the middle position;

ΔTW2 represents the movement amount of the second group from the telephoto end to the wide-angle end;

ΔTW3 represents the movement amount of the third group from the telephoto end to the wide-angle end; and ΔTW4 represents the movement amount of the fourth group from the telephoto end to the wide-angle end.

Conditional formula (1A), (1B), (2A), and (2B) indicate that the third and fourth groups move more than the second group. Owing to the large movement of the third and fourth groups, which are located on the enlargement side of the aperture stop, it is easy to correct, in particular, lateral chromatic aberration; in this connection, conditional formula (1A), (1B), (2A), and (2B) define the optimum movement amounts in projection lens systems adapted for high-resolution image display devices. Below the lower limit of conditional formula (1A), (1B), (2A), or (2B), degraded curvature of field results, in particular, at great image heights (that is, at large viewing angles) at the middle position (the zoom position given by conditional formula (0)) and at the wide-angle end, leading to degraded projection performance.

It is preferable that conditional formulae (1Aa), (1Ba), (2Aa), or (2Ba) be fulfilled, and it is further preferable that conditional formulae (1Ab), (1Bb), (2Ab), or (2Bb) be fulfilled. These conditional formulae (1Aa), (1Ba), (2Aa), (2Ba), (1Ab), (1Bb), (2Ab), and (2Bb) define further preferable conditional ranges within the conditional ranges defined by conditional formulae (1A), (1B), (2A), and (2B) above, and settings below the upper limit of conditional formulae (1Aa), (1Ba), (2Aa), (2Ba), (1Ab), (1Bb), (2Ab), or (2Bb) below allow more effective prevention of degraded curvature of field.

$$7 < |\Delta TM3/\Delta TM2| < 500 \quad (1Aa)$$

$$7 < |\Delta TW3/\Delta TW2| < 500 \quad (1Ba)$$

$$7 < |\Delta TM4/\Delta TM2| < 500 \quad (2Aa)$$

$$7 < |\Delta TW4/\Delta TW2| < 500 \quad (2Ba)$$

$$7 < |\Delta TM3/\Delta TM2| < 20 \quad (1Ab)$$

$$7 < |\Delta TW3/\Delta TW2| < 20 \quad (1Bb)$$

$$7 < |\Delta TM4/\Delta TM2| < 20 \quad (2Ab)$$

$$7 < |\Delta TW4/\Delta TW2| < 20 \quad (2Bb)$$

In a projection lens system according to the invention, the second, third, and fourth groups are movable groups. The distances between those groups vary during zooming, and the third and fourth groups move in one of the following four patterns: a pattern where their distance becomes smallest in the middle of zooming; a pattern where their distance becomes greatest in the middle of zooming; a pattern where their distance monotonically increases with zooming; and pattern where their distance monotonically decreases with zooming. Conditional formulae (3A) and (3B) indicate that the movement amounts of the third and fourth groups differ slightly, and giving a slight difference between the movement amounts of the third and fourth groups makes it possible to optimize various aberrations over the range from the telephoto end through the middle position to the wide-angle end.

Below the lower limit of conditional formula (3A) or (3B), increased variation in curvature of field results over the range from the telephoto end through the middle position to the wide-angle end, and thus degraded lateral chromatic aberration results, leading to degraded projection performance. On the other hand, above the upper limit of conditional formula (3A) or (3B), degraded curvature of field results at the middle position and at the wide-angle end, and thus degraded lateral chromatic aberration results, leading to degraded projection performance. Since a projection lens system according to the invention has a five-group design, even when ΔTM4/ΔTM3=1 and ΔTW4/ΔTW3=1, no assumption is made for cases where the movement loci on the way completely coincide.

With the distinctive construction described above, a projection lens system can maintain satisfactory lateral chromatic aberration performance during zooming while satisfactorily correcting curvature of field over the entire zoom range. Using such a projection lens system in projectors contributes to making them compact, high-performance, versatile, and otherwise improving them. A discussion will now be given of conditions etc. for obtaining those benefits with a proper balance and for achieving higher optical performance, further compactness, etc.

It is preferable that the aperture stop be stationarily arranged in the fifth group, and that conditional formulae (4) and (5) below be fulfilled.

$$20 < |exp/ft| \quad (4)$$

$$1.3 < ft/fw \quad (5)$$

where exp represents the paraxial exit pupil position with respect to the reduction-side paraxial image plane (that is, the distance from the reduction-side paraxial image plane to the paraxial exit pupil).

Arranging the aperture stop stationarily in the fifth group makes it possible to suppress variation in telecentricity resulting from zooming. It is also possible to reduce movable components, and this helps simplify the holding construction of the projection lens system.

Conditional formula (4) defines telecentricity. Below the lower limit of conditional formula (4), off-axial rays have large angles. This, for example, degrades the efficiency of color integration by a dichroic prism used in projectors, and degrades the efficiency of intake of illumination light by a TIR (total internal reflection) prism in projectors that employ a digital micromirror device. Thus, degraded image quality such as uneven illuminance may result.

To effectively suppress the above-mentioned degradation in efficiency, it is further preferable that conditional formula (4a) below be fulfilled. Conditional formula (4a) defines a further preferable conditional range within the conditional range defined by conditional formula (4) above.

$$30 < |exp/ft| \quad (4a)$$

Conditional formula (5) defines a preferable zoom ratio. Fulfilling conditional formula (5) means a high zoom ratio. While the common zoom ratio is about 1.2, fulfilling conditional formula (5) such that the zoom ratio is, for example, 1.3 to 1.6 makes it possible to make the projection lens system usable in a wider variety of environments.

When the distance from the lens surface located at the most reduction-side position in the third group to the lens surface located at the most enlargement-side position in the fourth group is referred to as the third-to-fourth-group distance, with respect to zooming from the telephoto end through the middle position to the wide-angle end, it is preferable that conditional formula (6) below be fulfilled.

$$0.001 < (Lmax - Lmin)/\Delta m < 0.040 \tag{6}$$

where
- Lmax represents the maximum value of the third-to-fourth-group distance among its values at the telephoto end, the middle position, and the wide-angle end;
- Lmin represents the minimum value of the third-to-fourth-group distance among its values at the telephoto end, the middle position, and the wide-angle end; and
- $\Delta zm$ represents the larger of $\Delta TW3$ and $\Delta TW4$.

Conditional formula (6) indicates that the movement amounts of the third and fourth groups differ slightly. Giving a slight difference between the movement amounts of the third and fourth groups makes it possible to optimize various aberrations over the range from the telephoto end through the middle position to the wide-angle end. It is also possible to maintain satisfactory lateral chromatic aberration performance while satisfactorily correcting curvature of field over the entire zoom range. Below the lower limit of conditional formula (6), the difference between Lmax and Lmin and hence the difference between the loci of the third and fourth groups during zooming is so close to zero that an insufficient effect of aberration correction results. On the other hand, above the upper limit of the conditional formula (6), the variation is so large that aberrations are overcorrected.

It is preferable that one or both of the third and fourth groups include a positive lens element, that only one of the third and fourth groups include one negative lens element, that the total number of lens elements constituting the third and fourth groups be three or four, and that the at least one positive lens element be formed of a lens material that fulfills conditional formula (7) below.

$$0.652 < Pg, F + 0.00181 \times vd \tag{7}$$

where
- Pg,F represents the partial dispersion ratio of the lens material; and
- vd represents the Abbe number of the lens material.

With the above construction, the inclusion of an anomalous-dispersion positive lens element that fulfills conditional formula (7) in the third and fourth groups having large movement amounts makes it possible to correct lateral chromatic aberration satisfactorily. Accordingly, outside the conditional range given by conditional formula (7), it is difficult to correct lateral chromatic aberration satisfactorily. In conditional formula (7), the partial dispersion ratio Pg,F=(ng−nF)/(nF−nC) (where ng, nF, and nC represent the refractive indices for the g-, F-, and C-lines respectively).

With a construction where the third and fourth groups move greatly to the reduction side during zooming from the telephoto end to the wide-angle end, it is possible to raise the ray passage positions at the telephoto end and lower them at the wide-angle end. As shown in the optical path diagrams (FIGS. 10 to 18) referred to later, the ray passage positions of off-axial rays in the third and fourth groups at the wide-angle end are close to those of axial rays. Thus, at the wide-angle end, the effect of refracting off-axial rays in the third and fourth groups is almost the same as the effect of refracting axial rays. Accordingly, at the wide-angle end, in the third and fourth groups, the difference between the lateral chromatic aberration occurring in off-axial rays and the lateral chromatic aberration occurring on and near the optical axis is small, and the occurring lateral chromatic aberration is small.

On the other hand, the beam width of off-axial rays passing through the third and fourth groups is large at the telephoto end and is small at the wide-angle end. Thus, the effect of refracting off-axial rays at the telephoto end gradually increases the farther away from the optical axis; accordingly, it is possible to gradually increase the effect of correcting lateral chromatic aberration the farther away from the optical axis, and thus it is possible to obtain a sufficient effect of correcting lateral chromatic aberration at image positions between the axial and most off-axial positions. In this construction, arranging a lens element having the property given by conditional formula (7) in the third and fourth groups makes it possible to suppress occurrence of and variation in lateral chromatic aberration over the range from the telephoto end to the wide-angle end.

It is further preferable that conditional formula (7a) below be fulfilled. Conditional formula (7) defines a further preferable conditional range within the conditional range defined by conditional formula (7) above.

$$0.67 < Pg, F + 0.00181 \times vd \tag{7a}$$

With respect to the negative lens element that is included in one of the third and fourth groups, it is preferable that conditional formula (8) below be fulfilled.

$$\Phi n/\Phi w < 0.1 \tag{8}$$

where
- $\Phi n$ represents the optical power of the group that includes the negative lens element; and
- $\Phi w$ represents the optical power of the entire system at the wide-angle end.

Conditional formula (8) defines, with respect to the optical power of whichever of the third and fourth groups includes the negative lens element, a range in which a satisfactory effect of aberration correction is obtained. Above the upper limit of conditional formula (8), the groups that do not include the negative lens element, which mainly corrects lateral chromatic aberration (which rays strike at great heights), have a comparatively weak optical power, and a diminished effect of aberration correction results. It is further preferable that whichever of the third and fourth groups includes the negative lens element have a negative optical power. That is, it is preferable that the negative lens element be included in the third group in a five-group design with a negative-positive-negative-positive-positive power arrangement and in the fourth group in a five-group design with a negative-positive-positive-negative-positive power arrangement.

It is preferable that the second group be composed of two or less lens elements. Reducing the number of lens elements in the second group located close to the enlargement side and having a comparatively large lens diameter makes it possible to obtain a low-cost projection lens system.

It is preferable that the first group include at least one negative lens element formed of a lens material that fulfills conditional formula (7) below.

$$0.652 < Pg, F + 0.00181 \times vd \tag{7}$$

where
- Pg,F represents the partial dispersion ratio of the lens material; and
- vd represents the Abbe number of the lens material.

In the first group at the wide-angle end, rays on and near the optical axis and off-axial rays have greatly different passage positions. In the construction under discussion, arranging a lens element having the property given by conditional formula (7) in the first group makes it possible to reduce lateral chromatic aberration at the wide-angle end. It is then possible to satisfactorily correct lateral chromatic aberration, in particular, on the wide-angle side where rays strike at great heights.

It is preferable that the most enlargement-side lens element in the fifth group be a negative lens element that fulfills conditional formula (7) below.

$$0.652 < Pg, F + 0.00181 \times vd \quad (7)$$

where
Pg,F represents the partial dispersion ratio of the lens material; and
vd represents the Abbe number of the lens material.

Using as the most enlargement-side lens element in the fifth group a negative lens element that fulfills conditional formula (7) makes it possible to satisfactorily correct longitudinal chromatic aberration. Moreover, this construction is also effective in reducing the amount of image point variation resulting from a rise in the temperature of the projector.

With respect to the composite optical power of the third and fourth groups, it is preferable that conditional formulae (9A) and (9B) below be fulfilled.

$$0.9 < \Phi 34W/\Phi 34T < 1.1 \quad (9A)$$

$$0.9 < \Phi 34M/\Phi 34T < 1.1 \quad (9B)$$

where
Φ34T represents the composite optical power of the third and fourth groups at the telephoto end;
Φ34M represents the composite optical power of the third and fourth groups at the middle position; and
Φ34W represents the composite optical power of the third and fourth groups at the wide-angle end.

Conditional formulae (9A) and (9B) indicate that the movement amounts of the third and fourth groups differ slightly. Giving a slight difference between the movement amounts of the third and fourth groups makes it possible to optimize various aberrations over the range from the telephoto end through the middle position to the wide-angle end. It is also possible to maintain satisfactory lateral chromatic aberration performance while satisfactorily correcting curvature of field over the entire zoom range.

Below the lower limit of conditional formula (9A) or (9B), increased variation in curvature of field results over the range from the telephoto end through the middle position to the wide-angle end, and thus degraded lateral chromatic aberration results, leading to degraded projection performance. On the other hand, above the upper limit of conditional formula (9A) or (9B), degraded curvature of field results at the middle position and at the wide-angle end, and thus degraded lateral chromatic aberration results, leading to degraded projection performance.

It is further preferable that conditional formulae (9Aa) or (9Ba) below be fulfilled. Conditional formulae (9Aa) and (9Ba) define further preferable conditional ranges within the conditional ranges defined by conditional formulae (9A) and (9B) above, and settings that fulfill (9Aa) or (9Ba) below allow more effective prevention of degraded curvature of field and lateral chromatic aberration.

$$0.95 < \Phi 34W/\Phi 34T < 1.05 \quad (9Aa)$$

$$0.95 < \Phi 34M/\Phi 34T < 1.05 \quad (9Ba)$$

Next, by way of a first to an eleventh embodiment of the invention, a description will be given of specific optical constructions of projection lens systems LN having a zooming capability. FIGS. 1 to 11 are optical construction diagrams corresponding to projection lens systems LN according to the first to eleventh embodiments of the invention, showing their respective lens arrangement etc. at the telephoto end (T) in an optical section. FIGS. 12 to 22 are optical path diagrams corresponding to the first to eleventh embodiments respectively, showing their respective optical path etc. at the telephoto end (T), the middle position (M, the middle-focal-length state), and the wide-angle end (W) in an optical section.

In FIGS. 1 to 11, the axial distances indicated by di (i=1, 2, 3, . . . ) are, of all the i-th axial distances counted from the enlargement side, those which vary during zooming, and Li (i=1, 2, 3, . . . ) indicates the i-th lens element counted from the enlargement side. In each optical construction diagram, movement loci m1, m2, m3, m4, m5, m6, and m7 schematically indicate the movement, from the telephoto end (T) to the wide-angle end (W), of a first group Gr1, a second group Gr2, a third group Gr3, a fourth group Gr4, a fifth group Gr5, a sixth group Gr6 (a plane-parallel plate in the first to ninth and eleventh embodiments), and a seventh group Gr7 (a plane-parallel plate in the tenth embodiment) respectively. The first group Gr1 and the last group (the fifth group Gr5 in the first to ninth and eleventh embodiments, and the sixth group Gr6 in the tenth embodiment) are stationary groups, and a group of plane-parallel plates arranged on the reduction side of the projection lens system LN also is stationary during zooming. The group of plane-parallel plates includes a prism PR (for example, a TIR prism) and the cover glass CG of an image display device.

The projection lens systems LN according to the first to ninth and eleventh embodiments (FIGS. 1 to 9, 11, etc.) are zooming lens systems for projectors which achieve zooming by moving the second to fourth groups Gr2 to Gr4 along the optical axis AX, and are composed of five groups, namely, from the enlargement side, a first group Gr1 having a negative optical power, a second group Gr2 having a positive optical power, a third group Gr3, a fourth group Gr4, and a fifth group Gr5 having a positive optical power. For example, the first to sixth and eighth embodiments deal with zooming lens systems of a five-group design with a negative-positive-negative-positive-positive power arrangement from the enlargement side; the seventh embodiment deals with a zooming lens system of a five-group design with a negative-positive-positive-negative-positive power arrangement from the enlargement side; and the ninth embodiment deals with a zooming lens system of a five-group design with a negative-positive-positive-positive-positive power arrangement from the enlargement side. The projection lens system LN according to the tenth embodiment (FIG. 10 etc.) is a zooming lens system for projectors which achieve zooming by moving the second to fifth groups Gr2 to Gr5 along the optical axis AX, and is composed of six groups, namely, from the enlargement side, a first group Gr1 having a negative optical power; a second group Gr2 having a positive optical power, a third group Gr3 having a negative optical power, a fourth group Gr4 having a positive optical power, a fifth group Gr5 having a positive optical power, and a sixth group Gr6 having a positive optical power. Here, zooming lens systems encompass lens systems that can vary their focal length, such as zoom lens systems, varifocal lens systems, etc.

In the first and ninth embodiments, the movement amounts of the third and fourth groups Gr3 and Gr4 are equal, and therefore either may be considered the α-th group with the other considered the β-th group. In the second to seventh embodiments, the third group Gr3 is the β-th group and the fourth group Gr4 is the α-th group. In the eighth and tenth embodiments, the third group Gr3 is the α-th group and the fourth group Gr4 is the β-th group. In the eleventh embodiment, the second group Gr2 is the β-th group and the third group Gr3 is a α-th group. In the tenth embodiment, what corresponds to the fifth group Gr5 in the first to ninth embodiments is further divided into two groups, of which the enlargement-side lens group is a movable group. In the first embodiment, what corresponds to the second group Gr2 in the first to ninth embodiments is stationary, and what corresponds to the fifth group Gr5 there is further divided into two groups, of which the enlargement-side lens group is a movable group.

Figure 56:
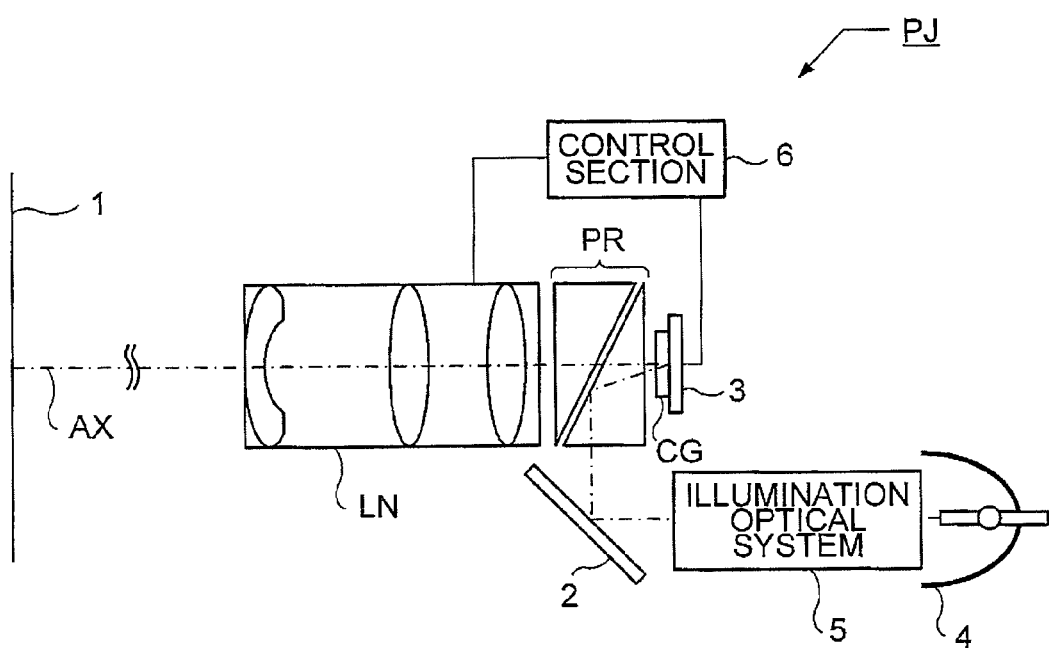
FIGS. 56 is an aberrations diagrams showing an example of the configuration of a projector in outline.

Next, a description will be given of a projector as an embodiment to which a projection lens system LN is applied. FIG. 56 shows an example of the configuration of the projector PJ in outline. The projector PJ includes a projection lens system LN, a reflective mirror 2, an image display device 3, a light source 4, an illumination optical system 5, a control section 6, a prism PR, etc. The control section 6 is the part that governs the overall control of the projector PJ. The image display device 3 is an image modulation device that modulates light to produce an image, and is provided with cover glass CG on the display surface on which it displays the image. The light from the light source 4 is directed to the image display device 3 via the illumination optical system 5, the reflective mirror 2, and the prism PR. The prism PR is, for example, a TIR prism (or a color splitting/integrating prism, or the like), and separates illumination light and projection light. The image displayed on the image display device 3 is projected through the projection lens system LN onto a screen surface 1 on a magnified scale.

The second, third, and fourth groups Gr2, Gr3, and Gr4, which are movable groups, each have an actuator (not shown) connected to them which move them along the optical axis AX to the enlargement side or to the reduction side. To the actuators, the control section 6 is connected, which controls the movement of the movable groups. The lens groups may instead be moved manually without the use of the control section 6 and the actuators.

EXAMPLES

Hereinafter, the construction and other features of projection lens systems according to the invention will be described in more detail with reference to their construction data etc. of practical examples. Examples 1 to 11 (EX1 to EX11) presented below are numerical examples corresponding to the first to eleventh embodiments described above respectively, and the optical construction diagrams (FIGS. 1 to 11) and the optical path diagrams (FIGS. 12 to 22) showing the first to eleventh embodiments also show the lens arrangement, optical path, etc. of the corresponding ones of Examples 1 to 11 respectively.

In the construction data of each example, listed as surface data are, from the leftmost column rightward, surface number i, radius of curvature r (mm), axial face-to-face distance d (mm), refractive index Nd for the d-line (with a wavelength of 587.56 nm), and Abbe number for the d-line. Listed as miscellaneous data are $\sqrt{ft \times fw}$, value corresponding to conditional formula (0), image height (Y', mm), and, for each of different zoom positions, focal length (FL, mm) of the entire system, f-number (FNO), half viewing angle (ω, degrees (°)), back focus (BF, mm), lens total length (TL, mm), and variable axial distances di (mm). Listed as zooming lens group data are the focal lengths (mm) of the individual groups.

The back focus BF is the air-equivalent distance from the last surface of the lens system to the paraxial image plane IM. The lens total length TL is the sum of the distance from the foremost surface (beam restricting surface) to the last surface of the projection lens system LN and the back focus. LAST (paraxial) represents the last axial distance with respect to the reduction-side paraxial image plane IM, and is a distance that varies during zooming. Tables 1 to 4 list the values corresponding to the conditional formulae in each example.

FIGS. 23 to 55 are aberration diagrams corresponding three-by-three to one of Examples 1 to 11 (EX1 to EX11) respectively, FIGS. 23, 26, 29, 32, 35, 38, 41, 44, 47, 50, and 53 showing the aberrations observed at the telephoto end (T), FIGS. 24, 27, 30, 33, 36, 39, 42, 45, 48, 51, and 54 showing the aberrations observed at the middle position (M, the middle focal length state), and FIGS. 25, 28, 31, 34, 37, 40, 43, 46, 49, 52, and 55 showing the aberrations observed at the wide-angle end (W). FIGS. 23A to 55A show spherical aberration (mm) etc., FIGS. 23B to 55B show astigmatism (mm), FIGS. 23C to 55C show distortion (%), and FIGS. 23D to 55D show lateral chromatic aberration (mm) (H representing the height of incidence (mm) and Y' representing the maximum image height (mm)).

In the spherical aberration diagrams, FIGS. 23A to 55A, the solid line represents the spherical aberration for the e-line (with a wavelength of 546.1 nm), the dash-and-dot line represents the spherical aberration for a wavelength of 460 nm, the dash-dot-dot line represents the spherical aberration for a wavelength of 620 nm, and the broken line SC represents the deviation from the sine condition. In the astigmatism diagrams, FIGS. 23B to 55B, DT indicates the tangential image plane and DS indicates the sagittal image plane, different lines representing the astigmatism for the e-line (with a wavelength of 546.1 nm), a wavelength of 460 nm, and a wavelength of 620 nm respectively. In the distortion diagrams, FIGS. 23C to 55C, the solid line represents the distortion (%) for the e-line. In the lateral chromatic aberration diagrams, FIGS. 23D to 55D, the solid line represents the lateral chromatic aberration for a wavelength of 460 nm, and the broken line represents the lateral chromatic aberration for a wavelength of 620 nm.

In cases where the lens systems of the examples are used as projection lens systems in projectors (for example, liquid crystal projectors), in reality the screen surface (projection surface) serves as the image plane and the image display surface (for example the liquid crystal panel surface) serves as the object plane; in each example, however, the lens system is optically designed as a reduction system, and its optical performance is evaluated at the image display surface (image plane IM), with the screen surface regarded as the object plane. As will be understood from the resulting optical performance, the zooming lens systems of the examples are suitably used not only as projection lens systems in projectors but also as taking lens systems in image taking apparatuses (for example, video cameras and digital cameras).

In all of Examples 1 to 11, the projection distance is 45 m, the image circle is 40 mm, and the f-number is 2.5. The composite optical power Φ34 of the third and fourth groups Gr3 and Gr4 is constantly positive over the range from the telephoto end (T) to the wide-angle end (W), and fulfills conditional formulae (9A) and (9B). The first group Gr1 includes at least one negative lens element that fulfills conditional formula (7) (in some of the examples, conditional formula (7a) is fulfilled). At the most enlargement-side position in the fifth group Gr5, a negative lens element that fulfills conditional formula (7) is arranged (in some of the examples, conditional formula (7a) is fulfilled). The composite optical power Φαβ of the α-th and β-th groups is always positive over the range from the telephoto end (T) to the wide-angle end (W), and fulfills conditional formulae (X9A) and (X9B). The γ-th group has at least one negative lens element that fulfills conditional formula (7) (in some of the examples, conditional formula (7a) is fulfilled). At the most enlargement-side position in the δ-th group, a negative lens element that fulfills conditional formula (7) is arranged (in some of the examples, conditional formula (7a) is fulfilled).

Example 1 has a five-group design with a negative-positive-negative-positive-positive power arrangement, composed of a first group Gr1 including four lens elements, a second group Gr2 including two lens elements, a third group Gr3 including two lens elements, a fourth group Gr4 including one lens element, and a fifth group Gr5 including eight lens elements, and hence a total of 17 lens elements. The 1st to 37th surfaces are lens surfaces, and the 38th and following surfaces are the surfaces of the prism PR and the cover glass CG of the image display device 3. The 1st and 14th surfaces are beam restricting surfaces.

In Example 1, the zoom ratio is 1.36 times, and conditional formula (5) is fulfilled. The aperture stop is kept in a fixed position (as the 21st surface) between the most reduction-side lens element in the fourth group Gr4 and the most enlargement-side negative lens element in the fifth group Gr5, and fulfills conditional formulae (4) and (4a). Although the aperture stop is kept in a fixed position in this example, it may be moved so far as it does not interfere with another component. In that case, from the viewpoint of efficiency, it is preferable that it be moved while fulfilling conditional formulae (4) and (4a).

In Example 1, the second, third, and fourth groups Gr2, Gr3, and Gr4 move in the same direction, and conditional formulae (1A), (1B), (2A), (2B), (3A), and (3B) are fulfilled. The third-to-fourth-group distance takes the minimum value Lmin at the middle position (M), takes the maximum value Lmax at the telephoto end (T) and the wide-angle end (W), and fulfills conditional formula (6). In a case as here where the third-to-fourth-group distance takes the minimum value at the middle position (M), the minimum value of the third-to-fourth-group distance over the entire zoom range does not necessarily have to be exactly equal to Lmin.

In Example 1, the third and fourth groups Gr3 and Gr4 include positive lens elements, and the third group Gr3 includes one negative lens element. The total number of lens elements that constitute the third and fourth groups Gr3 and Gr4 is three, and the two positive lens elements both fulfill conditional formulae (7) and (7a). With respect to the third group Gr3, since Φn is negative, conditional formula (8) is fulfilled.

Example 2 has a five-group design with a negative-positive-negative-positive-positive power arrangement, composed of a first group Gr1 including four lens elements, a second group Gr2 including one lens element, a third group Gr3 including two lens elements, a fourth group Gr4 including one lens element, and a fifth group Gr5 including eight lens elements, and hence a total of 16 lens elements. The 1st to 35th surfaces are lens surfaces, and the 36th and following surfaces are the surfaces of the prism PR and the cover glass CG of the image display device 3. The 1st and 12th surfaces are beam restricting surfaces.

In Example 2, the zoom ratio is 1.45 times, and conditional formula (5) is fulfilled. The aperture stop is kept in a fixed position (as the 19th surface) between the most reduction-side lens element in the fourth group Gr4 and the most enlargement-side negative lens element in the fifth group Gr5, and fulfills conditional formula (4). Although the aperture stop is kept in a fixed position in this example, it may be moved so far as it does not interfere with another component. In that case, from the viewpoint of efficiency, it is preferable that it be moved while fulfilling conditional formula (4).

In Example 2, the second, third, and fourth groups Gr2, Gr3, and Gr4 move in the same direction, and conditional formulae (1A), (1B), (2A), (2B), (3A), and (3B) are fulfilled. The third-to-fourth-group distance takes the minimum value Lmin at the middle position (M), takes the maximum value Lmax at the wide-angle end (W), and fulfills conditional formula (6). In a case as here where the third-to-fourth-group distance takes the minimum value at the middle position (M), the minimum value of the third-to-fourth-group distance over the entire zoom range does not necessarily have to be exactly equal to Lmin.

In Example 2, the third and fourth groups Gr3 and Gr4 include positive lens elements, and the third group Gr3 includes one negative lens element. The total number of lens elements that constitute the third and fourth groups Gr3 and Gr4 is three, and only the positive lens element in the fourth group Gr4 fulfills conditional formulae (7) and (7a). With respect to the third group Gr3, since Φn is negative, conditional formula (8) is fulfilled.

Example 3 has a five-group design with a negative-positive-negative-positive-positive power arrangement, composed of a first group Gr1 including four lens elements, a second group Gr2 including two lens elements, a third group Gr3 including two lens elements, a fourth group Gr4 including two lens elements, and a fifth group Gr5 including eight lens elements, and hence a total of 18 lens elements. The 1st to 39th surfaces are lens surfaces, and the 40th and following surfaces are the surfaces of the prism PR and the cover glass CG of the image display device 3. The 1st and 14th surfaces are beam restricting surfaces.

In Example 3, the zoom ratio is 1.50 times, and conditional formula (5) is fulfilled. The aperture stop is kept in a fixed position (as the 23rd surface) between the most reduction-side lens element in the fourth group Gr4 and the most enlargement-side negative lens element in the fifth group Gr5, and fulfills conditional formulae (4) and (4a). Although the aperture stop is kept in a fixed position in this example, it may be moved so far as it does not interfere with another component. In that case, from the viewpoint of efficiency, it is preferable that it be moved while fulfilling conditional formulae (4) and (4a).

In Example 3, the second, third, and fourth groups Gr2, Gr3, and Gr4 move in the same direction, and conditional formulae (1A), (1B), (2A), (2B), (3A), and (3B) are fulfilled. The third-to-fourth-group distance takes the minimum value Lmin at the middle position (M), takes the maximum value Lmax at the wide-angle end (W), and fulfills conditional formula (6). In a case as here where the third-to-fourth-group distance takes the minimum value at the middle position (M), the minimum value of the third-to-fourth-group distance over the entire zoom range does not necessarily have to be exactly equal to Lmin.

In Example 3, the third and fourth groups Gr3 and Gr4 include positive lens elements, and the third group Gr3 includes one negative lens element. The total number of lens elements that constitute the third and fourth groups Gr3 and Gr4 is four, and the three positive lens elements all fulfill conditional formulae (7) and (7a). With respect to the third group Gr3, since Φn is negative, conditional formula (8) is fulfilled.

Example 4 has a five-group design with a negative-positive-negative-positive-positive power arrangement, composed of a first group Gr1 including four lens elements, a second group Gr2 including two lens elements, a third group Gr3 including two lens elements, a fourth group Gr4 including one lens element, and a fifth group Gr5 including eight lens elements, and hence a total of 17 lens elements. The 1st to 37th surfaces are lens surfaces, and the 38th and following surfaces are the surfaces of the prism PR and the cover glass CG of the image display device 3. The 1st and 14th surfaces are beam restricting surfaces.

In Example 4, the zoom ratio is 1.33 times, and conditional formula (5) is fulfilled. The aperture stop is kept in a fixed position (as the 25th surface) within the fifth group Gr5, and fulfills conditional formulae (4) and (4a). Although the aperture stop is kept in a fixed position in this example, it may be moved so far as it does not interfere with another component. In that case, from the viewpoint of efficiency, it is preferable that it be moved while fulfilling conditional formulae (4) and (4a).

In Example 4, the second, third, and fourth groups Gr2, Gr3, and Gr4 move in the same direction, and conditional formulae (1A), (1B), (2A), (2B), (3A), and (3B) are fulfilled. The third-to-fourth-group distance takes the minimum value Lmin at the middle position (M), takes the maximum value Lmax at the telephoto end (T), and fulfills conditional formula (6). In a case as here where the third-to-fourth-group distance takes the minimum value at the middle position (M), the minimum value of the third-to-fourth-group distance over the entire zoom range does not necessarily have to be exactly equal to Lmin.

In Example 4, the third and fourth groups Gr3 and Gr4 include positive lens elements, and the third group Gr3 includes one negative lens element. The total number of lens elements that constitute the third and fourth groups Gr3 and Gr4 is three, and the two positive lens elements both fulfill conditional formulae (7) and (7a). With respect to the third group Gr3, since Φn is negative, conditional formula (8) is fulfilled.

Example 5 has a five-group design with a negative-positive-negative-positive-positive power arrangement, composed of a first group Gr1 including four lens elements, a second group Gr2 including two lens elements, a third group Gr3 including two lens elements, a fourth group Gr4 including one lens element, and a fifth group Gr5 including eight lens elements, and hence a total of 17 lens elements. The 1st to 37th surfaces are lens surfaces, and the 38th and following surfaces are the surfaces of the prism PR and the cover glass CG of the image display device 3. The 1st and 14th surfaces are beam restricting surfaces.

In Example 5, the zoom ratio is 1.36 times, and conditional formula (5) is fulfilled. The aperture stop is kept in a fixed position (as the 21st surface) between the most reduction-side lens element in the fourth group Gr4 and the most enlargement-side negative lens element in the fifth group Gr5, and fulfills conditional formulae (4) and (4a). Although the aperture stop is kept in a fixed position in this example, it may be moved so far as it does not interfere with another component. In that case, from the viewpoint of efficiency, it is preferable that it be moved while fulfilling conditional formulae (4) and (4a).

In Example 5, the second, third, and fourth groups Gr2, Gr3, and Gr4 move in the same direction, and conditional formulae (1A), (1B), (2A), (2B), (3A), and (3B) are fulfilled. The third-to-fourth-group distance takes the minimum value Lmin at the middle position (M), takes the maximum value Lmax at the wide-angle end (W), and fulfills conditional formula (6). In a case as here where the third-to-fourth-group distance takes the minimum value at the middle position (M), the minimum value of the third-to-fourth-group distance over the entire zoom range does not necessarily have to be exactly equal to Lmin.

In Example 5, the third and fourth groups Gr3 and Gr4 include positive lens elements, and the third group Gr3 includes one negative lens element. The total number of lens elements that constitute the third and fourth groups Gr3 and Gr4 is three, and the two positive lens elements both fulfill conditional formulae (7). With respect to the third group Gr3, since Φn is negative, conditional formula (8) is fulfilled.

Example 6 has a five-group design with a negative-positive-negative-positive-positive power arrangement, composed of a first group Gr1 including four lens elements, a second group Gr2 including two lens elements, a third group Gr3 including one lens element, a fourth group Gr4 including two lens elements, and a fifth group Gr5 including eight lens elements, and hence a total of 17 lens elements. The 1st to 37th surfaces are lens surfaces, and the 38th and following surfaces are the surfaces of the prism PR and the cover glass CG of the image display device 3. The 1st and 14th surfaces are beam restricting surfaces.

In Example 6, the zoom ratio is 1.36 times, and conditional formula (5) is fulfilled. The aperture stop is kept in a fixed position (as the 21st surface) between the most reduction-side lens element in the fourth group Gr4 and the most enlargement-side negative lens element in the fifth group Gr5, and fulfills conditional formulae (4) and (4a). Although the aperture stop is kept in a fixed position in this example, it may be moved so far as it does not interfere with another component. In that case, from the viewpoint of efficiency, it is preferable that it be moved while fulfilling conditional formulae (4) and (4a).

In Example 6, the second group Gr2 moves in the opposite direction to the third and fourth groups Gr3 and Gr4, and conditional formulae (1A), (1B), (2A), (2B), (3A), and (3B) are fulfilled. The third-to-fourth-group distance takes the minimum value Lmin at the middle position (M), takes the maximum value Lmax at the wide-angle end (W), and fulfills conditional formula (6). In a case as here where the third-to-fourth-group distance takes the minimum value at the middle position (M), the minimum value of the third-to-fourth-group distance over the entire zoom range does not necessarily have to be exactly equal to Lmin.

In Example 6, the third group Gr3 includes one negative lens element and the fourth group Gr4 includes two positive lens elements. The total number of lens elements that constitute the third and fourth groups Gr3 and Gr4 is three, and the two positive lens elements both fulfill conditional formulae (7) and (7a). With respect to the third group Gr3, since Φn is negative, conditional formula (8) is fulfilled.

Example 7 has a five-group design with a negative-positive-positive-negative-positive power arrangement, composed of a first group Gr1 including four lens elements, a second group Gr2 including two lens elements, a third group Gr3 including one lens element, a fourth group Gr4 including two lens elements, and a fifth group Gr5 including eight lens elements, and hence a total of 17 lens elements. The 1st to 37th surfaces are lens surfaces, and the 38th and following surfaces are the surfaces of the prism PR and the cover glass CG of the image display device 3. The 1st and 14th surfaces are beam restricting surfaces.

In Example 7, the zoom ratio is 1.36 times, and conditional formula (5) is fulfilled. The aperture stop is kept in a fixed position (as the 21st surface) between the most reduction-side lens element in the fourth group Gr4 and the most enlargement-side negative lens element in the fifth group Gr5, and fulfills conditional formulae (4) and (4a). Although the aperture stop is kept in a fixed position in this example, it may be moved so far as it does not interfere with another component. In that case, from the viewpoint of efficiency, it is preferable that it be moved while fulfilling conditional formulae (4) and (4a).

In Example 7, the second group Gr2 moves in the opposite direction to the third and fourth groups Gr3 and Gr4, and conditional formulae (1A), (1B), (2A), (2B), (3A), and (3B) are fulfilled. The third-to-fourth-group distance takes the minimum value Lmin at the telephoto end (T), takes the maximum value Lmax at the wide-angle end (W), and fulfills conditional formula (6).

In Example 7, the third and fourth groups Gr3 and Gr4 include positive lens elements, and the fourth group Gr4 includes one negative lens element. The total number of lens elements that constitute the third and fourth groups Gr3 and Gr4 is three, and the two positive lens elements both fulfill conditional formulae (7) and (7a). With respect to the fourth group Gr4, since Φn is negative, conditional formula (8) is fulfilled.

Example 8 has a five-group design with a negative-positive-negative-positive-positive power arrangement, composed of a first group Gr1 including four lens elements, a second group Gr2 including two lens elements, a third group Gr3 including two lens elements, a fourth group Gr4 including one lens element, and a fifth group Gr5 including eight lens elements, and hence a total of 17 lens elements. The 1st to 37th surfaces are lens surfaces, and the 38th and following surfaces are the surfaces of the prism PR and the cover glass CG of the image display device 3. The 1st and 14th surfaces are beam restricting surfaces.

In Example 8, the zoom ratio is 1.36 times, and conditional formula (5) is fulfilled. The aperture stop is kept in a fixed position (as the 21st surface) between the most reduction-side lens element in the fourth group Gr4 and the most enlargement-side negative lens element in the fifth group Gr5, and fulfills conditional formulae (4) and (4a). Although the aperture stop is kept in a fixed position in this example, it may be moved so far as it does not interfere with another component. In that case, from the viewpoint of efficiency, it is preferable that it be moved while fulfilling conditional formulae (4) and (4a).

In Example 8, the second group Gr2 moves in the opposite direction to the third and fourth groups Gr3 and Gr4 from the telephoto end (T) to the middle position (M), and moves in the same direction as those from the middle position (M) to the wide-angle end (W). Moreover, conditional formulae (1A), (1B), (2A), (2B), (3A), and (3B) are fulfilled. The third-to-fourth-group distance takes the minimum value Lmin at the wide-angle end (W), takes the maximum value Lmax at the telephoto end (T), and fulfills conditional formula (6).

In Example 8, the third and fourth groups Gr3 and Gr4 include positive lens elements, and the third group Gr3 includes one negative lens element. The total number of lens elements that constitute the third and fourth groups Gr3 and Gr4 is three, and the two positive lens elements both fulfill conditional formulae (7) and (7a). With respect to the third group Gr3, since Φn is negative, conditional formula (8) is fulfilled.

Example 9 has a five-group design with a negative-positive-positive-positive-positive power arrangement, composed of a first group Gr1 including four lens elements, a second group Gr2 including two lens elements, a third group Gr3 including two lens elements, a fourth group Gr4 including one lens element, and a fifth group Gr5 including eight lens elements, and hence a total of 17 lens elements. The 1st to 37th surfaces are lens surfaces, and the 38th and following surfaces are the surfaces of the prism PR and the cover glass CG of the image display device 3. The 1st and 14th surfaces are beam restricting surfaces.

In Example 9, the zoom ratio is 1.36 times, and conditional formula (5) is fulfilled. The aperture stop is kept in a fixed position (as the 21st surface) between the most reduction-side lens element in the fourth group Gr4 and the most enlargement-side negative lens element in the fifth group Gr5, and fulfills conditional formulae (4) and (4a). Although the aperture stop is kept in a fixed position in this example, it may be moved so far as it does not interfere with another component. In that case, from the viewpoint of efficiency, it is preferable that it be moved while fulfilling conditional formulae (4) and (4a).

In Example 9, the second group Gr2 moves in the opposite direction to the third and fourth groups Gr3 and Gr4, and conditional formulae (1A), (1B), (2A), (2B), (3A), and (3B) are fulfilled. The third-to-fourth-group distance takes the maximum value Lmax at the middle position (M), takes the minimum value Lmin at the telephoto end (T) and the wide-angle end (W), and fulfills conditional formula (6). In a case as here where the third-to-fourth-group distance takes the maximum value at the middle position (M), the maximum value of the third-to-fourth-group distance over the entire zoom range does not necessarily have to be exactly equal to Lmax.

In Example 9, the third and fourth groups Gr3 and Gr4 include positive lens elements, and the third group Gr3 includes one negative lens element. The total number of lens elements that constitute the third and fourth groups Gr3 and Gr4 is three, and the two positive lens elements both fulfill conditional formulae (7) and (7a). With respect to the third group Gr3, since Φn is positive, conditional formula (8) is fulfilled.

Example 10 has a six-group design with a negative-positive-negative-positive-positive-positive power arrangement, composed of a first group Gr1 including four lens elements, a second group Gr2 including two lens elements, a third group Gr3 including two lens elements, a fourth group Gr4 including one lens element, a fifth group Gr5 including two lens elements, and a sixth group Gr6 including six lens elements, and hence a total of 17 lens elements. The 1st to 36th surfaces are lens surfaces, and the 37th and following surfaces (Gr7) are the surfaces of the prism PR and the cover glass CG of the image display device 3. The 1st surface is a beam restricting surface.

In Example 10, the zoom ratio is 1.45 times, and conditional formula (5) is fulfilled. The aperture stop is kept in a fixed position (as the 24th surface) between the most reduction-side lens element in the fifth group Gr5 and the most enlargement-side negative lens element in the sixth group Gr6, and fulfills conditional formulae (4) and (4a). Although the aperture stop is kept in a fixed position in this example, it may be moved so far as it does not interfere with another component. In that case, from the viewpoint of efficiency, it is preferable that it be moved while fulfilling conditional formulae (4) and (4a).

In Example 10, the second to fifth groups Gr2 to Gr5 move in the same direction, and conditional formulae (1A), (1B), (2A), (2B), (3A), and (3B) are fulfilled. The third-to-fourth-group distance takes the minimum value Lmin at the middle position (M), takes the maximum value Lmax at the telephoto end (T), and fulfills conditional formula (6). In a case as here where the third-to-fourth-group distance takes the minimum value at the middle position (M), the minimum value of the third-to-fourth-group distance over the entire zoom range does not necessarily have to be exactly equal to Lmin.

In Example 10, the third and fourth groups Gr3 and Gr4 include positive lens elements, and the third group Gr3 includes one negative lens element. The total number of lens elements that constitute the third and fourth groups Gr3 and Gr4 is three, and the two positive lens elements both fulfill conditional formulae (7) and (7a). With respect to the third group Gr3, since Φn is negative, conditional formula (8) is fulfilled.

Example 11 has a five-group design with a negative-negative-positive-positive-positive power arrangement, composed of a first group Gr1 including six lens elements, a second group Gr2 including two lens elements, a third group Gr3 including one lens element, a fourth group Gr4 including two lens elements, and a fifth group Gr5 including six lens elements, and hence a total of 17 lens elements. The 1st to 36th surfaces are lens surfaces, and the 37th and following surfaces (Gr6) are the surfaces of the prism PR and the cover glass CG of the image display device 3. The 1st surface is a beam restricting surfaces.

In Example 11, the zoom ratio is 1.45 times, and conditional formula (5) is fulfilled. The aperture stop is kept in a fixed position (as the 24th surface) between the most reduction-side lens element in the fourth group Gr4 and the most enlargement-side negative lens element in the fifth group Gr5, and fulfills conditional formulae (4) and (4a). Although the aperture stop is kept in a fixed position in this example, it may be moved so far as it does not interfere with another component. In that case, from the viewpoint of efficiency, it is preferable that it be moved while fulfilling conditional formulae (4) and (4a).

In Example 11, the fourth group Gr4 moves in the opposite direction to the second and third groups Gr2 and Gr3, and conditional formulae (1A), (1B), (2A), (2B), (3A), and (3B) are fulfilled. The second-to-third-group distance takes the minimum value XLmin at the middle position (M), takes the maximum value XLmax at the wide-angle end (W), and fulfills conditional formula (X6). In a case as here where the second-to-third-group distance takes the minimum value at the middle position (M), the minimum value of the second-to-third-group distance over the entire zoom range does not necessarily have to be exactly equal to XLmin.

In Example 11, the second and third groups Gr2 and Gr3 include positive lens elements, and the second group Gr2 includes one negative lens element. The total number of lens elements that constitute the second and third groups Gr2 and Gr3 is three, and the two positive lens elements both fulfill conditional formulae (7) and (7a). With respect to the second group Gr2, since Φn is negative, conditional formula (8) is fulfilled.

Example 1

Unit: mm

Surface Data

| i | r | d | Nd | Vd |
|---|---|---|----|----|
| 1 | ∞ | 0.000 | | |
| 2 | 180.162 | 2.000 | | |
| 3 | 1210.918 | 9.128 | 1.51680 | 64.20 |
| 4 | 150.311 | 1.250 | | |
| 5 | 73.423 | 8.420 | 1.58913 | 61.25 |
| 6 | 372.727 | 12.757 | | |
| 7 | 90.090 | 4.993 | 1.58913 | 61.25 |
| 8 | −169.593 | 14.635 | | |
| 9 | 106.607 | 4.465 | 1.49700 | 81.61 |
| 10 | −1386.232 | Variable | | |
| 11 | 128.687 | 4.671 | 1.72342 | 37.99 |
| 12 | 135.484 | 2.336 | | |
| 13 | −122.708 | 16.692 | 1.69680 | 55.46 |
| 14 | ∞ | 9.436 | | |
| 15 | −110.535 | Variable | | |

-continued

Unit: mm

| | | | | |
|---|---|---|----|----|
| 16 | 195.596 | 5.831 | 1.63854 | 55.45 |
| 17 | 304.843 | 3.296 | | |
| 18 | −147.467 | 9.182 | 1.49700 | 81.61 |
| 19 | 222.663 | Variable | | |
| 20 | −123.032 | 10.544 | 1.49700 | 81.61 |
| 21 (Aperture) | ∞ | Variable | | |
| 22 | −184.866 | 4.772 | | |
| 23 | 75.683 | 3.170 | 1.49700 | 81.61 |
| 24 | 76.557 | 2.068 | | |
| 25 | 3722.731 | 6.595 | 1.80610 | 40.73 |
| 26 | −58.518 | 72.272 | | |
| 27 | 179.780 | 3.891 | 1.88300 | 40.80 |
| 28 | 293.346 | 2.870 | | |
| 29 | −81.593 | 8.361 | 1.49700 | 81.61 |
| 30 | 177.656 | 0.710 | | |
| 31 | −74.876 | 12.118 | 1.49700 | 81.61 |
| 32 | 206.852 | 0.700 | | |
| 33 | 78.076 | 3.852 | 1.78590 | 43.93 |
| 34 | 91.808 | 3.248 | | |
| 35 | −343.980 | 9.704 | 1.49700 | 81.61 |
| 36 | 134.131 | 0.700 | | |
| 37 | −412.318 | 7.381 | 1.49700 | 81.61 |
| 38 | ∞ | 19.000 | | |
| 39 | ∞ | 116.500 | 1.51680 | 64.20 |
| 40 | ∞ | 5.000 | | |
| 41 | ∞ | 3.000 | 1.48749 | 70.44 |

Miscellaneous Data
√(ft × fw) = 49.174
Conditional Formula(0): fm/√(ft × fw) = 1.002
Y' = 20

| | (T) | (M) | (W) |
|---|---|---|---|
| FL | 57.410 | 49.296 | 42.120 |
| FNO | 2.5 | 2.5 | 2.5 |
| ω (°) | 19.1 | 22.0 | 25.6 |
| BF | 103.487 | 103.027 | 103.367 |
| TL | 589.766 | 589.306 | 589.646 |
| d9 | 60.564 | 66.382 | 71.937 |
| d14 | 24.971 | 65.153 | 104.584 |
| d18 | 4.024 | 2.880 | 4.024 |
| d20 | 93.997 | 49.140 | 3.010 |
| LAST (Paraxial) | 0.663 | 0.204 | 0.544 |

Zooming Lens Group Data

| Group | Focal Length |
|---|---|
| 1 | −70.261 |
| 2 | 203.924 |
| 3 | −268.507 |
| 4 | 160.612 |
| 5 | 124.863 |

Example 2

Unit: mm

Surface Data

| i | r | d | Nd | Vd |
|---|---|---|----|----|
| 1 | ∞ | 0.000 | | |
| 2 | 149.558 | 1.000 | | |
| 3 | −2194.282 | 14.852 | 1.51680 | 64.20 |
| 4 | 152.354 | 0.500 | | |
| 5 | 64.218 | 4.762 | 1.49700 | 81.61 |
| 6 | −209.441 | 21.999 | | |
| 7 | 104.134 | 3.842 | 1.62004 | 36.30 |
| 8 | −419.775 | 10.154 | | |
| 9 | 159.415 | 3.897 | 1.49700 | 81.61 |
| 10 | −756.258 | Variable | | |

-continued

Unit: mm

| | | | | |
|---|---|---|---|---|
| 11 | −129.383 | 7.220 | 1.71300 | 53.94 |
| 12 | ∞ | 52.151 | | |
| 13 | −81.909 | Variable | | |
| 14 | 224.956 | 4.579 | 1.54814 | 45.82 |
| 15 | 811.919 | 4.771 | | |
| 16 | −115.062 | 8.220 | 1.51680 | 64.20 |
| 17 | 205.757 | Variable | | |
| 18 | −112.302 | 11.616 | 1.49700 | 81.61 |
| 19 (Aperture) | ∞ | Variable | | |
| 20 | −399.356 | 3.197 | | |
| 21 | 80.789 | 2.785 | 1.49700 | 81.61 |
| 22 | 78.340 | 2.154 | | |
| 23 | 12223.445 | 7.168 | 1.72342 | 37.99 |
| 24 | −58.611 | 67.512 | | |
| 25 | 145.556 | 3.599 | 1.80610 | 40.73 |
| 26 | 269.410 | 3.332 | | |
| 27 | −87.095 | 10.615 | 1.49700 | 81.61 |
| 28 | 171.007 | 0.200 | | |
| 29 | −72.593 | 12.423 | 1.49700 | 81.61 |
| 30 | 313.576 | 0.200 | | |
| 31 | 76.778 | 3.860 | 1.80610 | 40.73 |
| 32 | 85.598 | 2.881 | | |
| 33 | −646.546 | 8.864 | 1.49700 | 81.61 |
| 34 | 95.041 | 0.200 | | |
| 35 | 1388.368 | 6.942 | 1.49700 | 81.61 |
| 36 | ∞ | 19.318 | | |
| 37 | ∞ | 116.500 | 1.51680 | 64.20 |
| 38 | ∞ | 5.000 | | |
| 39 | ∞ | 3.000 | 1.48749 | 70.44 |

Miscellaneous Data
√(ft × fw) = 54.468
Conditional Formula(0): fm/√(ft × fw) = 0.997
Y' = 20

| | (T) | (M) | (W) |
|---|---|---|---|
| FL | 65.550 | 54.311 | 45.259 |
| FNO | 2.5 | 2.5 | 2.5 |
| ω (°) | 17.0 | 20.2 | 24.0 |
| BF | 103.899 | 103.378 | 103.661 |
| TL | 589.765 | 589.244 | 589.527 |
| d9 | 51.318 | 53.698 | 56.307 |
| d12 | 14.167 | 58.157 | 97.604 |
| d16 | 1.890 | 1.344 | 2.996 |
| d18 | 92.317 | 46.493 | 2.785 |
| LAST (Paraxial) | 0.758 | 0.237 | 0.519 |

Zooming Lens Group Data

| Group | Focal Length |
|---|---|
| 1 | −73.083 |
| 2 | 216.910 |
| 3 | −282.456 |
| 4 | 147.543 |
| 5 | 143.673 |

Example 3

Unit: mm
Surface Data

| i | r | d | Nd | Vd |
|---|---|---|---|---|
| 1 | ∞ | 0.000 | | |
| 2 | 191.318 | 2.000 | | |
| 3 | 126262.626 | 10.528 | 1.51680 | 64.20 |
| 4 | 154.634 | 0.300 | | |
| 5 | 74.219 | 6.120 | 1.49700 | 81.61 |
| 6 | 468.579 | 14.025 | | |
| 7 | 87.554 | 5.157 | 1.49700 | 81.61 |

-continued

Unit: mm

| | | | | |
|---|---|---|---|---|
| 8 | −138.962 | 16.518 | | |
| 9 | 155.794 | 6.306 | 1.59282 | 68.63 |
| 10 | −1131.900 | Variable | | |
| 11 | 131.853 | 6.383 | 1.84666 | 23.78 |
| 12 | 139.717 | 2.066 | | |
| 13 | −135.764 | 15.827 | 1.80099 | 34.97 |
| 14 | ∞ | 34.310 | | |
| 15 | −84.368 | Variable | | |
| 16 | 184.221 | 5.425 | 1.53995 | 59.46 |
| 17 | 330.886 | 3.405 | | |
| 18 | −121.910 | 9.460 | 1.43875 | 94.99 |
| 19 | 207.762 | Variable | | |
| 20 | −220.211 | 8.103 | 1.43875 | 94.99 |
| 21 | −779.733 | 0.200 | | |
| 22 | −114.424 | 6.856 | 1.43875 | 94.99 |
| 23 (Aperture) | ∞ | Variable | | |
| 24 | −180.606 | 4.867 | | |
| 25 | 92.182 | 3.212 | 1.49700 | 81.61 |
| 26 | 114.364 | 18.438 | | |
| 27 | −328.344 | 7.267 | 1.88300 | 40.80 |
| 28 | −75.101 | 51.752 | | |
| 29 | 119.630 | 4.127 | 1.88300 | 40.80 |
| 30 | 207.873 | 3.255 | | |
| 31 | −89.615 | 8.706 | 1.43875 | 94.99 |
| 32 | 159.717 | 6.690 | | |
| 33 | −73.589 | 13.247 | 1.49700 | 81.61 |
| 34 | 432.852 | 0.700 | | |
| 35 | 70.472 | 3.903 | 1.74400 | 44.90 |
| 36 | 76.590 | 2.581 | | |
| 37 | −559.688 | 10.260 | 1.49700 | 81.61 |
| 38 | 119.198 | 0.700 | | |
| 39 | 13206.550 | 6.208 | 1.49700 | 81.61 |
| 40 | ∞ | 19.000 | | |
| 41 | ∞ | 116.500 | 1.51680 | 64.20 |
| 42 | ∞ | 5.000 | | |
| 43 | ∞ | 3.000 | 1.48749 | 70.44 |

Miscellaneous Data
√(ft × fw) = 53.519
Conditional Formula(0): fm/√(ft × fw) = 0.997
Y' = 20

| | (T) | (M) | (W) |
|---|---|---|---|
| FL | 65.548 | 53.374 | 43.698 |
| FNO | 2.5 | 2.5 | 2.5 |
| ω (°) | 16.9 | 20.5 | 24.8 |
| BF | 103.240 | 103.002 | 103.499 |
| TL | 597.448 | 597.210 | 597.707 |
| d9 | 39.061 | 43.292 | 48.376 |
| d14 | 16.548 | 61.238 | 100.913 |
| d18 | 1.021 | 0.500 | 2.341 |
| d22 | 98.000 | 49.601 | 3.000 |
| LAST (Paraxial) | 0.417 | 0.179 | 0.676 |

Zooming Lens Group Data

| Group | Focal Length |
|---|---|
| 1 | −73.419 |
| 2 | 211.303 |
| 3 | −247.708 |
| 4 | 137.662 |
| 5 | 131.423 |

Example 4

Unit: mm

Surface Data

| i | r | d | Nd | Vd |
|---|---|---|---|---|
| 1 | ∞ | 0.000 | | |
| 2 | 186.740 | 2.000 | | |
| 3 | 926.947 | 9.584 | 1.51680 | 64.20 |
| 4 | 144.800 | 1.027 | | |
| 5 | 68.908 | 6.331 | 1.72916 | 54.67 |
| 6 | 475.595 | 16.304 | | |
| 7 | 80.715 | 5.279 | 1.49700 | 81.61 |
| 8 | −491.983 | 13.958 | | |
| 9 | 118.972 | 6.595 | 1.49700 | 81.61 |
| 10 | −307.050 | Variable | | |
| 11 | 154.496 | 4.552 | 1.74950 | 35.04 |
| 12 | 162.293 | 2.063 | | |
| 13 | −123.074 | 13.088 | 1.77250 | 49.62 |
| 14 | ∞ | 8.506 | | |
| 15 | −130.304 | Variable | | |
| 16 | 170.265 | 4.473 | 1.51742 | 52.15 |
| 17 | 697.642 | 8.036 | | |
| 18 | −237.197 | 6.451 | 1.49700 | 81.61 |
| 19 | 185.561 | Variable | | |
| 20 | −135.635 | 11.818 | 1.49700 | 81.61 |
| 21 | −182.455 | Variable | | |
| 22 | 87.554 | 3.132 | 1.43875 | 94.99 |
| 23 | 88.095 | 2.033 | | |
| 24 | 594.283 | 5.152 | 1.83400 | 37.34 |
| 25 (Aperture) | ∞ | 11.627 | | |
| 26 | −71.456 | 77.292 | | |
| 27 | 160.745 | 3.962 | 1.88300 | 40.80 |
| 28 | 176.802 | 2.231 | | |
| 29 | −81.398 | 9.720 | 1.43875 | 94.99 |
| 30 | 122.868 | 0.889 | | |
| 31 | −126.617 | 10.184 | 1.49700 | 81.61 |
| 32 | 126.090 | 0.700 | | |
| 33 | 74.016 | 3.903 | 1.88300 | 40.80 |
| 34 | 98.949 | 4.239 | | |
| 35 | −212.746 | 10.067 | 1.49700 | 81.61 |
| 36 | 162.467 | 0.700 | | |
| 37 | −554.060 | 5.950 | 1.49700 | 81.61 |
| 38 | ∞ | 19.000 | | |
| 39 | ∞ | 116.500 | 1.51680 | 64.20 |
| 40 | ∞ | 5.000 | | |
| 41 | ∞ | 3.000 | 1.48749 | 70.44 |

Miscellaneous Data
√(ft × fw) = 43.224
Conditional Formula(0): fm/√(ft × fw) = 1.003
Y' = 20

| | (T) | (M) | (W) |
|---|---|---|---|
| FL | 49.910 | 43.360 | 37.433 |
| FNO | 2.5 | 2.5 | 2.5 |
| ω (°) | 21.7 | 24.6 | 28.3 |
| BF | 103.281 | 102.994 | 103.188 |
| TL | 594.720 | 594.433 | 594.626 |
| d9 | 73.201 | 76.670 | 79.716 |
| d14 | 8.778 | 51.988 | 96.263 |
| d18 | 1.774 | 0.700 | 0.939 |
| d20 | 95.165 | 49.560 | 2.000 |
| LAST (Paraxial) | 0.458 | 0.171 | 0.364 |

Zooming Lens Group Data

| Group | Focal Length |
|---|---|
| 1 | −70.711 |
| 2 | 245.582 |
| 3 | −249.291 |
| 4 | 159.153 |
| 5 | 119.631 |

Example 5

Unit: mm

Surface Data

| i | r | d | Nd | Vd |
|---|---|---|---|---|
| 1 | ∞ | 0.000 | | |
| 2 | 176.773 | 2.000 | | |
| 3 | 1583.005 | 9.986 | 1.51680 | 64.20 |
| 4 | 138.109 | 0.500 | | |
| 5 | 69.744 | 6.004 | 1.48749 | 70.44 |
| 6 | 351.846 | 13.917 | | |
| 7 | 81.941 | 5.038 | 1.59282 | 68.63 |
| 8 | −173.448 | 15.429 | | |
| 9 | 127.593 | 4.441 | 1.59282 | 68.63 |
| 10 | 947.679 | Variable | | |
| 11 | 129.764 | 6.478 | 1.80518 | 25.46 |
| 12 | 136.031 | 2.308 | | |
| 13 | −137.987 | 13.342 | 1.70154 | 41.15 |
| 14 | ∞ | 17.950 | | |
| 15 | −100.796 | Variable | | |
| 16 | 230.727 | 5.752 | 1.74330 | 49.22 |
| 17 | 328.559 | 2.910 | | |
| 18 | −129.239 | 9.787 | 1.59282 | 68.63 |
| 19 | 237.513 | Variable | | |
| 20 | −118.837 | 11.233 | 1.48749 | 70.44 |
| 21 (Aperture) | ∞ | Variable | | |
| 22 | −282.255 | 4.198 | | |
| 23 | 88.012 | 3.227 | 1.48749 | 70.44 |
| 24 | 103.720 | 16.505 | | |
| 25 | −515.326 | 6.816 | 1.88300 | 40.80 |
| 26 | −70.784 | 58.237 | | |
| 27 | 143.434 | 3.794 | 1.88300 | 40.80 |
| 28 | 363.661 | 10.662 | | |
| 29 | −109.954 | 6.817 | 1.43875 | 94.99 |
| 30 | 227.443 | 0.700 | | |
| 31 | −70.491 | 11.854 | 1.43875 | 94.99 |
| 32 | 228.703 | 0.700 | | |
| 33 | 79.235 | 3.815 | 1.88300 | 40.80 |
| 34 | 88.427 | 2.838 | | |
| 35 | −358.194 | 9.784 | 1.43875 | 94.99 |
| 36 | 116.858 | 0.700 | | |
| 37 | −278.858 | 8.772 | 1.49700 | 81.61 |
| 38 | ∞ | 19.000 | | |
| 39 | ∞ | 116.500 | 1.51680 | 64.20 |
| 40 | ∞ | 5.000 | | |
| 41 | ∞ | 3.000 | 1.48749 | 70.44 |

Miscellaneous Data
√(ft × fw) = 49.170
Conditional Formula(0): fm/√(ft × fw) = 1.002
Y' = 20

| | (T) | (M) | (W) |
|---|---|---|---|
| FL | 57.405 | 49.292 | 42.117 |
| FNO | 2.5 | 2.5 | 2.5 |
| ω (°) | 19.1 | 21.9 | 25.4 |
| BF | 103.457 | 102.975 | 103.007 |
| TL | 597.778 | 597.296 | 597.328 |
| d9 | 60.674 | 64.604 | 68.809 |
| d14 | 17.684 | 60.755 | 102.569 |
| d18 | 1.795 | 1.291 | 2.775 |
| d20 | 97.000 | 50.503 | 3.000 |
| LAST (Paraxial) | 0.634 | 0.152 | 0.184 |

Zooming Lens Group Data

| Group | Focal Length |
|---|---|
| 1 | −68.512 |
| 2 | 199.313 |
| 3 | −269.767 |
| 4 | 163.624 |
| 5 | 126.935 |

Example 6

Unit: mm

Surface Data

| i | r | d | Nd | Vd |
|---|---|---|---|---|
| 1 | ∞ | 0.000 | | |
| 2 | 205.059 | 2.000 | | |
| 3 | 2013.045 | 10.699 | 1.51680 | 64.20 |
| 4 | 148.722 | 2.000 | | |
| 5 | 75.045 | 8.346 | 1.69680 | 55.46 |
| 6 | 3823.361 | 16.120 | | |
| 7 | 93.140 | 6.868 | 1.59282 | 68.63 |
| 8 | −191.387 | 13.882 | | |
| 9 | 132.857 | 4.759 | 1.49700 | 81.61 |
| 10 | −464.969 | Variable | | |
| 11 | 146.752 | 6.315 | 1.64769 | 33.84 |
| 12 | 155.089 | 2.309 | | |
| 13 | −130.597 | 15.471 | 1.74330 | 49.22 |
| 14 | ∞ | 49.054 | | |
| 15 | −94.956 | Variable | | |
| 16 | 227.221 | 5.215 | 1.57135 | 52.95 |
| 17 | 632.475 | Variable | | |
| 18 | −130.306 | 7.158 | 1.49700 | 81.61 |
| 19 | 202.454 | 0.200 | | |
| 20 | −120.848 | 9.727 | 1.49700 | 81.61 |
| 21 (Aperture) | ∞ | Variable | | |
| 22 | −198.426 | 4.772 | | |
| 23 | 83.286 | 3.290 | 1.49700 | 81.61 |
| 24 | 85.864 | 3.353 | | |
| 25 | −843.974 | 7.037 | 1.80610 | 40.73 |
| 26 | −66.126 | 66.625 | | |
| 27 | 154.436 | 3.052 | 1.88300 | 40.80 |
| 28 | 232.020 | 2.918 | | |
| 29 | −94.546 | 7.939 | 1.49700 | 81.61 |
| 30 | 157.099 | 0.702 | | |
| 31 | −78.971 | 12.178 | 1.49700 | 81.61 |
| 32 | 261.478 | 0.700 | | |
| 33 | 75.377 | 3.839 | 1.78590 | 43.93 |
| 34 | 86.330 | 3.109 | | |
| 35 | −330.390 | 10.207 | 1.49700 | 81.61 |
| 36 | 123.912 | 0.700 | | |
| 37 | −523.725 | 7.459 | 1.49700 | 81.61 |
| 38 | ∞ | 19.000 | | |
| 39 | ∞ | 116.500 | 1.51680 | 64.20 |
| 40 | ∞ | 5.000 | | |
| 41 | ∞ | 3.000 | 1.48749 | 70.44 |

Miscellaneous Data
√(ft × fw) = 49.169
Conditional Formula(0): fm/√(ft × fw) = 1.002
Y' = 20

| | (T) | (M) | (W) |
|---|---|---|---|
| FL | 57.403 | 49.292 | 42.116 |
| FNO | 2.5 | 2.5 | 2.5 |
| ω (°) | 19.2 | 22.2 | 25.5 |
| BF | 103.654 | 103.269 | 103.025 |
| TL | 589.773 | 589.388 | 589.144 |
| d9 | 41.328 | 40.999 | 41.091 |
| d14 | 12.722 | 56.138 | 99.519 |
| d16 | 3.699 | 3.613 | 3.828 |
| d20 | 89.688 | 46.688 | 3.000 |
| LAST (Paraxial) | 0.831 | 0.446 | 0.202 |

Zooming Lens Group Data

| Group | Focal Length |
|---|---|
| 1 | −66.078 |
| 2 | 203.571 |
| 3 | −116.003 |
| 4 | 91.191 |
| 5 | 133.287 |

Example 7

Unit: mm

Surface Data

| i | r | d | Nd | Vd |
|---|---|---|---|---|
| 1 | ∞ | 0.000 | | |
| 2 | 276.445 | 2.000 | | |
| 3 | −6845.564 | 7.583 | 1.51680 | 64.20 |
| 4 | 155.052 | 0.530 | | |
| 5 | 74.688 | 7.628 | 1.58913 | 61.25 |
| 6 | 518.575 | 14.491 | | |
| 7 | 80.036 | 5.073 | 1.49700 | 81.61 |
| 8 | −164.081 | 16.586 | | |
| 9 | 149.331 | 4.542 | 1.49700 | 81.61 |
| 10 | −253.939 | Variable | | |
| 11 | 157.278 | 4.564 | 1.67270 | 32.17 |
| 12 | 176.848 | 2.591 | | |
| 13 | −130.213 | 12.268 | 1.78590 | 43.93 |
| 14 | ∞ | 67.889 | | |
| 15 | 202.486 | Variable | | |
| 16 | −101.142 | 11.031 | 1.49700 | 81.61 |
| 17 | −99.041 | Variable | | |
| 18 | 308.308 | 4.080 | 1.63854 | 55.45 |
| 19 | 277.401 | 1.775 | | |
| 20 | −143.839 | 8.072 | 1.49700 | 81.61 |
| 21 (Aperture) | ∞ | Variable | | |
| 22 | −182.801 | 4.722 | | |
| 23 | 77.180 | 3.107 | 1.49700 | 81.61 |
| 24 | 74.827 | 1.825 | | |
| 25 | 1295.891 | 6.311 | 1.80610 | 40.73 |
| 26 | −57.116 | 66.233 | | |
| 27 | 189.184 | 3.744 | 1.88300 | 40.80 |
| 28 | 277.101 | 2.677 | | |
| 29 | −82.327 | 9.229 | 1.49700 | 81.61 |
| 30 | 217.203 | 0.700 | | |
| 31 | −75.500 | 11.569 | 1.49700 | 81.61 |
| 32 | 157.079 | 0.700 | | |
| 33 | 79.860 | 3.898 | 1.78590 | 43.93 |
| 34 | 93.116 | 3.170 | | |
| 35 | −237.551 | 10.443 | 1.49700 | 81.61 |
| 36 | 122.687 | 0.700 | | |
| 37 | 771.052 | 5.586 | 1.49700 | 81.61 |
| 38 | ∞ | 19.000 | | |
| 39 | ∞ | 116.500 | 1.51680 | 64.20 |
| 40 | ∞ | 5.000 | | |
| 41 | ∞ | 3.000 | 1.48749 | 70.44 |

Miscellaneous Data
√(ft × fw) = 49.162
Conditional Formula(0): fm/√(ft × fw) = 1.002
Y' = 20

| | (T) | (M) | (W) |
|---|---|---|---|
| FL | 57.394 | 49.285 | 42.111 |
| FNO | 2.5 | 2.5 | 2.5 |
| ω (°) | 19.1 | 22.0 | 25.6 |
| BF | 103.339 | 103.068 | 103.382 |
| TL | 589.668 | 589.396 | 589.710 |
| d9 | 52.067 | 51.799 | 51.520 |
| d14 | 5.798 | 43.595 | 82.674 |
| d16 | 2.182 | 2.274 | 3.140 |
| d20 | 80.288 | 42.667 | 3.000 |
| LAST (Paraxial) | 0.516 | 0.244 | 0.558 |

Zooming Lens Group Data

| Group | Focal Length |
|---|---|
| 1 | −69.864 |
| 2 | 256.642 |
| 3 | 136.976 |
| 4 | −329.418 |
| 5 | 124.387 |

Example 8

Unit: mm

Surface Data

| i | r | d | Nd | Vd |
|---|---|---|---|---|
| 1 | ∞ | 0.000 | | |
| 2 | 236.172 | 2.000 | | |
| 3 | 2480.774 | 7.626 | 1.58913 | 61.25 |
| 4 | 163.614 | 2.000 | | |
| 5 | 74.062 | 8.265 | 1.58913 | 61.25 |
| 6 | 3431.827 | 15.406 | | |
| 7 | 84.443 | 4.845 | 1.49700 | 81.61 |
| 8 | −162.506 | 15.148 | | |
| 9 | 128.460 | 4.310 | 1.49700 | 81.61 |
| 10 | −284.938 | Variable | | |
| 11 | 150.288 | 6.238 | 1.64769 | 33.84 |
| 12 | 163.275 | 2.443 | | |
| 13 | −120.982 | 15.731 | 1.74330 | 49.22 |
| 14 | ∞ | 62.049 | | |
| 15 | 296.527 | Variable | | |
| 16 | −92.719 | 10.137 | 1.49700 | 81.61 |
| 17 | −88.995 | 2.308 | | |
| 18 | −5424.759 | 4.197 | 1.72916 | 54.67 |
| 19 | 868.402 | Variable | | |
| 20 | −118.132 | 7.533 | 1.49700 | 81.61 |
| 21 (Aperture) | ∞ | Variable | | |
| 22 | −183.451 | 4.786 | | |
| 23 | 79.233 | 3.172 | 1.49700 | 81.61 |
| 24 | 77.069 | 1.841 | | |
| 25 | −45310.376 | 6.678 | 1.80610 | 40.73 |
| 26 | −57.515 | 64.697 | | |
| 27 | 187.627 | 2.828 | 1.88300 | 40.80 |
| 28 | 367.909 | 3.074 | | |
| 29 | −83.115 | 7.816 | 1.49700 | 81.61 |
| 30 | 192.511 | 0.700 | | |
| 31 | −72.475 | 12.312 | 1.49700 | 81.61 |
| 32 | 160.949 | 0.700 | | |
| 33 | 83.474 | 3.896 | 1.88300 | 40.80 |
| 34 | 103.483 | 3.484 | | |
| 35 | −363.955 | 8.860 | 1.49700 | 81.61 |
| 36 | 136.216 | 0.700 | | |
| 37 | −519.656 | 7.016 | 1.49700 | 81.61 |
| 38 | ∞ | 19.000 | | |
| 39 | ∞ | 116.500 | 1.51680 | 64.20 |
| 40 | ∞ | 5.000 | | |
| 41 | ∞ | 3.000 | 1.48749 | 70.44 |

Miscellaneous Data $\sqrt{(ft \times fw)} = 49.156$
Conditional Formula(0): $fm/\sqrt{(ft \times fw)} = 1.002$
Y' = 20

| | (T) | (M) | (W) |
|---|---|---|---|
| FL | 57.389 | 49.278 | 42.104 |
| FNO | 2.5 | 2.5 | 2.5 |
| ω (°) | 19.1 | 22.1 | 25.5 |
| BF | 103.683 | 103.274 | 103.020 |
| TL | 589.798 | 589.389 | 589.135 |
| d9 | 44.785 | 44.671 | 45.996 |
| d14 | 1.006 | 44.725 | 84.590 |
| d18 | 12.066 | 9.176 | 9.058 |
| d20 | 84.787 | 44.072 | 3.000 |
| LAST (Paraxial) | 0.860 | 0.451 | 0.197 |

Zooming Lens Group Data

| Group | Focal Length |
|---|---|
| 1 | −65.686 |
| 2 | 224.232 |
| 3 | −1142.604 |
| 4 | 209.150 |
| 5 | 128.334 |

Example 9

Unit: mm

Surface Data

| i | r | d | Nd | Vd |
|---|---|---|---|---|
| 1 | ∞ | 0.000 | | |
| 2 | 179.657 | 2.000 | | |
| 3 | 2818.330 | 10.673 | 1.51680 | 64.20 |
| 4 | 163.865 | 0.908 | | |
| 5 | 69.865 | 8.355 | 1.49700 | 81.61 |
| 6 | 554.850 | 14.652 | | |
| 7 | 84.524 | 4.992 | 1.49700 | 81.61 |
| 8 | −163.428 | 15.094 | | |
| 9 | 120.018 | 4.393 | 1.59282 | 68.63 |
| 10 | −413.413 | Variable | | |
| 11 | 131.458 | 4.539 | 1.59551 | 39.22 |
| 12 | 139.080 | 2.059 | | |
| 13 | −116.702 | 14.362 | 1.65159 | 58.55 |
| 14 | ∞ | 34.825 | | |
| 15 | −147.924 | Variable | | |
| 16 | −257.880 | 5.718 | 1.67270 | 32.17 |
| 17 | 905.764 | 16.342 | | |
| 18 | −153.416 | 6.592 | 1.43875 | 94.99 |
| 19 | 271.499 | Variable | | |
| 20 | 106837.607 | 3.633 | 1.43875 | 94.99 |
| 21 (Aperture) | ∞ | Variable | | |
| 22 | −250.288 | 4.416 | | |
| 23 | 103.469 | 3.308 | 1.49700 | 81.61 |
| 24 | 97.931 | 1.749 | | |
| 25 | ∞ | 5.745 | 1.83400 | 37.34 |
| 26 | −69.042 | 72.137 | | |
| 27 | 194.604 | 4.073 | 1.88300 | 40.80 |
| 28 | 285.343 | 4.271 | | |
| 29 | −90.182 | 8.319 | 1.49700 | 81.61 |
| 30 | 168.747 | 0.700 | | |
| 31 | −91.474 | 11.374 | 1.49700 | 81.61 |
| 32 | 143.773 | 0.700 | | |
| 33 | 67.759 | 3.946 | 1.80610 | 40.73 |
| 34 | 74.315 | 2.924 | | |
| 35 | −569.009 | 10.873 | 1.49700 | 81.61 |
| 36 | 151.490 | 0.700 | | |
| 37 | −2524.360 | 5.647 | 1.49700 | 81.61 |
| 38 | ∞ | 19.000 | | |
| 39 | ∞ | 116.500 | 1.51680 | 64.20 |
| 40 | ∞ | 5.000 | | |
| 41 | ∞ | 3.000 | 1.48749 | 70.44 |

Miscellaneous Data $\sqrt{(ft \times fw)} = 49.175$
Conditional Formula(0): $fm/\sqrt{(ft \times fw)} = 1.002$
Y' = 20

| | (T) | (M) | (W) |
|---|---|---|---|
| FL | 57.411 | 49.297 | 42.121 |
| FNO | 2.5 | 2.5 | 2.5 |
| ω (°) | 19.0 | 22.1 | 25.6 |
| BF | 102.999 | 103.504 | 103.693 |
| TL | 597.090 | 597.595 | 597.783 |
| d9 | 57.302 | 54.062 | 51.414 |
| d14 | 8.392 | 57.246 | 108.280 |
| d18 | 0.700 | 2.794 | 0.700 |
| d20 | 97.000 | 49.292 | 3.000 |
| LAST (Paraxial) | 0.176 | 0.681 | 0.869 |

Zooming Lens Group Data

| Group | Focal Length |
|---|---|
| 1 | −66.492 |
| 2 | 221.446 |
| 3 | 618.832 |
| 4 | 618.820 |
| 5 | 132.713 |

Example 10

Unit: mm

Surface Data

| i | r | d | Nd | Vd |
|---|---|---|---|---|
| 1 | ∞ | 0.000 | | |
| 2 | 176.662 | 0.000 | | |
| 3 | ∞ | 12.224 | 1.51680 | 64.20 |
| 4 | 164.286 | 6.000 | | |
| 5 | 72.127 | 8.136 | 1.49700 | 81.61 |
| 6 | 810.287 | 13.948 | | |
| 7 | 94.629 | 4.878 | 1.49700 | 81.61 |
| 8 | −136.664 | 14.897 | | |
| 9 | 136.664 | 6.558 | 1.69680 | 55.46 |
| 10 | ∞ | Variable | | |
| 11 | 147.401 | 7.160 | 1.72342 | 37.99 |
| 12 | 153.026 | 2.207 | | |
| 13 | −118.984 | 16.721 | 1.69680 | 55.46 |
| 14 | −90.654 | Variable | | |
| 15 | 209.909 | 4.327 | 1.51742 | 52.15 |
| 16 | 334.317 | 2.987 | | |
| 17 | −130.599 | 10.252 | 1.49700 | 81.61 |
| 18 | 261.415 | Variable | | |
| 19 | −125.491 | 11.243 | 1.49700 | 81.61 |
| 20 | −202.538 | Variable | | |
| 21 | 90.359 | 3.289 | 1.49700 | 81.61 |
| 22 | 85.447 | 1.306 | | |
| 23 | ∞ | 6.617 | 1.80610 | 40.73 |
| 24 (Aperture) | ∞ | Variable | | |
| 25 | −63.915 | 67.718 | | |
| 26 | 151.828 | 4.482 | 1.88300 | 40.80 |
| 27 | 227.532 | 2.545 | | |
| 28 | −90.203 | 10.035 | 1.49700 | 81.61 |
| 29 | 166.084 | 3.086 | | |
| 30 | −79.937 | 12.957 | 1.49700 | 81.61 |
| 31 | 269.273 | 0.700 | | |
| 32 | 75.765 | 4.011 | 1.74330 | 49.22 |
| 33 | 83.768 | 2.492 | | |
| 34 | −293.986 | 11.174 | 1.49700 | 81.61 |
| 35 | 113.625 | 0.700 | | |
| 36 | ∞ | 6.982 | 1.49700 | 81.61 |
| 37 | ∞ | 19.000 | | |
| 38 | ∞ | 116.500 | 1.51680 | 64.20 |
| 39 | ∞ | 5.000 | | |
| 40 | ∞ | 3.000 | 1.48749 | 70.44 |

Miscellaneous Data $\sqrt{ft \times fw}$ = 54.474
Conditional Formula(0): $fm/\sqrt{ft \times fw}$ = 0.997
Y' = 20

| | (T) | (M) | (W) |
|---|---|---|---|
| FL | 65.559 | 54.316 | 45.263 |
| FNO | 2.5 | 2.5 | 2.5 |
| ω (°) | 17.0 | 20.2 | 23.8 |
| BF | 103.681 | 103.000 | 103.132 |
| TL | 591.253 | 590.572 | 590.705 |
| d9 | 38.095 | 40.425 | 43.039 |
| d13 | 46.064 | 95.152 | 137.688 |
| d17 | 2.364 | 0.500 | 2.262 |
| d19 | 98.741 | 49.193 | 2.500 |
| d23 | 2.000 | 1.995 | 1.775 |
| LAST (Paraxial) | 0.857 | 0.176 | 0.309 |

Zooming Lens Group Data

| Group | Focal Length |
|---|---|
| 1 | −64.802 |
| 2 | 177.045 |
| 3 | −392.102 |
| 4 | 171.765 |
| 5 | 612.620 |
| 6 | 132.855 |

Example 11

Unit: mm

Surface Data

| i | r | d | Nd | Vd |
|---|---|---|---|---|
| 1 | ∞ | 0.000 | | |
| 2 | 192.444 | 0.000 | | |
| 3 | −23435.669 | 13.139 | 1.51680 | 64.20 |
| 4 | 164.864 | 6.000 | | |
| 5 | 69.702 | 8.940 | 1.61800 | 63.39 |
| 6 | −857.317 | 15.484 | | |
| 7 | 92.158 | 7.303 | 1.49700 | 81.61 |
| 8 | −144.990 | 13.831 | | |
| 9 | 142.276 | 6.459 | 1.72916 | 54.67 |
| 10 | 321.398 | 24.072 | | |
| 11 | 135.287 | 4.622 | 1.67270 | 32.17 |
| 12 | 143.482 | 1.969 | | |
| 13 | −116.963 | 17.237 | 1.69680 | 55.46 |
| 14 | −94.796 | Variable | | |
| 15 | 182.488 | 5.363 | 1.51742 | 52.15 |
| 16 | 607.818 | 4.592 | | |
| 17 | −141.441 | 8.698 | 1.49700 | 81.61 |
| 18 | 177.093 | Variable | | |
| 19 | −123.955 | 13.038 | 1.49700 | 81.61 |
| 20 | −239.740 | Variable | | |
| 21 | 81.197 | 3.185 | 1.49700 | 81.61 |
| 22 | 78.796 | 1.437 | | |
| 23 | 719.626 | 6.190 | 1.80610 | 40.73 |
| 24 (Aperture) | ∞ | Variable | | |
| 25 | −59.423 | 69.418 | | |
| 26 | 198.306 | 2.930 | 1.88300 | 40.80 |
| 27 | 353.506 | 2.573 | | |
| 28 | −84.919 | 8.170 | 1.49700 | 81.61 |
| 29 | 184.483 | 0.700 | | |
| 30 | −76.070 | 12.664 | 1.49700 | 81.61 |
| 31 | 215.491 | 0.700 | | |
| 32 | 78.702 | 3.992 | 1.74330 | 49.22 |
| 33 | 87.258 | 2.467 | | |
| 34 | −262.726 | 11.072 | 1.49700 | 81.61 |
| 35 | 111.127 | 0.700 | | |
| 36 | ∞ | 7.110 | 1.49700 | 81.61 |
| 37 | ∞ | 19.000 | | |
| 38 | ∞ | 116.500 | 1.51680 | 64.20 |
| 39 | ∞ | 5.000 | | |
| 40 | ∞ | 3.000 | 1.48749 | 70.44 |

Miscellaneous Data $\sqrt{ft \times fw}$ = 54.440
Conditional Formula(0): $fm/\sqrt{ft \times fw}$ = 0.997
Y' = 20

| | (T) | (M) | (W) |
|---|---|---|---|
| FL | 65.520 | 54.279 | 45.233 |
| FNO | 2.5 | 2.5 | 2.5 |
| ω (°) | 17.0 | 20.2 | 23.9 |
| BF | 103.633 | 102.999 | 103.256 |
| TL | 569.584 | 568.950 | 569.208 |
| d13 | 35.196 | 84.415 | 129.779 |
| d17 | 0.564 | 0.503 | 1.442 |
| d19 | 102.937 | 50.594 | 2.500 |
| d23 | 2.526 | 5.712 | 7.502 |
| LAST (Paraxial) | 0.810 | 0.175 | 0.433 |

Zooming Lens Group Data

| Group | Focal Length |
|---|---|
| 1 | −215.701 |
| 2 | −274.936 |
| 3 | 148.426 |
| 4 | 929.514 |
| 5 | 125.525 |

TABLE 1

| Conditional Formula | | Example 1 | Example 2 | Example 3 |
|---|---|---|---|---|
| (1A)(X1A) | ΔTM3/|ΔTM2| | 7.905 | 19.484 | 11.562 |
| (2A)(X2A) | ΔTM4/|ΔTM2| | 7.709 | 19.255 | 11.438 |
| (3A) | ΔTM4/ΔTM3 | 0.975 | 0.988 | 0.989 |
| (X3A) | ΔTMβ/ΔTMα | 0.975 | 0.988 | 0.989 |
| (1B)(X1B) | ΔTW3/|ΔTW2| | 8.000 | 17.726 | 10.057 |
| (2B)(X2B) | ΔTW4/|ΔTW2| | 8.000 | 17.948 | 10.198 |
| (3B) | ΔTW4/ΔTW3 | 1.000 | 1.013 | 1.014 |
| (X3B) | ΔTWβ/ΔTWα | 1.000 | 0.988 | 0.986 |
| (4) | |exp/ft| | 34.84 | 20.02 | 30.56 |
| (5) | ft/fw | 1.36 | 1.45 | 1.50 |
| (6)(X6) | (Lmax − Lmin)/Δzm | 0.013 | 0.018 | 0.019 |
| (7) | Pg, F + 0.00181 × vd (Positive Element in Gr3, Gr4) | — 0.687(L8) 0.687(L9) — | 0.651(L7) 0.687(L8) — — | — 0.706(L8) 0.706(L9) 0.706(L10) |
| (8) | Φn/Φw | −0.15687 | −0.16024 | −0.17641 |
| (7) | Pg, F + 0.00181 × vd (Negative Element in Gr1) | — — 0.687(L4) | 0.687(L2) — 0.687(L4) | 0.687(L2) 0.687(L3) 0.668(L4) |
| (7) | Pg, F + 0.00181 × vd (Negative Element in Gr5) | 0.687(L10) — | — 0.687(L9) | — 0.687(L11) |
| (9A)(X9A) | Φ34W/Φ34T | 1.000 | 1.006 | 1.009 |
| (9B)(X9B) | Φ34M/Φ34T | 0.992 | 0.997 | 0.996 |

TABLE 2

| Conditional Formula | | Example 4 | Example 5 | Example 6 |
|---|---|---|---|---|
| (1A)(X1A) | ΔTM3/|ΔTM2| | 13.456 | 11.960 | 130.774 |
| (2A)(X2A) | ΔTM4/|ΔTM2| | 13.146 | 11.832 | 130.513 |
| (3A) | ΔTM4/ΔTM3 | 0.977 | 0.989 | 0.998 |
| (X3A) | ΔTMβ/ΔTMα | 0.977 | 0.989 | 0.998 |
| (1B)(X1B) | ΔTW3/|ΔTW2| | 14.428 | 11.436 | 364.529 |
| (2B)(X2B) | ΔTW4/|ΔTW2| | 14.299 | 11.556 | 365.071 |
| (3B) | ΔTW4/ΔTW3 | 0.991 | 1.011 | 1.001 |
| (X3B) | ΔTWβ/ΔTWα | 1.009 | 0.990 | 0.999 |
| (4) | |exp/ft| | 97.57 | 37.18 | 37.63 |
| (5) | ft/fw | 1.33 | 1.36 | 1.36 |
| (6)(X6) | (Lmax − Lmin)/Δzm | 0.011 | 0.016 | 0.002 |
| (7) | Pg, F + 0.00181 × vd (Positive Element in Gr3, Gr4) | 0.687(L8) 0.687(L9) | 0.668(L8) 0.658(L9) | 0.687(L8) 0.687(L9) |
| (8) | Φn/Φw | −0.15016 | −0.15612 | −0.36306 |
| (7) | Pg, F + 0.00181 × vd (Negative Element in Gr1) | — 0.687(L3) 0.687(L4) | 0.658(L2) 0.668(L3) 0.668(L4) | — 0.668(L3) 0.687(L4) |
| (7) | Pg, F + 0.00181 × vd (Negative Element in Gr5) | 0.706(L10) | 0.658(L10) | 0.687(L10) |
| (9A)(X9A) | Φ34W/Φ34T | 0.993 | 1.007 | 1.003 |
| (9B)(X9B) | Φ34M/Φ34T | 0.991 | 0.996 | 0.998 |

TABLE 3

| Conditional Formula | | Example 7 | Example 8 | Example 9 |
|---|---|---|---|---|
| (1A)(X1A) | ΔTM3/|ΔTM2| | 139.857 | 381.811 | 14.078 |
| (2A)(X2A) | ΔTM4/|ΔTM2| | 140.201 | 356.510 | 14.724 |
| (3A) | ΔTM4/ΔTM3 | 1.002 | 0.934 | 1.046 |
| (X3A) | ΔTMβ/ΔTMα | 0.998 | 0.934 | 0.956 |
| (1B)(X1B) | ΔTW3/|ΔTW2| | 139.694 | 70.005 | 15.965 |
| (2B)(X2B) | ΔTW4/|ΔTW2| | 141.446 | 67.522 | 15.965 |
| (3B) | ΔTW4/ΔTW3 | 1.013 | 0.965 | 1.000 |
| (X3B) | ΔTWβ/ΔTWα | 0.988 | 0.965 | 1.000 |
| (4) | |exp/ft| | 546.69 | 55.59 | 79.39 |
| (5) | ft/fw | 1.36 | 1.36 | 1.36 |
| (6)(X6) | (Lmax − Lmin)/Δzm | 0.012 | 0.035 | 0.022 |
| (7) | Pg, F + 0.00181 × vd (Positive Element in Gr3, Gr4) | 0.687(L7) — 0.687(L9) | 0.687(L7) — 0.687(L9) | — 0.706(L8) 0.706(L9) |
| (8) | Φn/Φw | −0.12783 | −0.03685 | 0.06807 |
| (7) | Pg, F + 0.00181 × vd | — | — | 0.687(L2) |

TABLE 3-continued

| Conditional Formula | | Example 7 | Example 8 | Example 9 |
|---|---|---|---|---|
| | (Negative Element in Gr1) | 0.687(L3) | 0.687(L3) | 0.687(L3) |
| (7) | Pg, F + 0.00181 × vd | 0.687(L4) | 0.687(L4) | 0.668(L4) |
| | | 0.687(L10) | 0.687(L10) | 0.687(L10) |
| | (Negative Element in Gr5) | — | — | — |
| (9A)(X9A) | Φ34W/Φ34T | 1.005 | 0.997 | 1.000 |
| (9B)(X9B) | Φ34M/Φ34T | 1.000 | 0.997 | 0.998 |

TABLE 4

| Conditional Formula | | Example 10 | Example 11 |
|---|---|---|---|
| (1A)(X1A) | ΔTM3/|ΔTM2| | 22.073 | 15.450 |
| (2A)(X2A) | ΔTM4/|ΔTM2| | 21.273 | 15.431 |
| (3A) | ΔTM4/ΔTM3 | 0.964 | 0.999 |
| (X3A) | ΔTMβ/ΔTMα | 0.964 | 0.999 |
| (1B)(X1B) | ΔTW3/|ΔTW2| | 19.533 | 19.009 |
| (2B)(X2B) | ΔTW4/|ΔTW2| | 19.513 | 19.186 |
| (3B) | ΔTW4/ΔTW3 | 0.999 | 1.009 |
| (X3B) | ΔTWβ/ΔTWα | 0.999 | 0.991 |
| (4) | |exp/ft| | 30.51 | 30.52 |
| (5) | ft/fw | 1.45 | 1.45 |
| (6)(X6) | (Lmax − Lmin)/Δzm | 0.019 | 0.010 |
| (7) | Pg, F + 0.00181 × vd (Positive Element in Gr3, Gr4) | — 0.687(L8) 0.687(L9) | — 0.687(L8) 0.687(L9) |
| (8) | Φn/Φw | −0.11544 | −0.16452 |
| (7) | Pg, F + 0.00181 × vd (Negative Element in Gr1) | 0.687(L2) 0.687(L3) | 0.655(L2) 0.687(L3) |
| (7) | Pg, F + 0.00181 × vd (Negative Element in Gr5) | 10.687(L10) — | 0.687(L10) — |
| (9A)(X9A) | Φ34W/Φ34T | 1.000 | 1.005 |
| (9B)(X9B) | Φ34M/Φ34T | 0.993 | 1.000 |

LIST OF REFERENCE SIGNS

LN projection lens system
Gr1 first group
Gr2 second group
Gr3 third group
Gr4 fourth group
Gr5 fifth group
Gr6 sixth group (group of plane-parallel plates)
Gr7 seventh group (group of plane-parallel plates)
Li i-th lens element (i=1, 2, 3, . . . )
ST aperture stop
IM image plane (image display surface)
AX optical axis

The invention claimed is:

1. A projection lens system of a five- or six-group design which achieves zooming by varying distances between groups, wherein
a most enlargement-side group has a negative optical power, and a most reduction-side group has a positive optical power,
when a group having a largest movement amount during zooming is referred to as an α-th group and a group located next to the α-th group and having a second largest movement amount during zooming is referred to as a β-th group, a composite optical power of the α-th and β-th groups is constantly positive,
when the α-th and β-th groups are together considered a single component referred to as an (α+β) component, a group next to the (α+β) component on an enlargement side thereof is referred to as a γ-th group, and a group next to the (α+β) component on a reduction side thereof is referred to as a δ-th group, at least one of the γ-th and δ-th groups moves during zooming, and an aperture stop is arranged on the reduction side of the (α+β) component,
during zooming from a telephoto end to a wide-angle end through a predetermined middle position that fulfills conditional formula (0) below, while the most enlargement-side and most reduction-side groups remain stationary, the α-th and β-th groups move from the enlargement side to the reduction side, and conditional formulae (X1A), (X1B), (X2A), (X2B), (X3A), and (X3B) below are fulfilled:

$$0.99 < fm/(ft \times fw)^{1/2} < 1.01 \tag{0}$$

$$7 < \Delta TM\alpha / |\Delta TM\gamma\delta| \tag{X1A}$$

$$7 < \Delta TW\alpha / |\Delta TW\gamma\delta| \tag{X1B}$$

$$7 < \Delta TM\beta / |\Delta TM\gamma\delta| \tag{X2A}$$

$$7 < \Delta TW\beta / |\Delta TW\gamma\delta| \tag{X2B}$$

$$0.9 < \Delta TM\beta / |\Delta TM\alpha| \leq 1 \tag{X3A}$$

$$0.9 < \Delta TW\beta / |\Delta TW\alpha| \leq 1 \tag{X3B}$$

where
ft represents a focal length of the entire system at the telephoto end;
fm represents a focal length of the entire system at the middle position;
fw represents a focal length of the entire system at the wide-angle end;
ΔTMα represents a movement amount of the α-th group from the telephoto end to the middle position;
ΔTMβ represents a movement amount of the β-th group from the telephoto end to the middle position;
ΔTMγδ represents the larger of movement amounts of the γ-th and δ-th groups from the telephoto end to the middle position;
ΔTWα represents a movement amount of the α-th group from the telephoto end to the wide-angle end;
ΔTWβ represents a movement amount of the β-th group from the telephoto end to the wide-angle end; and
ΔTWγδ represents the larger of movement amounts of the γ-th and δ-th groups from the telephoto end to the wide-angle end.

2. The projection lens system according to claim 1, wherein conditional formulae (4) and (5) below are fulfilled:

$$20 < |exp/ft| \tag{4}$$

$$1.3 < ft/fw \tag{5}$$

where exp represents a paraxial exit pupil position with respect to a reduction-side paraxial image plane (that is, a distance from a reduction-side paraxial image plane to a paraxial exit pupil).

3. The projection lens system according to claim 1, wherein with respect to zooming from the telephoto end through the middle position to the wide-angle end, conditional formula (X6) below is fulfilled:

$$0.001 < (XLmax - XLmin)/\Delta TW\alpha < 0.040 \qquad (X6)$$

where

XLmax represents a maximum distance between the α-th and β-th groups among distances therebetween at the telephoto end, the middle position, and the wide-angle end; and XLmin represents a minimum distance between the α-th and β-th groups among distances therebetween at the telephoto end, the middle position, and the wide-angle end.

4. The projection lens system according to claim 1, wherein one or both of the α-th and β-th groups include a positive lens element, only one of the α-th and β-th groups includes a negative lens element, a total number of lens elements constituting the α-th and β-th groups is three or four, and at least one of the positive lens element is formed of a lens material that fulfills conditional formula (7) below:

$$0.652 < Pg, F + 0.00181 \times vd \qquad (7)$$

where

Pg,F represents a partial dispersion ratio of the lens material; and vd represents an Abbe number of the lens material.

5. The projection lens system according to claim 4, wherein with respect to an optical power of the group that includes the negative lens element, conditional formula (8) below is fulfilled:

$$\Phi n/\Phi w < 0.1 \qquad (8)$$

where

Φn represents an optical power of the group that includes the negative lens element; and Φw represents an optical power of the entire system at the wide-angle end.

6. The projection lens system according to claim 1, wherein the most enlargement-side group includes at least one negative lens element that is formed of a lens material that fulfills conditional formula (7) below:

$$0.652 < Pg, F + 0.00181 \times vd \qquad (7)$$

where

Pg,F represents a partial dispersion ratio of the lens material; and vd represents an Abbe number of the lens material.

7. The projection lens system according to claim 1, wherein a most enlargement-side lens element in the δ-th group is a negative lens element that fulfills conditional formula (7) below:

$$0.652 < Pg, F + 0.00181 \times vd \qquad (7)$$

where

Pg,F represents a partial dispersion ratio of the lens material; and vd represents an Abbe number of the lens material.

8. The projection lens system according to claim 1, wherein with respect to a composite optical power of the α-th and β-th groups, conditional formulae (X9A) and (X9B) are fulfilled:

$$0.9 < \Phi\alpha\beta W/\Phi\alpha\beta T < 1.1 \qquad (X9A)$$

$$0.9 < \Phi\alpha\beta M/\Phi\alpha\beta T < 1.1 \qquad (X9B)$$

where

ΦαβT represents the composite optical power of the α-th and β-th groups at the telephoto end;

ΦαβM represents the composite optical power of the α-th and β-th groups at the middle position; and ΦαβW represents the composite optical power of the α-th and β-th groups at the wide-angle end.

9. A projector comprising an image display device for displaying an image, a light source, an illumination optical system for directing light from the light source to the image display device, and the projection lens system according to claim 1 for projecting the image displayed on the image display device onto a screen surface on an enlarged scale.

10. A projection lens system of a five-group design that comprises, from an enlargement side, a first group having a negative optical power, a second group having a positive optical power, a third group, a fourth group, and a fifth group having a positive optical power and that achieves zooming by varying distances between the groups, wherein an aperture stop is arranged on a reduction side of a most reduction-side lens element in the fourth group, during zooming from a telephoto end to a wide-angle end through a predetermined middle position that fulfills conditional formula (0) below, the first and fifth groups remain stationary, a composite optical power of the third and fourth groups is constantly positive, the third and fourth groups move from an enlargement side to a reduction side, and conditional formulae (1A), (1B), (2A), (2B), (3A), and (3B) are fulfilled:

$$0.99 < fm/(ft \times fw)^{1/2} < 1.01 \qquad (0)$$

$$7 < \Delta TM3/|\Delta TM2| \qquad (1A)$$

$$7 < \Delta TW3/|\Delta TW2| \qquad (1B)$$

$$7 < \Delta TM4/|\Delta TM2| \qquad (2A)$$

$$7 < \Delta TW4/|\Delta TW2| \qquad (2B)$$

$$0.9 < \Delta TM4/\Delta TM3 < 1.1 \qquad (3A)$$

$$0.9 < \Delta TW4/\Delta TW3 < 1.1 \qquad (3B)$$

where ft represents a focal length of the entire system at the telephoto end;

fm represents a focal length of the entire system at the middle position;

fw represents a focal length of the entire system at the wide-angle end;

ΔTM2 represents a movement amount of the second group from the telephoto end to the middle position;

ΔTM3 represents a movement amount of the third group from the telephoto end to the middle position;

ΔTM4 represents a movement amount of the fourth group from the telephoto end to the middle position;

ΔTW2 represents a movement amount of the second group from the telephoto end to the wide-angle end;

ΔTW3 represents a movement amount of the third group from the telephoto end to the wide-angle end; and ΔTW4 represents a movement amount of the fourth group from the telephoto end to the wide-angle end.

11. The projection lens system according to claim 10, wherein
the aperture stop is stationarily arranged in the fifth group, and conditional formulae (4) and (5) below are fulfilled:

$$20 < |exp/ft| \quad (4)$$

$$1.3 \leq ft/fw \quad (5)$$

where
exp represents a paraxial exit pupil position with respect to a reduction-side paraxial image plane (that is, a distance from a reduction-side paraxial image plane to a paraxial exit pupil).

12. The projection lens system according to claim 10, wherein
when a distance from a lens surface located at a most reduction-side position in the third group to a lens surface located at a most enlargement-side position in the fourth group is referred to as a third-to-fourth-group distance, with respect to zooming from the telephoto end through the middle position to the wide-angle end, conditional formula (6) below is fulfilled:

$$0.001 < (Lmax - Lmin)/\Delta zm < 0.040 \quad (6)$$

where
Lmax represents a maximum value of the third-to-fourth-group distance among values thereof at the telephoto end, the middle position, and the wide-angle end;
Lmin represents a minimum value of the third-to-fourth-group distance among values thereof at the telephoto end, the middle position, and the wide-angle end; and
Δzm represents the larger of ΔTW3 and ΔTW4.

13. The projection lens system according to claim 10, wherein
one or both of the third and fourth groups include a positive lens element, only one of the third and fourth groups includes a negative lens element, a total number of lens elements constituting the third and fourth groups is three or four, and at least one of the positive lens element fulfills conditional formula (7) below:

$$0.652 < Pg,F + 0.00181 \times \nu d \quad (7)$$

where
Pg,F represents a partial dispersion ratio of the lens material; and
νd represents an Abbe number of the lens material.

14. The projection lens system according to claim 13, wherein
with respect to an optical power of the group that includes the negative lens element, conditional formula (8) below is fulfilled:

$$\Phi n/\Phi w < 0.1 \quad (8)$$

where
Φn represents an optical power of the group that includes the negative lens element; and
Φw represents an optical power of the entire system at the wide-angle end.

15. The projection lens system according to claim 10, wherein
the second group includes two or less lens elements.

16. The projection lens system according to claim 10, wherein
the first group includes at least one negative lens element that is formed of a lens material that fulfills conditional formula (7) below:

$$0.652 < Pg,F + 0.00181 \times \nu d \quad (7)$$

where
Pg,F represents a partial dispersion ratio of the lens material; and
νd represents an Abbe number of the lens material.

17. The projection lens system according to claim 10, wherein
a most enlargement-side lens element in the fifth group is a negative lens element that fulfills conditional formula (7) below:

$$0.652 < Pg,F + 0.00181 \times \nu d \quad (7)$$

where
Pg,F represents a partial dispersion ratio of the lens material; and
νd represents an Abbe number of the lens material.

18. The projection lens system according to claim 10, wherein
with respect to a composite optical power of the third and fourth groups, conditional formulae (9A) and (9B) below are fulfilled:

$$0.9 < \Phi 34W/\Phi 34T < 1.1 \quad (9A)$$

$$0.9 < \Phi 34M/\Phi 34T < 1.1 \quad (9B)$$

where
Φ34T represents the composite optical power of the third and fourth groups at the telephoto end;
Φ34M represents the composite optical power of the third and fourth groups at the middle position; and
Φ34W represents the composite optical power of the third and fourth groups at the wide-angle end.

19. The projection lens system according to claim 10, wherein the third and fourth groups have different movement loci.

20. A projector comprising an image display device for displaying an image, a light source, an illumination optical system for directing light from the light source to the image display device, and the projection lens system according to claim 10 for projecting the image displayed on the image display device onto a screen surface on an enlarged scale.

* * * * *